US011460097B2

(12) United States Patent
Isono

(10) Patent No.: US 11,460,097 B2
(45) Date of Patent: Oct. 4, 2022

(54) COMPLEX PLANETARY GEAR UNIT

(71) Applicant: TOYOTA JIDOSHA KABUSHIKI KAISHA, Toyota (JP)

(72) Inventor: Hiroshi Isono, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/326,601

(22) Filed: May 21, 2021

(65) Prior Publication Data
US 2021/0404543 A1 Dec. 30, 2021

(30) Foreign Application Priority Data

Jun. 30, 2020 (JP) .............................. JP2020-112426

(51) Int. Cl.
*F16H 48/10* (2012.01)
*F16H 48/36* (2012.01)
*F16H 1/46* (2006.01)
*F16H 1/28* (2006.01)

(52) U.S. Cl.
CPC ............... *F16H 48/10* (2013.01); *F16H 1/46* (2013.01); *F16H 48/36* (2013.01); *F16H 2001/2881* (2013.01); *F16H 2048/364* (2013.01)

(58) Field of Classification Search
CPC ..... F16H 2200/2097; F16H 2001/2872; F16H 2001/2881; F16H 1/46
See application file for complete search history.

(56) References Cited

U.S. PATENT DOCUMENTS

| | | | | |
|---|---|---|---|---|
| 3,596,538 A | * | 8/1971 | Braun | ........................ F16H 1/46 |
| | | | | 475/341 |
| 10,161,481 B2 | * | 12/2018 | Sevagen | .................... F16H 1/46 |
| 10,480,631 B2 | * | 11/2019 | Dzafic | ................... F16H 57/029 |
| 2016/0153537 A1 | | 6/2016 | Kubo et al. | |
| 2021/0270189 A1 | * | 9/2021 | Hrubec | .................... F02C 3/067 |

FOREIGN PATENT DOCUMENTS

| | | |
|---|---|---|
| JP | 5280773 B2 | 9/2013 |
| JP | 6122119 B2 | 4/2017 |

\* cited by examiner

*Primary Examiner* — David R Morris
*Assistant Examiner* — James J Taylor, II
(74) *Attorney, Agent, or Firm* — Oliff PLC

(57) ABSTRACT

A planetary gear unit includes a first gear, a second gear, and a third gear arranged coaxially while allowed to rotate relatively. A first planetary gear and a second planetary gear are integral, and a third planetary gear and a fourth planetary gear are integral. The planetary gears are rotatably supported by a carrier. The first planetary gear is meshed with the first gear, the second planetary gear is meshed with the second gear, the third planetary gear is meshed with the second gear, and the fourth planetary gear is meshed with the third gear. A gear ratio between the first planetary gear and the first gear is different from a gear ratio between the second planetary gear and the second gear, and a gear ratio between the third planetary gear and the second gear is different from a gear ratio between the fourth planetary gear and the third gear.

5 Claims, 28 Drawing Sheets

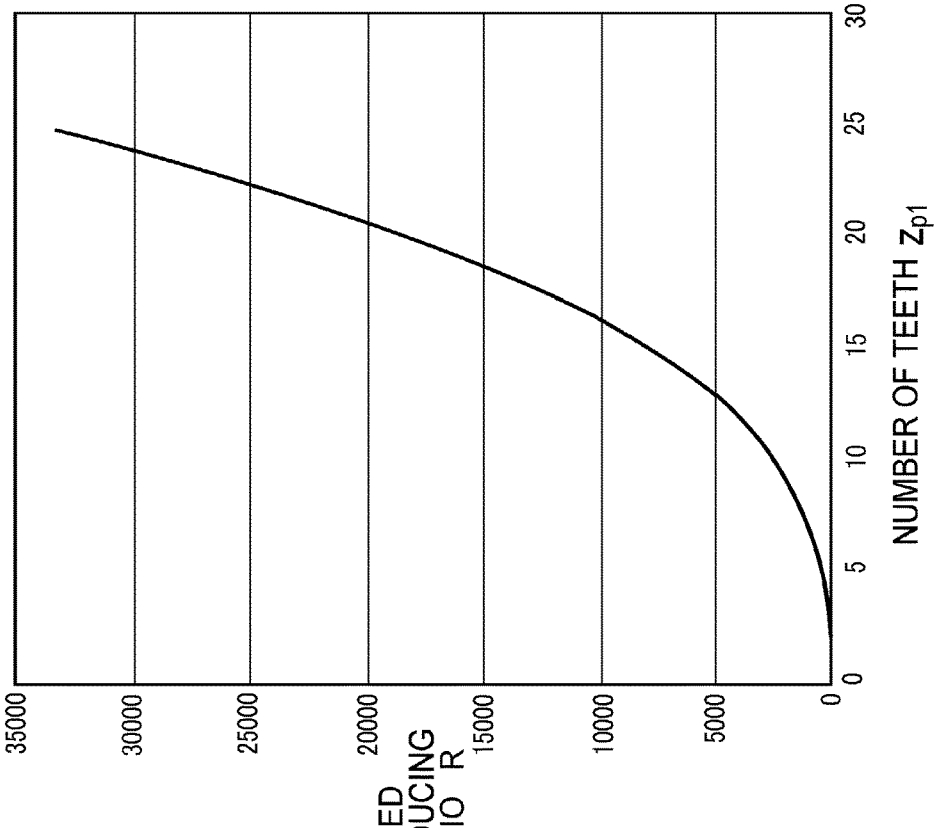

REVERSE DIRECTION OF OUTPUT SHAFT $Z_{p1} = Z_{p3}$
$Z_{p2} = Z_{p4} = Z_{p1} - 1$
$Z_{r1} = (Z_{p1} \cdot 2 + 1) \cdot 2$
$Z_{r2} = (Z_{p1} \cdot 2 - 1) \cdot 2$
$Z_{r3} = (Z_{p1} \cdot 2 - 3) \cdot 2$

| NUMBER OF TEETH | | | | | | | SPEED REDUCING RATIO R |
|---|---|---|---|---|---|---|---|
| $Z_{p1}$ | $Z_{p2}$ | $Z_{r1}$ | $Z_{r2}$ | $Z_{p3}$ | $Z_{p4}$ | $(Z_{r2})$ | $Z_{r3}$ | |
| 3 | 2 | 14 | 10 | 3 | 2 | 10 | 6 | -27 |
| 4 | 3 | 18 | 14 | 4 | 3 | 14 | 10 | -80 |
| 5 | 4 | 22 | 18 | 5 | 4 | 18 | 14 | -175 |
| 6 | 5 | 26 | 22 | 6 | 5 | 22 | 18 | -324 |
| 7 | 6 | 30 | 26 | 7 | 6 | 26 | 22 | -539 |
| 8 | 7 | 34 | 30 | 8 | 7 | 30 | 26 | -832 |
| 9 | 8 | 38 | 34 | 9 | 8 | 34 | 30 | -1215 |
| 10 | 9 | 42 | 38 | 10 | 9 | 38 | 34 | -1700 |
| 11 | 10 | 46 | 42 | 11 | 10 | 42 | 38 | -2299 |
| 12 | 11 | 50 | 46 | 12 | 11 | 46 | 42 | -3024 |
| 13 | 12 | 54 | 50 | 13 | 12 | 50 | 46 | -3887 |
| 14 | 13 | 58 | 54 | 14 | 13 | 54 | 50 | -4900 |
| 15 | 14 | 62 | 58 | 15 | 14 | 58 | 54 | -6075 |
| 16 | 15 | 66 | 62 | 16 | 15 | 62 | 58 | -7424 |
| 17 | 16 | 70 | 66 | 17 | 16 | 66 | 62 | -8959 |
| 18 | 17 | 74 | 70 | 18 | 17 | 70 | 66 | -10692 |
| 19 | 18 | 78 | 74 | 19 | 18 | 74 | 70 | -12635 |
| 20 | 19 | 82 | 78 | 20 | 19 | 78 | 74 | -14800 |
| 21 | 20 | 86 | 82 | 21 | 20 | 82 | 78 | -17199 |
| 22 | 21 | 90 | 86 | 22 | 21 | 86 | 82 | -19844 |
| 23 | 22 | 94 | 90 | 23 | 22 | 90 | 86 | -22747 |
| 24 | 23 | 98 | 94 | 24 | 23 | 94 | 90 | -25920 |
| 25 | 24 | 102 | 98 | 25 | 24 | 98 | 94 | -29375 |
| 26 | 25 | 106 | 102 | 26 | 25 | 102 | 98 | -33124 |

COMPLEX PLANETARY GEAR UNIT

CROSS REFERENCE TO RELATED APPLICATION

The present disclosure claims the benefit of Japanese Patent Application No. 2020-112426 filed on Jun. 30, 2020, with the Japanese Patent Office, the disclosures of which are incorporated herein by reference in its entirety.

BACKGROUND

Field of the Invention

Embodiments of the present disclosure relate to the art of a complex planetary gear unit comprising a plurality of planetary gear sets.

Discussion of the Related Art

JP-B2-5280773 describes a planetary gear speed reducer using a complex planetary gear mechanism comprising two planetary gear units, each of which does not have an internal gear (i.e., a ring gear). The planetary gear speed reducer described in JP-B2-5280773 comprises, a fixed sun gear, an output sun gear, a fixation side planetary gear, an output side planetary gear, and a carrier. The fixed sun gear and the output sun gear are arranged coaxially with each other so that the output sun gear is rotated integrally with an output shaft and relatively to the fixed sun gear. The fixation side planetary gear and the output side planetary gear are arranged integrally and coaxially with each other so that the fixation side planetary gear revolves around the fixed sun gear, and that the output side planetary gear revolves around the output sun gear. The carrier is arranged coaxially with the fixed sun gear and the output sun gear to be rotated integrally with an input shaft as an output shaft of a motor, and the fixation side planetary gear and the output side planetary gear are supported by the carrier in a rotatable manner. When the carrier is rotated by a torque of the motor, the fixation side planetary gear revolves around the fixed sun gear, and the output side planetary gear revolves around the output sun gear. Consequently, the output sun gear is rotated by the output side planetary gear at a speed lower than a rotational speed of the carrier.

JP-B2-6122119 describes a drive gear unit as a torque vectoring device mounted on a vehicle. The drive gear unit taught by JP-B2-6122119 comprises a differential gear unit that distributes torque to right and left wheels, and a control (or differential) motor that controls a distribution ratio of the torque distributed to the right and left wheels through the differential gear unit. The differential gear unit taught by JP-B2-6122119 comprises a complex planetary gear mechanism formed by combining two sets of planetary gear units, and in the differential gear unit, sun gears of the planetary gear units are connected to each other through a connection shaft. An intermediate gear is fitted onto an intermediate portion of the connection shaft, and an input gear to which torque is delivered from a prime mover is mated with the intermediate gear. Each carrier of the planetary gear units is individually connected to the drive wheels through a driveshaft. Ring gears of the planetary gear units are connected to each other through a reverse rotation member including a first gear and a second gear, and the control motor is connected to one of the ring gears. Specifically, the first gear includes a first pinion engaged with outer teeth of one of the ring gears, a shaft member, and a second pinion, and the first pinion and the second pinion are mounted on each end of the shaft member. Likewise, the second gear includes a first pinion engaged with outer teeth of other one of the ring gears, a shaft member, and a second pinion, and the first pinion and the second pinion are mounted on each end of the shaft member. The second pinion of the first gear is engaged with the second pinion of the second gear. Thus, the reverse rotation member transmits torque delivered to one of the ring gears from the control motor to the other one of ring gears while reversing.

For example, the planetary gear speed reducer described in JP-B2-5280773 may be applied to an industrial machine, a vehicle or a robot to serve as a reduction mechanism of the geared motor or a gearhead. According to the teachings of JP-B2-5280773, a speed reducing ratio of the planetary gear speed reducer is increased by the complex planetary gear mechanism to multiply an output torque of the motor by a larger factor. According to the teachings of JP-B2-5280773, therefore, the motor combined with the planetary gear speed reducer may be downsized, and the planetary gear speed reducer may be fitted easily in e.g., a vehicle. That is, the vehicle on which the planetary gear speed reducer taught by JP-B2-5280773 may be downsized and lightened. Thus, it is preferable to increase the speed reducing ratio of the complex planetary gear mechanism as much as possible. For example, the speed reducing ratio of the complex planetary gear mechanism may be further increased by combining a plurality of the complex planetary gear mechanisms, or by arranging larger gears having larger number of teeth in the complex planetary gear mechanism. As a result, the motor combined with the complex planetary gear mechanism may be further downsized. However, if a plurality of the complex planetary gear mechanisms is arranged in line, a size of the planetary gear speed reducer may be increased in an axial direction. Whereas, if larger gears are arranged in the complex planetary gear mechanism, a size of the planetary gear speed reducer may be increased in a redial direction. Even if the speed reducing ratio is increased, the planetary gear speed reducer thus increased in size may not be fit easily in the industrial machines or vehicles.

The speed reducing ratio of the drive gear unit taught by JP-B2-6122119 may also be increased by combining a plurality of the complex planetary gear mechanisms, or by arranging larger gears having larger number of teeth in the complex planetary gear mechanism. However, a size of the drive gear unit will also be increased as a result of increasing the speed reducing ratio by the above-mentioned approaches.

Thus, in order to fit the seeped reducer or the torque vectoring device having the complex planetary gear mechanism easily into industrial machines or vehicles, it is necessary to downsize the seeped reducer or the torque vectoring device by increasing a speed reducing ratio.

SUMMARY

Aspects of embodiments of the present disclosure have been conceived noting the foregoing technical problems, and it is therefore an object of embodiments of the present disclosure to provide a downsized complex planetary gear unit that can achieve a large speed reducing ratio.

An exemplary embodiment of the present disclosure relates to a complex planetary gear unit, comprising: a first gear that is arranged on a predetermined rotational axis; a second gear that is arranged on the predetermined rotational axis while being allowed to rotate relatively to the first gear; a third gear that is arranged on the predetermined rotational axis while being allowed to rotate relatively to the first gear and the second gear; a first planetary gear that is meshed with the first gear to revolve around the predetermined rotational axis; a second planetary gear that is meshed with the second gear to revolve around the predetermined rotational axis; a third planetary gear that is meshed with the second gear to revolve around the predetermined rotational axis; a fourth planetary gear that is meshed with the third gear to revolve around the predetermined rotational axis; and a carrier that is arranged on the predetermined rotational axis to support the planetary gears in a rotatable manner. In order to achieve the above-explained objective, according to the exemplary embodiment of the present disclosure, the first planetary gear and the second planetary gear are formed integrally with each other around a common rotational axis to integrally rotate and revolve around the predetermined rotational axis, and the third planetary gear and the fourth planetary gear are formed integrally with each other around another common rotational axis to integrally rotate and revolve around the predetermined rotational axis. In addition, a gear ratio between the first planetary gear and the first gear and a gear ratio between the second planetary gear and the second gear are set to different ratios, and a gear ratio between the third planetary gear and the second gear and a gear ratio between the fourth planetary gear and the third gear are set to different ratios. Accordingly, rotational speeds of the second gear and the third gear are reduced with respect to a rotational speed of the carrier.

In a non-limiting embodiment, the first gear may be fixed and not allowed to rotate. The complex planetary gear unit may further comprise an output shaft that rotates integrally with the third gear. An input torque applied to the carrier from an external source is delivered to the second gear while being multiplied, the input torque delivered to the second gear is further delivered to the third gear while being further multiplied, and the input torque delivered to the third gear is further delivered to an external rotary member through the output shaft.

In a non-limiting embodiment, the complex planetary gear unit may further comprise a counter rotating shaft that rotates integrally with the second gear. The output shaft and the counter rotating shaft may be arranged coaxially along the predetermined rotational axis while being allowed to rotate relatively to each other. The counter rotating shaft may be rotated in an opposite direction to a rotational direction of the output shaft, and the input torque delivered to the second gear may be further delivered to an external rotary member through the counter rotating shaft.

In a non-limiting embodiment, the first gear may include a first sun gear meshing with the first planetary gear, the second gear may include a second sun gear meshing with the second planetary gear and the third planetary gear, and the third gear may include a third sun gear meshing with the fourth planetary gear.

In a non-limiting embodiment, the third sun gear may be rotated in a same direction with a rotational direction of the carrier rotated by the input torque by setting numbers of teeth of the first planetary gear, the second planetary gear, the third planetary gear, the fourth planetary gear, the first sun gear, the second sun gear, and the third sun gear such that all of the following relational expressions are satisfied:

$z_{p1}=z_{p3}$ $z_{p2}=z_{p4}=z_{p1}+1$;

$z_{s1}=z_{p1}\cdot 2-1$;

$z_{s2}=z_{p1}\cdot 2+1$; and $z_{s3}=z_{p1}\cdot 2+3$, and the third sun gear may be rotated in an opposite direction to the rotational direction of the carrier rotated by the input torque by setting the numbers of teeth of the first planetary gear, the second planetary gear, the third planetary gear, the fourth planetary gear, the first sun gear, the second sun gear, and the third sun gear such that all of the following relational expressions are satisfied:

$z_{p1}=z_{p3}$;

$z_{p2}=z_{p4}=z_{p1}-1$;

$z_{s1}=z_{p1}\cdot 2+1$;

$z_{s2}=z_{p1}\cdot 2-1$; and $z_{s3}=z_{p1}\cdot 2-3$, given that the number of teeth of the first planetary gear is $z_{p1}$, the number of teeth of the second planetary gear is $z_{p2}$, the number of teeth of the third planetary gear is $z_{p3}$, the number of teeth of the fourth planetary gear is $z_{p4}$, the number of teeth of the first sun gear is $z_{s1}$, the number of teeth of the second sun gear is $z_{s2}$, and the number of teeth of the third sun gear is $z_{s3}$.

In a non-limiting embodiment, the first gear may include a first ring gear meshing with the first planetary gear, the second gear may include a second ring gear meshing with the second planetary gear and the third planetary gear, and the third gear may include a third ring gear meshing with the fourth planetary gear.

In a non-limiting embodiment, the third ring gear may be rotated in a same direction with the rotational direction of the carrier rotated by the input torque by setting the numbers of teeth of the first planetary gear, the second planetary gear, the third planetary gear, the fourth planetary gear, the first ring gear, the second ring gear, and the third ring gear such that all of the following relational expressions are satisfied:

$z_{p1}=z_{p3}$;

$z_{p2}=z_{p4}=z_{p1}+1$;

$z_{r1}=(z_{p1}\cdot 2-1)\cdot 2$;

$z_{r2}=(z_{p1}\cdot 2+1)\cdot 2$; and $z_{r3}=(z_{p1}\cdot 2+3)\cdot 2$, and the third ring gear may be rotated in an opposite direction to the rotational direction of the carrier rotated by the input torque by setting the numbers of teeth of the first planetary gear, the second planetary gear, the third planetary gear, the fourth planetary gear, the first ring gear, the second ring gear, and the third ring gear such that all of the following relational expressions are satisfied:

$z_{p1}=z_{p3}$;

$z_{p2}=z_{p4}=z_{p1}-1$;

$z_{r1}=(z_{p1}\cdot 2+1)\cdot 2$;

$z_{r2}=(z_{p1}\cdot 2-1)\cdot 2$; and $z_{r3}=(z_{p1}\cdot 2-3)\cdot 2$, given that the number of teeth of the first planetary gear is $z_{p1}$, the number of teeth of the second planetary gear is $z_{p2}$, the number of teeth of the third planetary gear is $z_{p3}$, the number of teeth of the fourth planetary gear is $z_{p4}$, the number of teeth of the first ring gear is $z_{r1}$, the number of teeth of the second ring gear is $z_{r2}$, and the number of teeth of the third ring gear is $z_{r3}$.

In a non-limiting embodiment, the complex planetary gear unit may further comprise an input sun gear that is arranged on the predetermined rotational axis while being meshed with the first planetary gear. The input torque may be applied to the carrier through the input sun gear.

In a non-limiting embodiment, the first gear may be supported in a rotatable manner. The complex planetary gear unit may further comprise a first rotary shaft that rotates integrally with the second gear, and a second rotary shaft that rotates integrally with the third gear. The first rotary shaft and the second rotary shaft may be arranged coaxially along the predetermined rotational axis while being allowed to rotate relatively to each other. A drive torque applied to the first gear from a prime mover may be distributed to the first rotary shaft and the second rotary shaft, and a control torque applied to the carrier from a control motor may be delivered to the first rotary shaft and the second rotary shaft while being multiplied.

In a non-limiting embodiment, the first rotary shaft and the second rotary shaft may be rotated differentially by applying the control torque to the carrier, and the first rotary shaft and the second rotary shaft may be rotated in opposite directions when rotated differentially. In addition, a ratio of a rotational speed of the second gear to a rotational speed of the carrier and a ratio of a rotational speed of the third gear to the rotational speed of the carrier may be equal or approximated to each other. That is, a difference between the above-mentioned ratios may be reduced less than a predetermined value.

In a non-limiting embodiment, the complex planetary gear unit may further comprise: a speed increasing planetary gear set comprising a speed increasing sun gear, a speed increasing carrier, and a speed increasing ring gear; and a speed reducing planetary gear set comprising a reduction sun gear, a reduction carrier, and a reduction ring gear. The speed increasing planetary gear set and the speed reducing planetary gear set may be formed around the predetermined rotational axis. Specifically, the speed increasing sun gear may be fixed and not allowed to rotate, the speed increasing carrier may be rotated integrally with the first gear, and the speed increasing ring gear may be rotated at a speed higher than a rotational speed of the speed increasing carrier. On the other hand, the reduction ring gear may be connected to the speed increasing ring gear to be rotated integrally with the speed increasing ring gear, the reduction carrier may be rotated integrally with the carrier at a speed slower than a rotational speed of the reduction ring gear, and the reduction sun gear may be rotated integrally with an output shaft of the control motor. In addition, the reduction sun gear may be rotated relatively to the first gear and the carrier when the first rotary shaft and the second rotary shaft are rotated passively in a same direction at a same speed together with the first gear and the carrier. That is, the reduction sun gear may be rotated differentially with the first gear and the carrier, and prevented from being rotated passively.

In a non-limiting embodiment, a gear ratio of the speed increasing planetary gear set and a gear ratio of the speed reducing planetary gear set may be equal.

In a non-limiting embodiment, the first gear may include a first sun gear meshing with the first planetary gear, the second gear may include a second sun gear meshing with the second planetary gear and the third planetary gear, and the third gear may include a third sun gear meshing with the fourth planetary gear.

In a non-limiting embodiment, the third sun gear may be rotated in a same direction with a rotational direction of the carrier rotated by the control torque by setting numbers of teeth of the first planetary gear, the second planetary gear, the third planetary gear, the fourth planetary gear, the first sun gear, the second sun gear, and the third sun gear such that all of the following relational expressions are satisfied:

$$z_{p2}=z_{p3}=z_{p1}+1;$$

$$z_{p4}=z_{p1}-1; \text{ and}$$

$$z_{s11}=z_{s12}=z_{s13}, \text{ and}$$

the third sun gear is rotated in an opposite direction to the rotational direction of the carrier rotated by the control torque by setting the numbers of teeth of the first planetary gear, the second planetary gear, the third planetary gear, the fourth planetary gear, the first sun gear, the second sun gear, and the third sun gear such that all of the following relational expressions are satisfied:

$$z_{p2}=z_{p3}=z_{p1}-1;$$

$$z_{p4}=z_{p1}+1; \text{ and}$$

$$z_{s11}=z_{s12}=z_{s13},$$

given that the number of teeth of the first planetary gear is $z_{p1}$, the number of teeth of the second planetary gear is $z_{p2}$, the number of teeth of the third planetary gear is $z_{p3}$, the number of teeth of the fourth planetary gear is $z_{p4}$, the number of teeth of the first sun gear is $z_{s1}$, the number of teeth of the second sun gear is $z_{s2}$, and the number of teeth of the third sun gear is $z_{s3}$.

In a non-limiting embodiment, the first gear may include a first ring gear meshing with the first planetary gear, the second gear may include a second ring gear meshing with the second planetary gear and the third planetary gear, and the third gear may include a third ring gear meshing with the fourth planetary gear.

In a non-limiting embodiment, the third ring gear may be rotated in a same direction with a rotational direction of the carrier rotated by the control torque by setting numbers of teeth of the first planetary gear, the second planetary gear, the third planetary gear, the fourth planetary gear, the first ring gear, the second ring gear, and the third ring gear such that all of the following relational expressions are satisfied:

$$z_{p2}=z_{p3}=z_{p1}+1;$$

$$z_{p4}=z_{p1}-1; \text{ and}$$

$$z_{r11}=z_{r12}=z_{r13}, \text{ and}$$

the third ring gear may be rotated in an opposite direction to the rotational direction of the carrier rotated by the control torque by setting the numbers of teeth of the first planetary gear, the second planetary gear, the third planetary gear, the fourth planetary gear, the first ring gear, the second ring gear, and the third ring gear such that all of the following relational expressions are satisfied:

$$z_{p2}=z_{p3}=z_{p1}-1;$$

$$z_{p4}=z_{p1}+1; \text{ and}$$

$$z_{r11}=z_{r12}=z_{r13},$$

given that the number of teeth of the first planetary gear is $z_{p1}$, the number of teeth of the second planetary gear is $z_{p2}$, the number of teeth of the third planetary gear is $z_{p3}$, the number of teeth of the fourth planetary gear is $z_{p4}$, the number of teeth of the first ring gear is $z_{r11}$, the number of teeth of the second ring gear is $z_{r12}$, and the number of teeth of the third ring gear is $z_{r13}$.

In a non-limiting embodiment, the complex planetary gear unit may further comprise an input sun gear that is arranged on the predetermined rotational axis while being meshed with the first planetary gear. The control torque may be applied to the carrier through the input sun gear.

In a non-limiting embodiment, the complex planetary gear unit may be mounted on a vehicle having a right wheel and a left wheel together with the prime mover and the control motor. In this case, the first rotary shaft may transmit a torque between one of the wheels and the second gear, the second rotary shaft may transmit a torque between other one of the wheels and the third gear, and the first rotary shaft and the second rotary shaft may extend coaxially in a width direction of the vehicle.

In a non-limiting embodiment, the complex planetary gear unit may be mounted on a vehicle having a front wheel and a rear wheel together with the prime mover and the control motor. In this case, the first rotary shaft may transmit a torque between one of the wheels and the second gear, the second rotary shaft may transmit a torque between other one of the wheels and the third gear, and the first rotary shaft and the second rotary shaft may extend coaxially in a longitudinal direction of the vehicle.

Thus, the complex planetary gear unit according to the exemplary embodiment of the present disclosure comprises a set of the first to third gears, a set of the first to fourth planetary gears, and the carrier. The first to third gears are arranged coaxially, and the first to fourth planetary gears are supported by the carrier in a rotatable manner while being meshed individually with the first to third gears. Specifically, the first planetary gear and the second planetary gear are formed integrally with each other around the common rotational axis to integrally rotate and revolve around the predetermined rotational axis, and the third planetary gear and the fourth planetary gear are formed integrally with each other around another common rotational axis to integrally rotate and revolve around the predetermined rotational axis. In the complex planetary gear unit, both of the second planetary gear and the third planetary gear are meshed with the second gear. That is, the complex planetary gear unit is formed by combining substantially three sets of planetary gear sets, and the complex planetary gear unit may achieve a speed reducing ratio comparable to that of a complex planetary gear unit formed by combining four sets of planetary gear units. Specifically, the complex planetary gear unit comprises: a first complex planetary gear set having the first planetary gear, the second planetary gear, the first gear, and the second gear; and a second complex planetary gear set having the third planetary gear, the fourth planetary gear, the second gear, and the third gear. Thus, the second gear is used commonly in the first complex planetary gear set and the second complex planetary gear set. According to the exemplary embodiment of the present disclosure, therefore, the complex planetary gear unit may be downsized to a size comparable to that of a complex planetary gear unit in which three sets of planetary gear units are arranged coaxially. In addition, the complex planetary gear unit may achieve a speed reducing ratio comparable to that of a complex planetary gear unit formed by combining four sets of planetary gear units, or combining two sets of complex planetary gear units.

In the complex planetary gear unit according to the exemplary embodiment of the present disclosure, the first gear is fixed to serve as a reaction element of the first complex planetary gear set. In the first complex planetary gear set, therefore, the second gear is rotated at a speed slower than a rotational speed of the carrier. As described, the complex planetary gear unit according to the exemplary embodiment of the present disclosure is formed by combining the first complex planetary gear set and the second complex planetary gear set, and the second gear and the carrier are used commonly in the first complex planetary gear set and the second complex planetary gear set. In the complex planetary gear unit, therefore, the input torque applied to the carrier is delivered to the second gear while being multiplied by the first complex planetary gear set, the input torque delivered to the second gear is further delivered to the third gear while being further multiplied by the second complex planetary gear set, and the torque delivered to the third gear is further delivered to the external rotary member through the output shaft. That is, a speed reducing ratio expected to be achieved by two sets of complex planetary gear sets may be achieved only by one set of complex planetary gear set. According to the exemplary embodiment of the present disclosure, therefore, the complex planetary gear unit may be downsized to a size comparable to that of a complex planetary gear unit in which three sets of planetary gear units are arranged coaxially. In addition, the complex planetary gear unit may achieve a speed reducing ratio comparable to that of a complex planetary gear unit formed by combining four sets of planetary gear units, or combining two sets of complex planetary gear units.

In the complex planetary gear unit, the counter rotating shaft is joined to the second gear serving as a counter gear with respect to the third sun gear so that the counter rotating shaft rotates in the opposite direction to the rotational direction of the output shaft. In the complex planetary gear unit, therefore, the input torque delivered to the second gear may also be further delivered to external rotary members not only through the output shaft, but also through the counter rotating shaft while being reversed and multiplied. Thus, the complex planetary gear unit may be adapted as a reversing mechanism having two output shafts rotating in opposite directions. The counter rotating shaft may also serve as an input shaft of the complex planetary gear unit. That is, a torque may be applied to the counter rotating shaft in the opposite direction to the rotational direction of the output shaft, and the torque applied to the counter rotating shaft is delivered to the output shaft while being multiplied. In order to apply the torque to the counter rotating shaft, for example, an assist motor may be joined to the counter rotating shaft.

In the case of employing the first sun gear, the second sun gear, and the third sun gear as the first gear, the second gear, and the third gear, respectively, it is not necessary to arrange the ring gears in the complex planetary gear unit. In this case, therefore, a size of the complex planetary gear unit may be reduced in the radial direction.

In this case, a rotational direction of the output shaft may be switched by changing the numbers of teeth of the planetary gears and the sun gears. In addition, a speed reducing ratio of the complex planetary gear unit may also be changed by adjusting the numbers of teeth of the planetary gears and the sun gears.

In the case of employing the first ring gear, the second ring gear, and the third ring gear as the first gear, the second gear, and the third gear, respectively, it is not necessary to arrange the sun gears in the complex planetary gear unit. In this case, therefore, a size of the complex planetary gear unit may also be reduced in the radial direction.

In this case, a rotational direction of the output shaft may also be switched by changing the numbers of teeth of the planetary gears and the ring gears. In addition, a speed reducing ratio of the complex planetary gear unit may also be changed by adjusting the numbers of teeth of the planetary gears and the ring gears.

In this case, in addition, the input sun gear may be arranged in the complex planetary gear unit to be meshed with the first planetary gear. That is, the first planetary gear is meshed not only with the first ring gear but also with the input sun gear so that the input torque may be delivered to the carrier through the input sun gear. For this reason, the speed reducing ratio of the complex planetary gear unit may be further increased by the input sun gear, and hence the complex planetary gear unit may be further downsized.

In the complex planetary gear unit according to the exemplary embodiment of the present disclosure, the first gear may be supported in a rotatable manner, and a drive torque is applied to the first gear from an external source. The drive torque is then distributed to the first rotary shaft on which the second gear is formed and the second rotary shaft on which the third gear is formed. As described, the first rotary shaft and the second rotary shaft are allowed to rotate relatively to each other. According to the exemplary embodiment of the present disclosure, therefore, the complex planetary gear unit may serve as a differential mechanism. In addition, the control torque of the control motor may be delivered to the first rotary shaft and the second rotary shaft while being multiplied. That is, the complex planetary gear unit may also serve as a torque vectoring device. Since the control torque of the control motor may be increased, the control motor may be downsized to further downsize the complex planetary gear unit. In addition, a weight of the complex planetary gear unit may also be reduced.

As described, the complex planetary gear unit according to the exemplary embodiment of the present disclosure may serve as a reversing mechanism that allows the first rotary shaft and the second rotary shaft to rotate in opposite directions. For this reason, the complex planetary gear unit may also be adapted as a center differential mechanism of a four-wheel drive layout vehicle to distribute the torque to front wheels and rear wheels or to a right wheel and a left wheel. In addition, the ratio of a rotational speed of the second gear to a rotational speed of the carrier to which the control torque is applied and the ratio of a rotational speed of the third gear to the rotational speed of the carrier may be equal or approximated to each other. According to the exemplary embodiment of the present disclosure, therefore, a differential rotation between the first rotary shaft and the second rotary shaft may be controlled easily. Thus, the complex planetary gear unit according to the exemplary embodiment of the present disclosure may be combined with the control motor to serve as a torque vectoring device of the four-wheel drive layout vehicle.

In order to prevent the control motor from being rotated passively, the complex planetary gear unit according to the exemplary embodiment of the present disclosure is provided with the speed increasing planetary gear set and the speed reducing planetary gear set. When the first rotary shaft and the second rotary shaft are rotated in a same direction at a same speed, in the complex planetary gear unit, the first gear, the second gear, the third gear, and the carrier are rotated integrally. Consequently, the speed increasing carrier of the speed increasing planetary gear set and the reduction carrier of the speed reducing planetary gear set are rotated in a same direction at a same speed. In this situation, the speed increasing planetary gear set in which the speed increasing sun gear is fixed serves as a speed increasing mechanism to increase a rotational speed of the speed increasing ring gear higher than a rotational speed of the speed increasing carrier. On the other hand, the speed reducing planetary gear set serves as a speed reducing mechanism to reduce a rotational speed of the reduction carrier lower than a rotational speed of the reduction ring gear. As described, the speed increasing carrier and the reduction carrier are rotated at the same speed, and since the reduction ring gear and the speed increasing ring gear are connected to each other, the reduction ring gear and the speed increasing ring gear are also rotated at a same speed. Consequently, an absolute value of the speed increasing ratio of the speed increasing planetary gear set and an absolute value of the speed reducing ratio of the speed reducing planetary gear set are equalized to each other. In this situation, since a rotational speed of the speed increasing sun gear is zero, the rotational speed of the reduction sun gear is reduced to substantially zero that is lower than the rotational speed of the reduction ring gear or the reduction carrier, in accordance with the gear ratio of the speed reducing planetary gear set. That is, since the gear ratio of the speed increasing planetary gear set and the gear ratio of the speed reducing planetary gear set are equal, the rotational speed of the reduction sun gear is reduced to substantially zero. For this reason, when the first rotary shaft and the second rotary shaft rotate in the same direction at the same speed so that the first gear, the second gear, the third gear, and the carrier are rotated integrally and passively, a rotational speed of the output shaft of the control motor connected to the reduction sun gear is maintained to zero. Consequently, the control motor can be prevented from being rotated passively.

By thus preventing the passive rotation of the control motor, according to the exemplary embodiment of the present disclosure, a power transmission efficiency and an energy efficiency of the differential mechanism can be improved.

In the case of employing the first sun gear, the second sun gear, and the third sun gear as the first gear, the second gear, and the third gear, respectively, it is not necessary to arrange the ring gears in the complex planetary gear unit. In this case, therefore, a size of the complex planetary gear unit may also be reduced in the radial direction. The complex planetary gear unit thus downsized may be mounted on a vehicle to serve as a differential mechanism or a torque vectoring device.

In this case, rotational directions of the second sun gear mounted on the first rotary shaft and the third sun gear mounted on the second rotary shaft may also be switched by changing the numbers of teeth of the planetary gears and the sun gears. In addition, a speed reducing ratio of the complex planetary gear unit may also be changed by adjusting the numbers of teeth of the planetary gears and the sun gears.

As described, in the case of employing the first ring gear, the second ring gear, and the third ring gear as the first gear, the second gear, and the third gear, respectively, it is not necessary to arrange the sun gears in the complex planetary gear unit and the complex planetary gear unit may be downsized. The complex planetary gear unit thus downsized may be mounted on a vehicle to serve as a differential mechanism or a torque vectoring device.

As also described, rotational directions of the second ring gear connected to the first rotary shaft and the third ring gear connected to the second rotary shaft may also be switched by changing the numbers of teeth of the planetary gears and the ring gears. In addition, a speed reducing ratio of the complex planetary gear unit may also be changed by adjusting the numbers of teeth of the planetary gears and the ring gears.

In this case, as also described, the input sun gear may be arranged in the complex planetary gear unit to be meshed with the first planetary gear. That is, the first planetary gear is meshed not only with the first ring gear but also with the input sun gear so that the input torque may be delivered to the carrier through the input sun gear. For this reason, the speed reducing ratio of the complex planetary gear unit may be further increased by the input sun gear, and hence the complex planetary gear unit may be further downsized. The complex planetary gear unit thus downsized may be mounted on a vehicle to serve as a differential mechanism or a torque vectoring device.

In addition, the first rotary shaft may be connected to one of the right and left wheels to transmit the torque between the second gear and one of the right and left wheels, and the second rotary shaft may be connected to other one of the right and left wheels to transmit the torque between and the third gear and other one of the right and left wheels. According to the exemplary embodiment of the present disclosure, therefore, the complex planetary gear unit may be mounted on a vehicle to serve as a torque vectoring device.

Instead, the first rotary shaft may also be connected to one of the front and rear wheels to transmit the torque between the second gear and one of the front and rear wheels, and the second rotary shaft may be connected to other one of the front and rear wheels to transmit the torque between and the third gear and other one of the front and rear wheels. According to the exemplary embodiment of the present disclosure, therefore, the complex planetary gear unit may be mounted on a vehicle to serve as a torque vectoring device.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 10A is a table indicating a relation between the numbers of teeth of the gears and a speed reducing ratio of the complex planetary gear unit according to the third example in a case of rotating the output shaft in the forward direction, and FIG. 10B is a graph indicating a relation between the number of teeth of the first planetary gear and the speed reducing ratio of the complex planetary gear unit according to the third example in the case of rotating the output shaft in the forward direction;

FIG. 11B is a graph indicating a relation between the number of teeth of the first planetary gear and the speed reducing ratio of the complex planetary gear unit according to the third example in the case of rotating the output shaft in the reverse direction;

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

First Example

Figure 1:
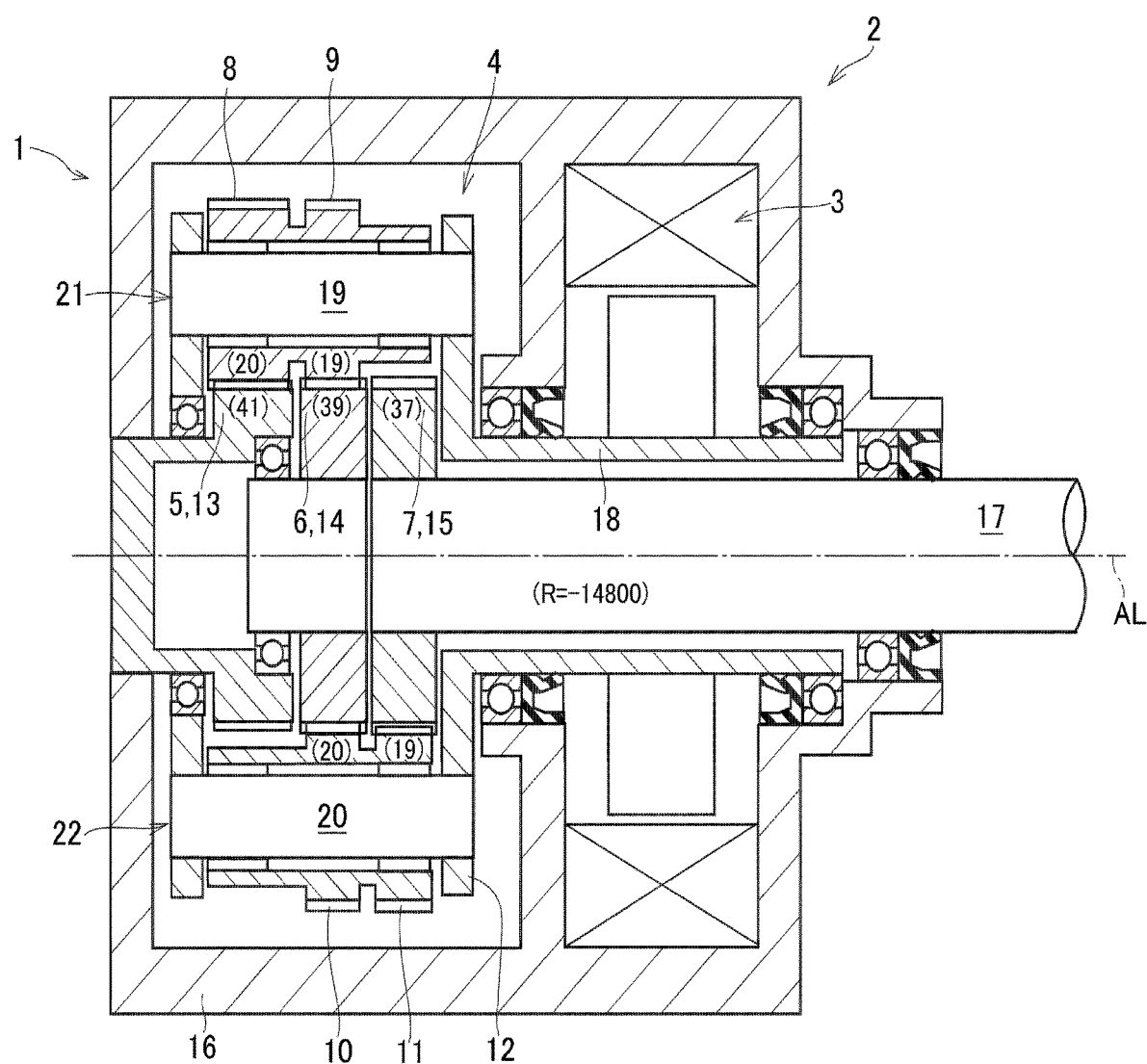
FIG. 1 is a cross-sectional view showing a structure of the complex planetary gear unit according to a first example of the present disclosure.

Referring now to FIG. 1, there is shown a structure of a complex planetary gear unit 1 according to the first example of the present disclosure. The complex planetary gear unit 1 is arranged in so-called a "geared motor" 2 as a drive unit comprising an electric motor 3 and a reduction mechanism 4 as a gear head. The complex planetary gear unit 1 is combined with the electric motor 3 to serve as the reduction mechanism 4 that can achieve a relatively larger speed reducing ratio.

For example, a permanent magnet type synchronous motor or an induction motor may be adopted as the electric motor 3, and the electric motor 3 generates a torque including a drive torque and a regenerative torque. The electric motor 3 and the complex planetary gear unit 1 are arranged coaxially along a rotational center axis AL.

According to the first example, the complex planetary gear unit 1 comprises a first gear 5, a second gear 6, a third gear 7, a first planetary gear 8, a second planetary gear 9, a third planetary gear 10, a fourth planetary gear 11, and a carrier 12.

In the complex planetary gear unit 1 shown in FIG. 1, the first gear 5, the second gear 6, and the third gear 7 are arranged in order along the rotational center axis AL while being allowed to rotate relatively to one another.

In the complex planetary gear unit 1 shown in FIG. 1, a first sun gear 13 meshing with the first planetary gear 8 serves as the first gear 5, a second sun gear 14 meshing with the second planetary gear 9 and the third planetary gear 10 serves as the second gear 6, and a third sun gear 15 meshing with the fourth planetary gear 11 serves as the third gear 7.

The first sun gear 13 is fixed to a case 16 of the complex planetary gear unit 1 and the geared motor 2. That is, first sun gear 13 is not allowed to rotate. The second sun gear 14 is supported by a bearing (not shown) interposed between the first sun gear 13 and the second sun gear 14 so that the second sun gear 14 is allowed to rotate relatively to the first sun gear 13. The third sun gear 15 is arranged in an opposite side to the first sun gear 13 across the second sun gear 14, and the third sun gear 15 is also allowed to rotate relatively to the first sun gear 13. That is, the second sun gear 14 and the third sun gear 15 rotate relatively to each other. Specifically, the third sun gear 15 is mounted on an output shaft 17 to rotate integrally with the output shaft 17, and is supported by a bearing (not shown) arranged between the third sun gear 15 and the case 16 so that the third sun gear 15 and the output shaft 17 rotate relatively to the case 16. The output shaft 17 extends coaxially with the sun gears 13, 14, and 15 along the rotational center axis AL to penetrates through a hollow space of a rotary shaft 18 of the electric motor 3, and a leading end of the output shaft 17 protrudes from the case 16. That is, a torque of the electric motor 3 is multiplied by the complex planetary gear unit 1 serving as the reduction mechanism 4, and delivered to a predetermined rotary member through the output shaft 17.

Specifically, the first planetary gear 8 revolves around the first gear 5, the second planetary gear 9 revolves around the second gear 6, the third planetary gear 10 also revolves around the second gear 6, and the fourth planetary gear 11 revolves around the third gear 7.

In other words, according to the first example, the first planetary gear 8 revolves around the first sun gear 13, the second planetary gear 9 revolves around the second sun gear 14, the third planetary gear 10 also revolves around the second sun gear 14, and the fourth planetary gear 11 revolves around the third sun gear 15.

The first planetary gear 8 and the second planetary gear 9 are arranged coaxially with each other on a rotary shaft 19 to rotate integrally on the rotary shaft 19 and to revolve around the rotational center axis AL integrally. Likewise, the third planetary gear 10 and the fourth planetary gear 11 are arranged coaxially with each other on a rotary shaft 20 to rotate integrally on the rotary shaft 20 and to revolve around the rotational center axis AL. According to the embodiment of the present disclosure, as the first example shown in FIG. 1, the first planetary gear 8 and the second planetary gear 9 may be formed integrally, and the third planetary gear 10 and the fourth planetary gear 11 may be formed integrally.

The first planetary gear 8 and the second planetary gear 9 may be rotated not only integrally with the rotary shaft 19 but also relatively to the rotary shaft 19. Likewise, the third planetary gear 10 and the fourth planetary gear 11 may be rotated not only integrally with the rotary shaft 20 but also relatively to the rotary shaft 20. In the complex planetary gear unit shown in FIG. 1, the first planetary gear 8 and the second planetary gear 9 are rotated relatively to the rotary shaft 19, and the third planetary gear 10 and the fourth planetary gear 11 are rotated relatively to the rotary shaft 20.

One end of the carrier 12 is supported by a bearing and other end of the carrier 12 is mounted on the output shaft 17 while being supported by the case 16 through another bearing so that the carrier 12 rotate relatively to the first gear 5. As described, the second gear 6 and the third gear 7 rotate relatively to each other. Specifically, the carrier 12 supports the first planetary gear 8 and the second planetary gear 9 mounted on the rotary shaft 19 in a rotatable manner, and supports the third planetary gear 10 and the fourth planetary gear 11 mounted on the rotary shaft 20 in a rotatable manner.

Thus, a first planetary set 21 comprises the first planetary gear 8, the second planetary gear 9, and the rotary shaft 19. On the other hand, a second planetary set 22 comprises the third planetary gear 10, the fourth planetary gear 11, and the rotary shaft 20. That is, the first planetary set 21 and the second planetary set 22 are arranged parallel to each other and revolve around the rotational center axis AL. In the complex planetary gear unit 1 shown in FIG. 1, at least one set of the first planetary set 21 and at least one set of the second planetary set 22 are arranged. For example, two or more sets of the first planetary sets 21 and two or more sets of the second planetary set 22 may also be arranged in the complex planetary gear unit 1 at regular intervals around the rotational center axis AL.

The carrier 12 is connected to the rotary shaft 18 of the electric motor 3 extending concentrically with the output shaft 17 so that the carrier 12 rotates integrally with the rotary shaft 18. Accordingly, in the complex planetary gear unit 1, the carrier 12 serves as an input element, the first sun gear 13 fixed to the case 16 serves as a reaction element, and the third sun gear 15 connected to the output shaft 17 serves as an output element. The second sun gear 14 serves as a counter gear with respect to the third sun gear 15. That is, the second sun gear 14 rotates in an opposite direction to a rotational direction of the third sun gear 15.

According to the first example, the complex planetary gear unit 1 shown in FIG. 1 is adapted to achieve a speed reducing ratio comparable to that of a complex planetary gear unit having four sets of planetary gear units. Specifically, the complex planetary gear unit 1 comprises: a first complex planetary gear set having the first planetary gear 8, the second planetary gear 9, the first gear 5, and the second gear 6; and a second complex planetary gear set having the third planetary gear 10, the fourth planetary gear 11, the second gear 6, and the third gear 7. Thus, the second gear 6 is used commonly in the first complex planetary gear set and the second complex planetary gear set. Therefore, the complex planetary gear unit 1 may be downsized to a size comparable to that of a complex planetary gear unit in which three sets of planetary gear units are arranged coaxially. As explained later, the complex planetary gear unit 1 may achieve a speed reducing ratio comparable to that of a complex planetary gear unit formed by combining four sets of planetary gear units, or a speed reducing ratio comparable to that of a complex planetary gear unit formed by combining two sets of complex planetary gear units.

In the complex planetary gear unit 1, a gear ratio between the first planetary gear 8 and the first gear 5 and a gear ratio between the second planetary gear 9 and the second gear 6 are set to different ratios. Likewise, a gear ratio between the third planetary gear 10 and the second gear 6 and a gear ratio between the fourth planetary gear 11 and the third gear 7 are set to different ratios. That is, in the complex planetary gear unit 1 shown in FIG. 1, a gear ratio between the first planetary gear 8 and the first sun gear 13 and a gear ratio between the second planetary gear 9 and the second sun gear 14 are set to different ratios. Likewise, a gear ratio between the third planetary gear 10 and the second sun gear 14 and a gear ratio between the fourth planetary gear 11 and the third sun gear 15 are set to different ratios.

Specifically, a gear ratio $u_1$ between the first planetary gear 8 and the first sun gear 13 and a gear ratio $u_2$ between the second planetary gear 9 and the second sun gear 14 are different from each other. Likewise, a gear ratio $u_3$ between the third planetary gear 10 and the second sun gear 14 and a gear ratio $u_4$ between the fourth planetary gear 11 and the third sun gear 15 are different from each other. According to the first example, the gear ratio $u_1$ is defined as a ratio of the number of teeth $z_{p1}$ of the first planetary gear 8 to the number of teeth $z_{s1}$ of the first sun gear 13, the gear ratio $u_2$ is defined as a ratio of the number of teeth $z_{p2}$ of the second planetary gear 9 to the number of teeth $z_{s2}$ of the second sun gear 14, the gear ratio $u_3$ is defined as a ratio of the number of teeth $z_{p3}$ of the third planetary gear 10 to the number of teeth $z_{s2}$ of the second sun gear 14, and the gear ratio $u_4$ is defined as a ratio of the number of teeth $z_{p4}$ of the fourth planetary gear 11 to the number of teeth $z_{s3}$ of the third sun gear 15.

In the accompanying drawings, the numbers of teeth of the gears are indicated in brackets. In the complex planetary gear unit 1 shown in FIG. 1, the number of teeth $z_{p1}$ of the first planetary gear 8 is 20, the number of teeth $z_{p2}$ of the second planetary gear 9 is 19, the number of teeth $z_{s1}$ of the first sun gear 13 is 41, and the number of teeth $z_{s2}$ of the second sun gear 14 is 39. Accordingly, the gear ratio $u_1$ between the first planetary gear 8 and the first sun gear 13 may be expressed as:

$$u_1 = z_{p1}/z_{s1} = 20/41 \approx 0.4878; \text{ and}$$

the gear ratio $u_2$ between the second planetary gear 9 and the second sun gear 14 may be expressed as:

$$u_2 = z_{p2}/z_{s2} = 19/39 \approx 0.4871.$$

As described, the number of teeth $z_{p1}$ of the first planetary gear 8 is one more than the number of teeth $z_{p2}$ of the second planetary gear 9, and the number of teeth $z_{s1}$ of the first sun gear 13 is two more than the number of teeth $z_{s2}$ of the second sun gear 14. For these reasons, the gear ratio $u_1$ and the gear ratio $u_2$ are slightly different from each other.

On the other hand, the number of teeth $z_{p3}$ of the third planetary gear 10 is 20, the number of teeth $z_{p4}$ of the fourth planetary gear 11 is 19, the number of teeth $z_{s2}$ of the second sun gear 14 is 39, and the number of teeth $z_{s3}$ of the third sun gear 15 is 37. Accordingly, the gear ratio $u_3$ between the third planetary gear 10 and the second sun gear 14 may be expressed as:

$$u_3 = z_{p3}/z_{s2} = 20/39 \approx 0.5128; \text{ and}$$

the gear ratio $u_4$ between the fourth planetary gear 11 and the third sun gear 15 may be expressed as:

$$u_4 = z_{p4}/z_{s3} = 19/37 \approx 0.5135.$$

As described, the number of teeth $z_{p3}$ of the third planetary gear 10 is one more than the number of teeth $z_{p4}$ of the fourth planetary gear 11, and the number of teeth $z_{s2}$ of the second sun gear 14 is two more than the number of teeth $z_{s3}$ of the third sun gear 15. For these reasons, the gear ratio $u_3$ and the gear ratio $u_4$ are slightly different from each other.

As described, the complex planetary gear unit 1 is formed by combining the first complex planetary gear set with the second complex planetary gear set. According to the first example shown in FIG. 1, the first complex planetary gear set comprises the first planetary gear 8, the second planetary gear 9, the first sun gear 13, and the second sun gear 14. On the other hand, the second complex planetary gear set comprises the third planetary gear 10, the fourth planetary gear 11, the second sun gear 14, and the third sun gear 15.

Thus, in the first complex planetary gear set, the gear ratio $u_1$ and the gear ratio $u_2$ are slightly different from each other. Given that the gear ratio $u_1$ and the gear ratio $u_2$ are equal, a speed reducing ratio of the first complex planetary gear set as a speed ratio of an output element to an input element would reach an infinite value, and the first complex planetary gear set would not function properly. Whereas, since the gear ratio $u_1$ and the gear ratio $u_2$ are set to different values, the speed reducing ratio of the complex planetary gear unit 1 shown in FIG. 1 can be increased while preventing the speed reducing ratio of the first complex planetary gear set from reaching the infinite value. For example, the speed reducing ratio of the first complex planetary gear set may be reduced by increasing the difference between the gear ratio $u_1$ and the gear ratio $u_2$. By contrast, the speed reducing ratio of the first complex planetary gear set may be increased by reducing the difference between the gear ratio $u_1$ and the gear ratio $u_2$.

Specifically, the speed reducing ratio $R_1$ of the first complex planetary gear set may be expressed as:

$$R_1 = 1/\{1 - (z_{s1}/z_{p1}) \cdot (z_{p2}/z_{s2})\}$$
$$= 1/\{1 - (41/20) \cdot (19/39)\}$$
$$\approx 780.$$

In general, a speed reducing ratio achieved by the conventional planetary gear sets falls within a range of approximately 4 to 10. Thus, the speed reducing ratio $R_1$ of the first complex planetary gear set is significantly greater than the speed reducing ratio of the conventional planetary gear sets.

Likewise, in the second complex planetary gear set, the gear ratio $u_3$ and the gear ratio $u_4$ are slightly different from each other. Given that the gear ratio $u_3$ and the gear ratio $u_4$ are equal, a speed reducing ratio of the second complex planetary gear set would reach an infinite value, and the second complex planetary gear set would not function properly. Whereas, since the gear ratio $u_3$ and the gear ratio $u_4$ are set to different values, the speed reducing ratio of the complex planetary gear unit 1 shown in FIG. 1 can be increased while preventing the speed reducing ratio of the second complex planetary gear set from reaching the infinite value. For example, the speed reducing ratio of the second complex planetary gear set may be reduced by increasing the difference between the gear ratio $u_3$ and the gear ratio $u_4$. By contrast, the speed reducing ratio of the second complex planetary gear set may be increased by reducing the difference between the gear ratio $u_3$ and the gear ratio $u_4$.

Specifically, the speed reducing ratio $R_2$ of the second complex planetary gear set may be expressed as:

$$R_2 = 1/\{1 - (z_{s2}/z_{p3}) \cdot (z_{p4}/z_{s3})\}$$
$$= 1/\{1 - (39/20) \cdot (19/37)\}$$
$$\approx -740.$$

As described, the speed reducing ratio achieved by the conventional planetary gear sets falls within a range of approximately 4 to 10. Thus, the speed reducing ratio $R_2$ of the second complex planetary gear set is greater than the speed reducing ratio of the conventional planetary gear sets. In the second complex planetary gear set, a rotational direction of the third sun gear 15 serving as an output element is reversed to the direction opposite to the rotational direction of the second sun gear 14 serving as an input element. In the description of the present disclosure, therefore, the speed reducing ratio $R_2$ of the second complex planetary gear set is referred to as a negative value (e.g., −740) for the sake of convenience.

In the complex planetary gear unit 1 shown in FIG. 1, a speed of the second gear 6 (i.e., the second sun gear 14) is reduced with respect to a speed of the carrier 12 serving as an input element of the complex planetary gear unit 1, and a speed of the third gear 7 (i.e., the third sun gear 15) serving as an output element of the complex planetary gear unit 1 is further reduced with respect to the speed of the second gear 6. In other words, a torque delivered to the carrier 12 is delivered to the second gear 6 while being multiplied by the first complex planetary gear set, and further delivered to the third gear 7 while being further multiplied by the second complex planetary gear set. Accordingly, a speed reducing ratio R of the complex planetary gear unit 1 may be calculated based on the speed reducing ratio $R_1$ of the first complex planetary gear set and the speed reducing ratio $R_2$ of the second complex planetary gear set using the following formula:

$$R = 1/\{1/R_1 + (1 - 1/R_1)/R_2\}$$
$$= 1/\{1/780 + (1 - 1/780) \cdot (-740)\}$$
$$\approx -14800.$$

Thus, the speed reducing ratio R of the complex planetary gear unit 1 is significantly larger than speed reducing ratios of conventional magical planetary gear speed reducers and strain wave gearings. In the complex planetary gear unit 1, a rotational direction of the third sun gear 15 serving as the output element is reversed to the direction opposite to the rotational direction of the carrier 12 serving as an input element. In the description of the present disclosure, therefore, the speed reducing ratio R of the complex planetary gear unit 1 is referred to as a negative value (e.g., −14800) for the sake of convenience.

In the complex planetary gear unit 1 shown in FIG. 1, the carrier 12 as the input element is rotated in the forward direction when the electric motor 3 is rotated in the forward direction (i.e., clockwise), and in this situation, the third sun gear 15 as the output element is rotated in the reverse direction (i.e., counterclockwise). According to the first example, the speed reducing ratio R of the complex planetary gear unit 1 may be changed by changing the numbers of teeth of the gears 5, 6, and 7, and the planetary gears 8, 9, 10, and 11. In addition, the rotational direction of the third gear 7 as the output element may be switched by changing the numbers of teeth of the gears 5, 6, and 7, and the planetary gears 8, 9, 10, and 11.

As described, in the complex planetary gear unit 1 shown in FIG. 1, the first sun gear 13 serves as the first gear 5, the second sun gear 14 serves as the second gear 6, and the third sun gear 15 serves as the third gear 7. In the complex planetary gear unit 1 thus structured, the rotational direction of the third sun gear 15 may be switched arbitrarily between the forward direction and the reverse direction by adjusting the numbers of teeth of the gears in such a manner as to satisfy all of the following relational expressions.

For example, in a case of rotating the third sun gear 15 in the forward direction, the numbers of teeth $z_{p1}$, $z_{p2}$, $z_{p3}$, $z_{p4}$, $z_{s1}$, $z_{s2}$, and $z_{s3}$ of the first planetary gear 8, the second planetary gear 9, the third planetary gear 10, the fourth planetary gear 11, the first sun gear 13, the second sun gear 14, and the third sun gear 15 are set such that all of the following relational expressions are satisfied:

$$z_{p1}=z_{p3};$$

$$z_{p2}=z_{p4}=z_{p1}+1;$$

$$z_{s1}=z_{p1}\cdot 2-1;$$

$$z_{s2}=z_{p1}\cdot 2+1;\text{ and}$$

$$z_{s3}=+z_{p1}\cdot 2-3.$$

In this case, the output shaft 17 is rotated in the forward direction as the carrier 12 at a speed slower than that of the carrier 12.

By contrast, in a case of rotating the third sun gear 15 in the reverse direction, the numbers of teeth $z_{p1}$, $z_{p2}$, $z_{p3}$, $z_{p4}$, $z_{s1}$, $z_{s2}$, and $z_{s3}$ of the first planetary gear 8, the second planetary gear 9, the third planetary gear 10, the fourth planetary gear 11, the first sun gear 13, the second sun gear 14, and the third sun gear 15 are set such that all of the following relational expressions are satisfied:

$$z_{p1}=z_{p3};$$

$$z_{p2}=z_{p4}=z_{p1}-1$$

$$z_{s1}=z_{p1}\cdot 2+1;$$

$$z_{s2}=z_{p1}\cdot 2-1;\text{ and}$$

$$z_{s3}=z_{p1}\cdot 2-3.$$

In this case, the output shaft 17 is rotated in the reverse direction opposite to the rotational direction of the carrier 12, at a speed slower than that of the carrier 12.

Figure 2:
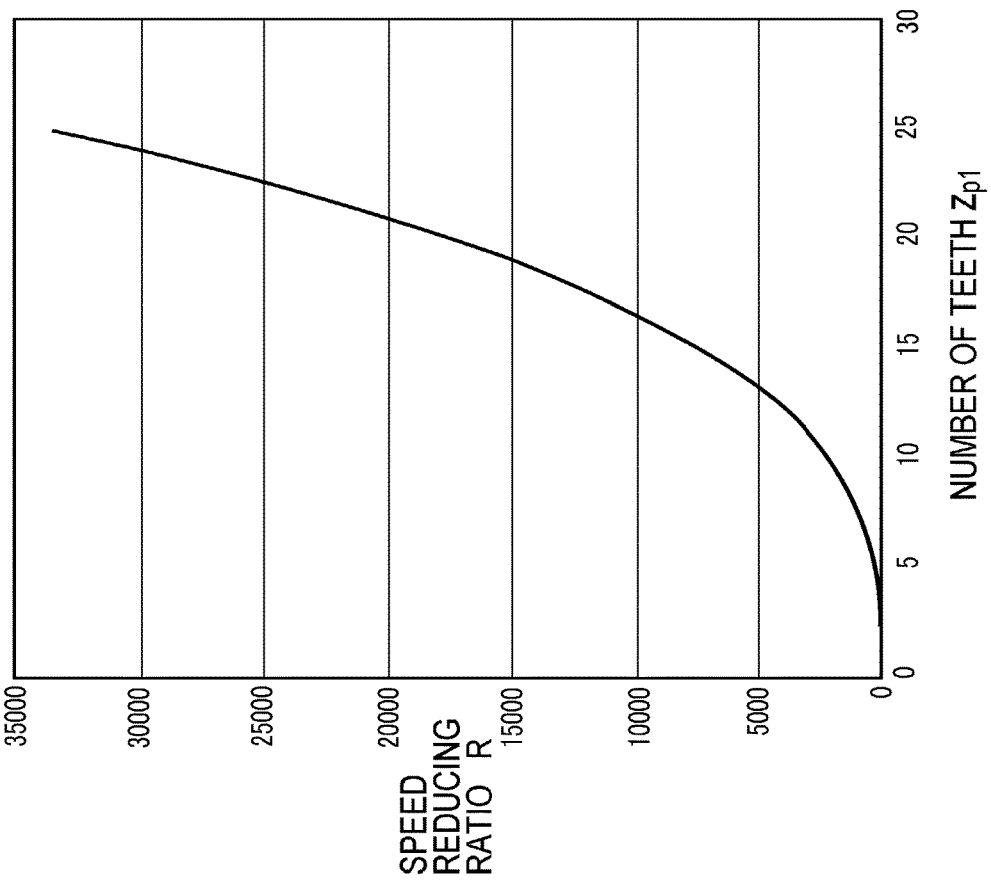
FIG. 2A is a table indicating a relation between the numbers of teeth of the gears and a speed reducing ratio of the complex planetary gear unit according to the first example in a case of rotating the output shaft in the forward direction.
FIG. 2B is a graph indicating a relation between the number of teeth of the first planetary gear and the speed reducing ratio of the complex planetary gear unit according to the first example in the case of rotating the output shaft in the forward direction.
Figure 3:
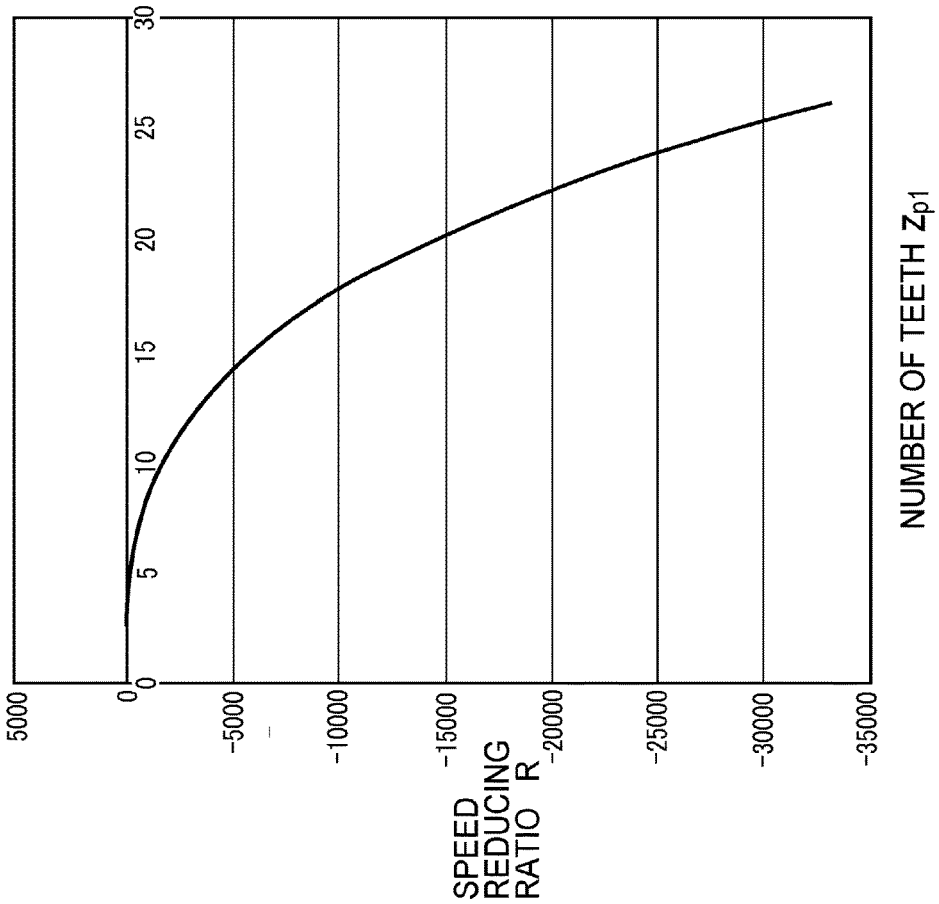
FIG. 3A is a table indicating a relation between the numbers of teeth of the gears and a speed reducing ratio of the complex planetary gear unit according to the first example in a case of rotating the output shaft in the reverse direction.
FIG. 3B is a graph indicating a relation between the number of teeth of the first planetary gear and the speed reducing ratio of the complex planetary gear unit according to the first example, in the case of rotating the output shaft in the reverse direction.

FIG. 2A is a table indicating a relation between the numbers of teeth $z_{p1}$, $z_{p2}$, $z_{p3}$, $z_{p4}$, $z_{s1}$, $z_{s2}$, and $z_{s3}$ of the above-mentioned gears and the speed reducing ratio R of the complex planetary gear unit 1 in the case of rotating the output shaft 17 in the forward direction, and FIG. 2B is a graph indicating a relation between the number of teeth $z_{p1}$ of the first planetary gear 8 and the speed reducing ratio R of the complex planetary gear unit 1 in the case of rotating the output shaft 17 in the forward direction. On the other hand, FIG. 3A is a table indicating a relation between the numbers of teeth $z_{p1}$, $z_{p2}$, $z_{p3}$, $z_{p4}$, $z_{s1}$, $z_{s2}$, and $z_{s3}$ of the above-mentioned gears and the speed reducing ratio R of the complex planetary gear unit 1 in the case of rotating the output shaft 17 in the reverse direction, and FIG. 2B is a graph indicating a relation between the number of teeth $z_{p1}$ of the first planetary gear 8 and the speed reducing ratio R of the complex planetary gear unit 1 in the case of rotating the output shaft 17 in the reverse direction. As can be seen from FIGS. 2A, 2B, 3A, and 3B, the speed reducing ratio R of the complex planetary gear unit 1 may be changed within a range from approximately 30 to more than 33000. Thus, the complex planetary gear unit 1 shown in FIG. 1 may achieve the speed reducing ratio greater than 30000.

In addition, as described, all of the first gear 5, the second gear 6, and the third gear 7 are external gears. That is, the complex planetary gear unit 1 shown in FIG. 1 is formed by combining the first complex planetary gear set with the second complex planetary gear set each of which does not have a ring gear. For this reason, a size of the complex planetary gear unit 1 shown in FIG. 1 can be reduced in the radial direction.

Figure 4:
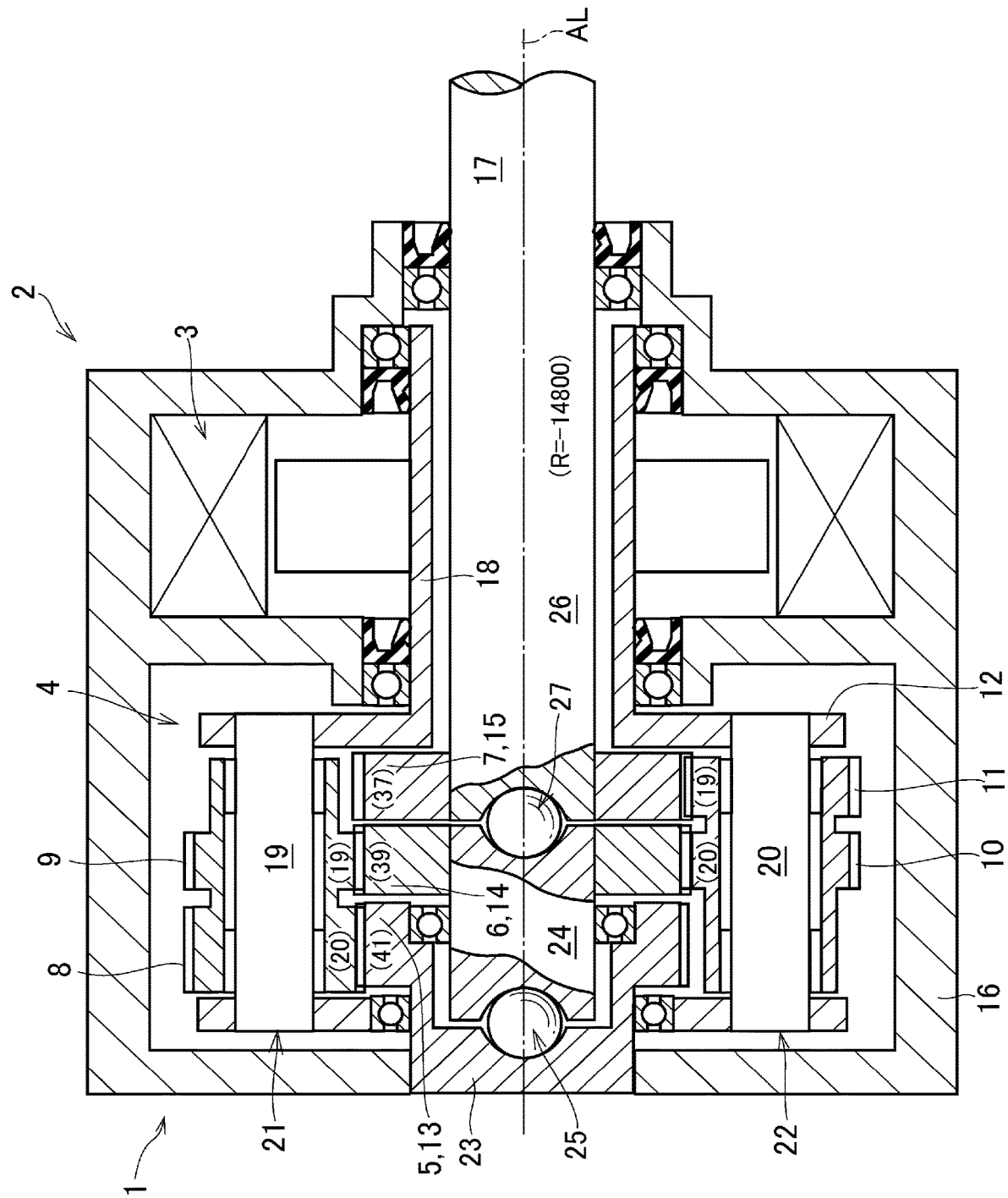
FIG. 4 is a cross-sectional view showing a structure of the complex planetary gear unit according to a first modification example of the first example.
Figure 5:
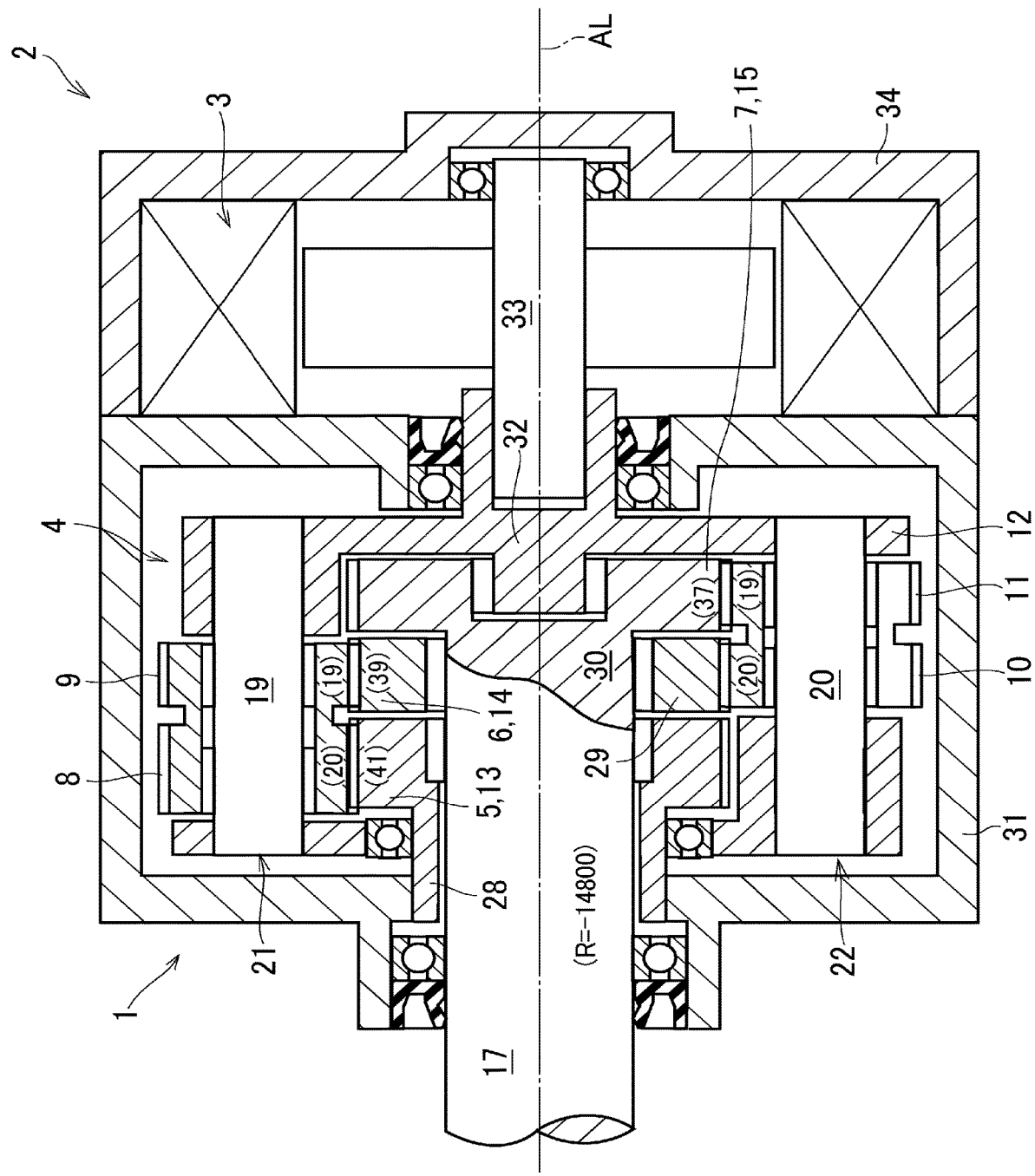
FIG. 5 is a cross-sectional view showing a structure of the complex planetary gear unit according to a second modification example of the first example.
Figure 6:
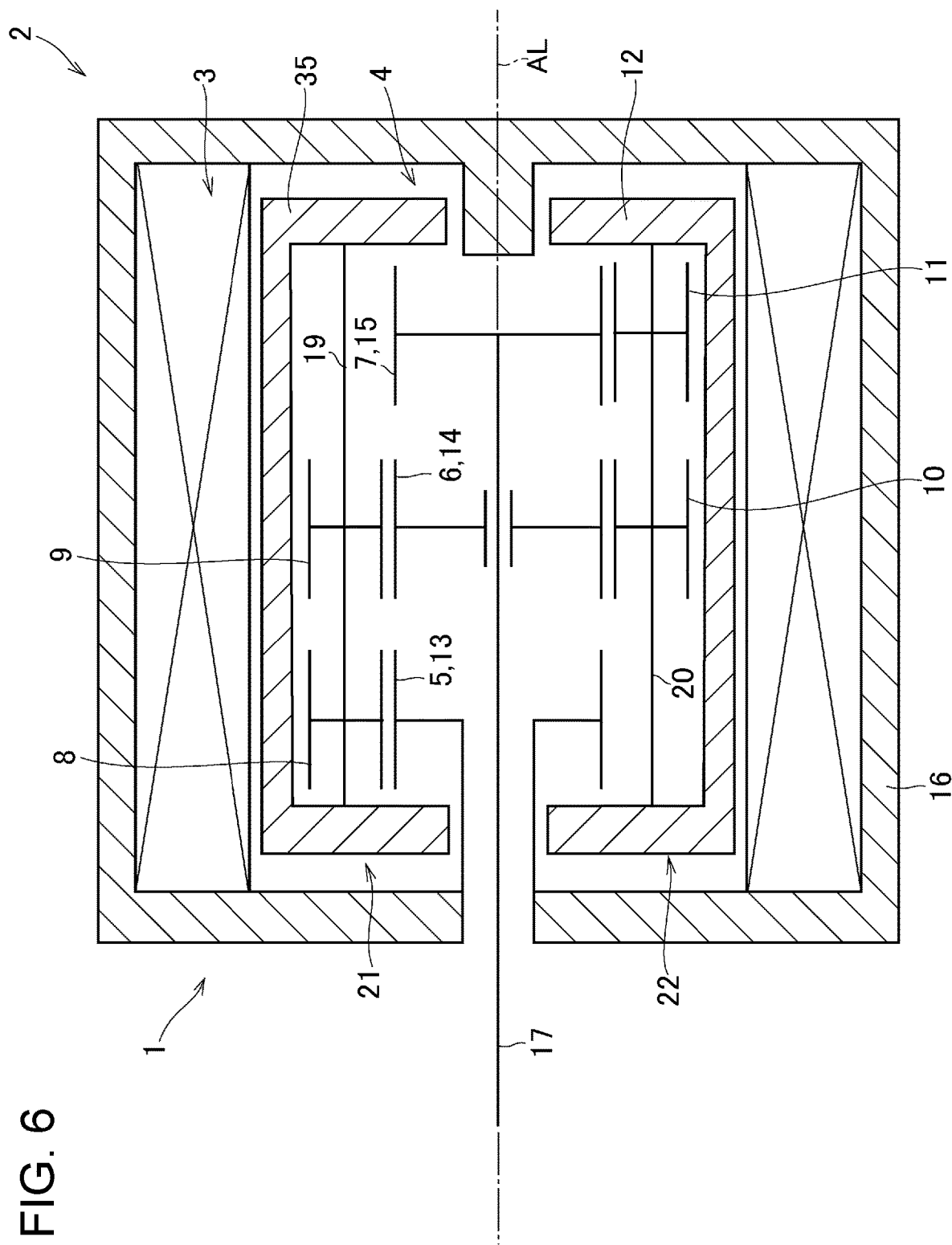
FIG. 6 is a cross-sectional view showing a structure of the complex planetary gear unit according to a third modification example of the first example.

Modifications of the complex planetary gear unit 1 shown in FIG. 1 are shown in FIG. 4 to 6. In FIGS. 4 to 6, common reference numerals are assigned to the elements in common with those of the complex planetary gear unit 1 shown in FIG. 1.

Turing to FIG. 4, there is shown a first modification example of the complex planetary gear unit 1 shown in FIG. 1. In the complex planetary gear unit 1 shown in FIG. 4, a fixed shaft 23 is formed integrally with the first sun gear 13, and fixed to the case 16. A thrust bearing 25 is interposed between the fixed shaft 23 of the first sun gear 13 and a rotary shaft 24 of the second sun gear 14. In addition, a thrust bearing 27 is interposed between the rotary shaft 24 of the second sun gear 14 and a rotary shaft 26 of the third sun gear 15. The rotary shaft 26 of the third sun gear 15 is joined to the output shaft 17 to rotate integrally therewith.

In the complex planetary gear unit 1, in order to suppress noise by increasing each meshing area between the gears, it is preferable to use a helical gear as each of the gears 5, 6, 7, and each of the planetary gears 8, 9, 10, and 11. However, during torque transmission, a thrust force is generated inevitably by the helical gears in the direction of the rotational center axis AL. In order to reduce friction and noise derived from the axial thrust force, in the complex planetary gear unit 1 shown in FIG. 4, the thrust bearing 25 is interposed between the fixed shaft 23 and the rotary shaft 24, and the thrust bearing 27 is interposed between the rotary shaft 24 and the rotary shaft 26. For this reason, damage on the complex planetary gear unit 1 shown in FIG. 4 can be limited.

FIG. 5 shows a second modification example of the complex planetary gear unit 1 shown in FIG. 1. In the complex planetary gear unit 1 shown in FIG. 5, in order to assemble the reduction mechanism 4 easily with the electric motor 3, a motor case 34 of the electric motor 3 is formed separately from a case 31 of the reduction mechanism 4. Specifically, according to the second modification example, a fixed shaft 28 of the first sun gear 13 and a rotary shaft 29 of the second sun gear 14 are formed into a hollow shaft, respectively. A rotary shaft 30 of the third sun gear 15 is joined to the output shaft 17 to rotate integrally therewith, and a unit of the rotary shaft 30 and the output shaft 17 penetrates through hollow spaces of the fixed shaft 28 and the rotary shaft 29. A leading end of the output shaft 17 protrudes from one side of the case 31 of the reduction mechanism 4. On the other hand, a rotary shaft 32 of the carrier 12 protrudes from the other side of the case 31 to be joined to a rotary shaft 33 of the electric motor 3 through e.g., a spline so that the rotary shaft 32 of the carrier 12 rotates integrally with rotary shaft 33 of the electric motor 3. The motor case 34 of the electric motor 3 is joined to the case 31 of the reduction mechanism 4 from axially outer side of the electric motor 3 so that the electric motor 3 is held in the motor case 34. According to second modification example, therefore, the electric motor 3 may be attached easily to the complex planetary gear unit 1 after assembling to the complex planetary gear unit 1. For this reason, the geared motor 2 may be assembled separately from the complex planetary gear unit 1, and in addition, the electric motor 3 may be replaced easily with a new one.

FIG. 6 shows a third modification example of the complex planetary gear unit 1 shown in FIG. 1. According to the third modification example, the complex planetary gear unit 1 is arranged radially inner side the electric motor 3. Specifically, in the geared-motor 2 shown in FIG. 6, the carrier 12 is formed integrally with a hollow rotor 35 of the electric motor 3, and the first planetary gear 8, the second planetary gear 9, the third planetary gear 10, and the fourth planetary gear 11 are held in a hollow space of the rotor 35 while being supported by the carrier 12 in a rotatable manner. That is, the complex planetary gear unit 1 is held in the hollow space of the rotor 35. According to the third modification example, therefore, the geared motor 2 may be downsized in the axial direction. In other words, an axial length of the geared motor 2 may be reduced.

Here will be explained other examples of the complex planetary gear unit 1. In the drawings to be explained hereinafter, common reference numerals are assigned to the elements in common with those of the complex planetary gear unit 1 according to the first example.

Second Example

Figure 7:
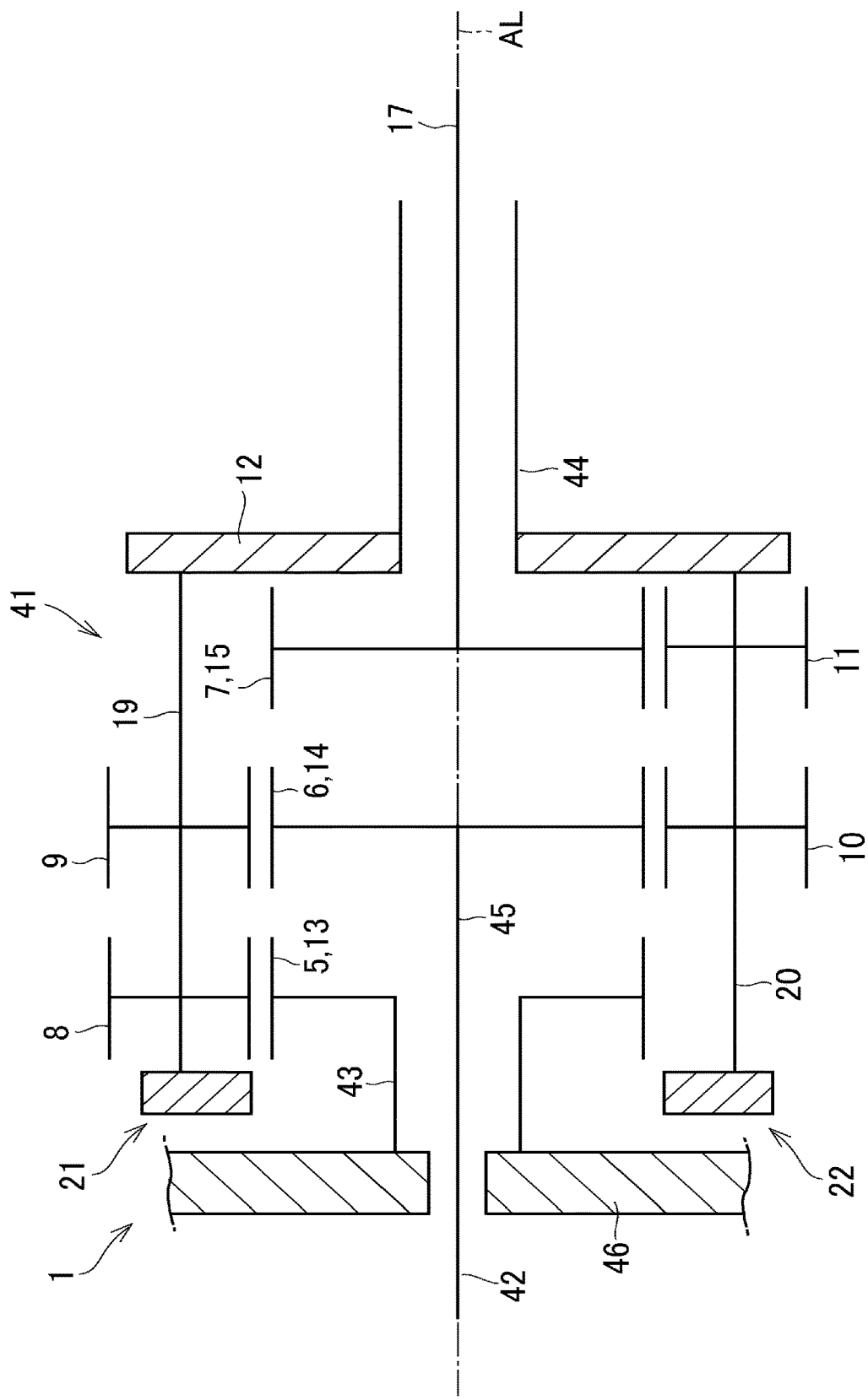
FIG. 7 is a schematic illustration showing a structure of the complex planetary gear unit according to the second example of the present disclosure.

Turning to FIG. 7, there is shown a structure of the complex planetary gear unit 1 according to the second example of the present disclosure. According to the second example, the complex planetary gear unit 1 is provided with two output shafts and a reversing mechanism 41 that allows the output shafts to rotate in opposite directions. As described, according to the first example, the second sun gear 14 serves as a counter gear with respect to the third sun gear 15, and the second sun gear 14 and the third sun gear 15 rotate in opposite directions. In the reversing mechanism 41, the second sun gear 14 is connected to a counter rotating shaft 42 that rotates in an opposite direction to a rotational direction of the output shaft 17 joined to the third sun gear 15.

Specifically, in the complex planetary gear unit 1 shown in FIG. 7, a fixed shaft 43 of the first sun gear 13 and a rotary shaft 44 of the carrier 12 are formed into a hollow shaft, respectively. The second sun gear 14 is connected to the counter rotating shaft 42 through a rotary shaft 45 so that the second sun gear 14 rotates integrally with the rotary shaft 45 and the counter rotating shaft 42. A unit of the rotary shaft 45 and the counter rotating shaft 42 penetrates through a hollow space of the fixed shaft 43, and a leading end of the counter rotating shaft 42 protrudes from one side of a case 46 of the complex planetary gear unit 1. On the other hand, the output shaft 17 penetrates through a hollow space of the rotary shaft 44, and a leading end of the output shaft 17 protrudes from the other side of the case 46 of the complex planetary gear unit 1.

The output shaft 17 and the counter rotating shaft 42 extend coaxially along the rotational center axis AL while being allowed to rotate relatively to each other. Specifically, the counter rotating shaft 42 rotates in the opposite direction to the rotational direction of the output shaft 17 to deliver the torque delivered from the second sun gear 14 to a predetermined rotary member. Otherwise, a torque delivered to the counter rotating shaft 42 from an external source may also be delivered to the second sun gear 14.

As described, in the complex planetary gear unit 1 shown in FIG. 7, the second sun gear 14 serving as a counter gear with respect to the third sun gear 15 is connected to the counter rotating shaft 42 so that the counter rotating shaft 42 rotates in the opposite direction to the rotational direction of the output shaft 17 joined to the third sun gear 15. That is, a rotational direction of the counter rotating shaft 42 is reversed with respect to the rotational direction of the output shaft 17 by the reversing mechanism 41 of compact size.

According to the second example, the input torque to the complex planetary gear unit 1 may be delivered to external rotary members not only through the output shaft 17 but also through the counter rotating shaft 42 while being multiplied.

The counter rotating shaft 42 may also serve as an input shaft of the complex planetary gear unit 1. Specifically, a torque may be applied to the counter rotating shaft 42 in the opposite direction to the rotational direction of the output shaft 17, and the torque applied to the counter rotating shaft 42 is delivered to the output shaft 17 while being multiplied. In order to apply the torque to the counter rotating shaft 42, for example, an assist motor (not shown) may be combined with the complex planetary gear unit 1.

Figure 8:
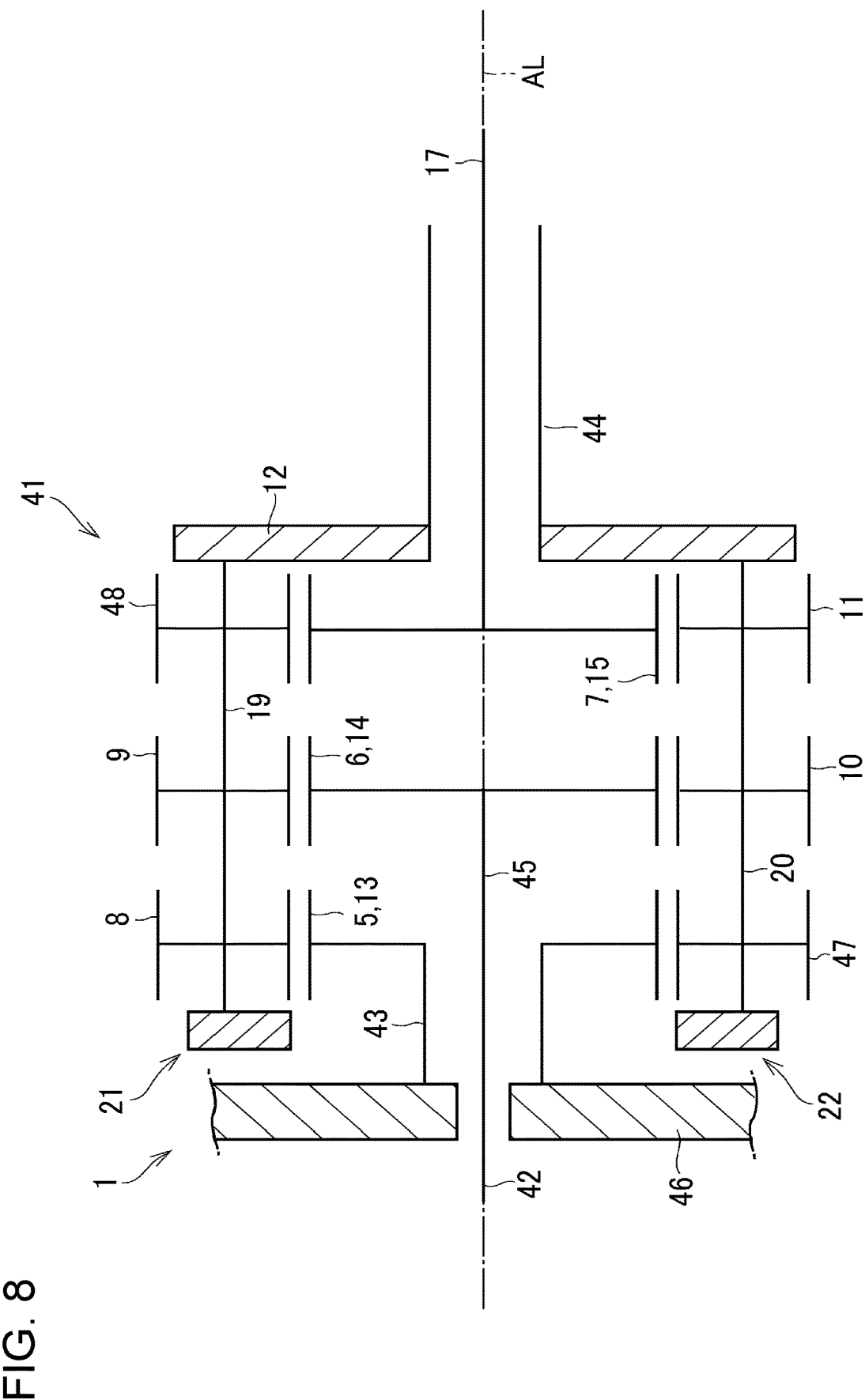
FIG. 8 is a schematic illustration showing a structure of a structure of the complex planetary gear unit according to a modification example of the second example.

Turning to FIG. 8, there is shown a modification example of the complex planetary gear unit 1 according to the second example. According to the modification example, in order to support the second sun gear 14, the third sun gear 15, and the carrier 12 in more stable manner, the complex planetary gear unit 1 is provided with a fifth planetary gear 47 as a counterpart of the first planetary gear 8, and a sixth planetary gear 48 as a counterpart of the fourth planetary gear 11.

The fifth planetary gear 47 is an external gear having same dimensions as the first planetary gear 8. That is, the number of teeth and a module of the fifth planetary gear 47 are identical to those of the first planetary gear 8. Specifically, the fifth planetary gear 47 is formed on the rotary shaft 20 to be rotated integrally with the third planetary gear 10 and the fourth planetary gear 11 while being meshed with the first sun gear 13. That is, the first sun gear 13 is meshed with both of the first planetary gear 8 and the fifth planetary gear 47. When the carrier 12 is rotated, the fifth planetary gear 47 is rotated at a same speed as the first planetary gear 8 to revolve around the first sun gear 13.

Likewise, the sixth planetary gear 48 is also an external gear having same dimensions as the fourth planetary gear 11. That is, the number of teeth and a module of the sixth planetary gear 48 are identical to those of the fourth planetary gear 11. Specifically, the sixth planetary gear 48 is formed on the rotary shaft 19 to be rotated integrally with the first planetary gear 8 and the second planetary gear 9 while being meshed with the third sun gear 15. That is, the third sun gear 15 is meshed with both of the fourth planetary gear 11 and the sixth planetary gear 48. When the carrier 12 is rotated, the sixth planetary gear 48 is rotated at a same speed as the fourth planetary gear 11 to revolve around the third sun gear 15.

In the complex planetary gear unit 1 shown in FIG. 8, therefore, the rotary shaft 19 of the first planetary set 21 may be supported equally by the first planetary gear 8, the second planetary gear 9, and the sixth planetary gear 48 to rotate stably while maintaining a balance. Likewise, the rotary shaft 20 of the second planetary set 22 may be supported equally by the third planetary gear 10, the fourth planetary gear 11, and the fifth planetary gear 47 to rotate stably while maintaining a balance. For these reasons, the carrier 12 as well as the second sun gear 14 and the third sun gear 15 are allowed to rotate in a stable manner so that output torques from the output shaft 17 and the counter rotating shaft 42 may be stabilized.

Third Example

Figure 9:
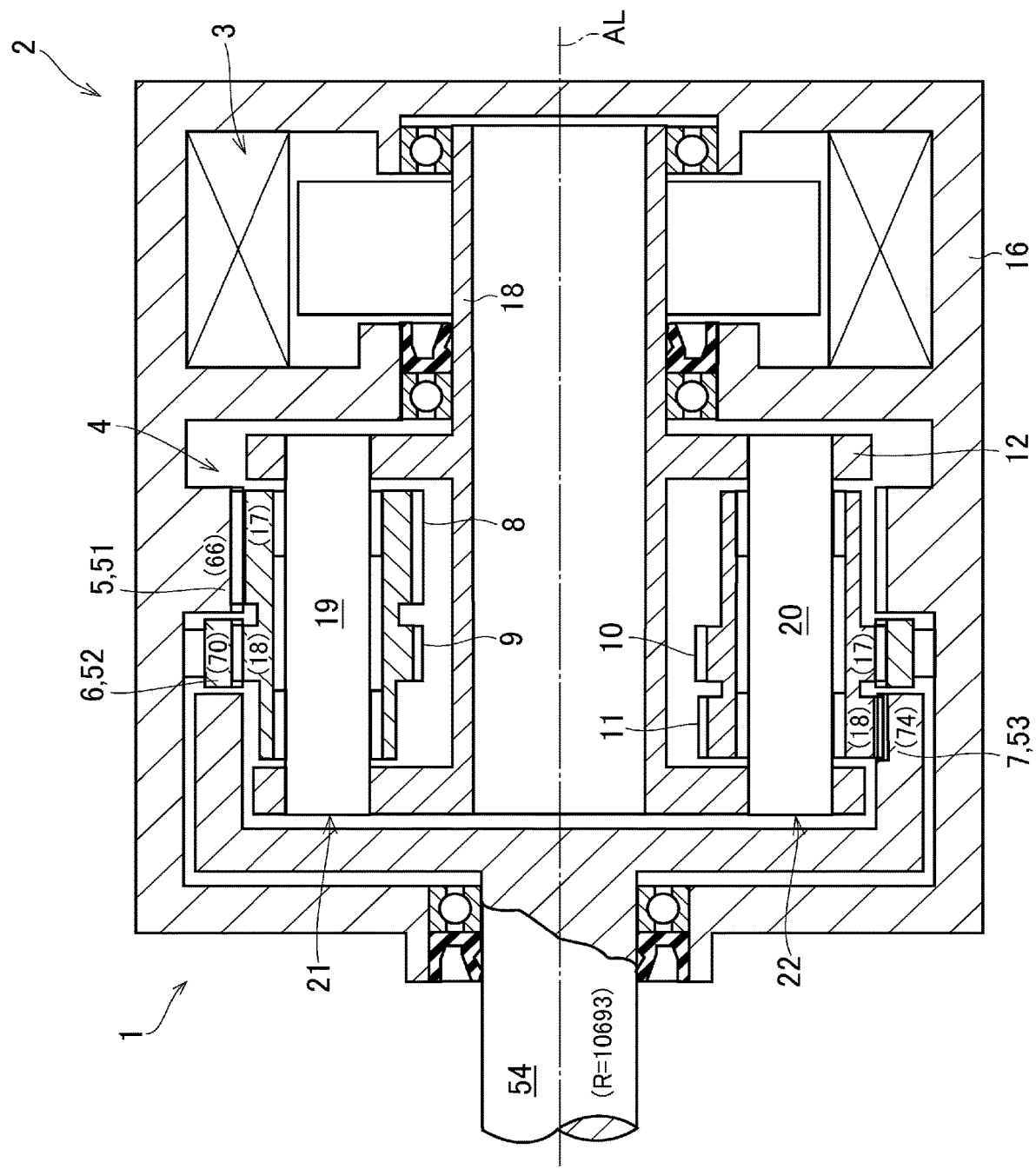
FIG. 9 is a cross-sectional view showing a structure of the complex planetary gear unit according to the third example of the present disclosure.

Turning to FIG. 9, there is shown a structure of a complex planetary gear unit 1 according to the third example of the present disclosure. In the complex planetary gear unit 1 shown in FIG. 9, an internal gear is adopted as the first gear 5, the second gear 6, and the third gear 7, respectively, and the third gear 7, the second gear 6, and the first gear 5 are arranged in order from left to right. According to the third example, a first ring gear 51 meshing with the first planetary gear 8 serves as the first gear 5, a second ring gear 52 meshing with the second planetary gear 9 and the third planetary gear 10 serves as the second gear 6, and a third ring gear 53 meshing with the fourth planetary gear 11 serves as the third gear 7.

Specifically, the first ring gear 51 is fixed to a case 16 of the complex planetary gear unit 1 and the geared motor 2. That is, the first ring gear 51 is not allowed to rotate. On the other hand, the second ring gear 52 and the third ring gear 53 are allowed to rotate relatively to the first ring gear 51, that is, the second ring gear 52 and the third ring gear 53 rotate relatively to each other. The third ring gear 53 is joined to an output shaft 54 to rotate integrally with the output shaft 54. Specifically, the output shaft 54 extends coaxially with the first ring gear 51, the second ring gear 52, and the third ring gear 53, and a leading end (i.e., a left end) of the output shaft 54 protrudes from the case 16. That is, a torque multiplied by the reduction mechanism 4 of the complex planetary gear unit 1 is delivered to a predetermined rotary member through the output shaft 54.

In the complex planetary gear unit 1 shown in FIG. 9, the first planetary gear 8 revolves around the rotary shaft 18 along internal teeth of the first ring gear 51, the second planetary gear 9 revolves around the rotary shaft 18 along internal teeth of the second ring gear 52, the third planetary gear 10 revolves around the rotary shaft 18 also along the internal teeth of the second ring gear 52, and the fourth planetary gear 11 revolves around the rotary shaft 18 along internal teeth of the third ring gear 53.

In the complex planetary gear unit 1 shown in FIG. 9, the carrier 12 serves as an input element, the first ring gear 51 fixed to the case 16 serves as a reaction element, and the third ring gear 53 joined to the output shaft 54 serves as an output element. The second ring gear 52 is not connected to the rotary members, and serves as a counter gear with respect to the third ring gear 53. That is, the second ring gear 52 rotates in an opposite direction to a rotational direction of the third ring gear 53.

According to the third example, the complex planetary gear unit 1 is adapted to achieve a speed reducing ratio comparable to that of a complex planetary gear unit having four sets of planetary gear units. Specifically, the complex planetary gear unit 1 shown in FIG. 9 comprises: a first complex planetary gear set having the first planetary gear 8, the second planetary gear 9, the first ring gear 51, and the second ring gear 52; and a second complex planetary gear set having the third planetary gear 10, the fourth planetary gear 11, the second ring gear 52, and the third ring gear 53. Thus, the second ring gear 52 is used commonly in the first complex planetary gear set and the second complex planetary gear set. Therefore, the complex planetary gear unit 1 shown in FIG. 9 may also be downsized to a size comparable to that of a complex planetary gear unit in which three sets of planetary gear units are arranged coaxially. As explained later, the complex planetary gear unit 1 shown in FIG. 9 may achieve a speed reducing ratio comparable to that of a complex planetary gear unit formed by combining four sets of planetary gear units, and to achieve a speed reducing ratio comparable to that of a complex planetary gear unit formed by combining two sets of complex planetary gear units.

In the complex planetary gear unit 1 shown in FIG. 9, a gear ratio between the first planetary gear 8 and the first ring gear 51 and a gear ratio between the second planetary gear 9 and the second ring gear 52 are set to different ratios. Likewise, a gear ratio between the third planetary gear 10 and the second ring gear 52 and a gear ratio between the fourth planetary gear 11 and the third ring gear 53 are set to different ratios.

Specifically, a gear ratio $u_{11}$ between the first planetary gear 8 and the first ring gear 51 and a gear ratio $u_{12}$ between the second planetary gear 9 and the second ring gear 52 are different from each other. Likewise, a gear ratio $u_{13}$ between the third planetary gear 10 and the second ring gear 52 and a gear ratio $u_{14}$ between the fourth planetary gear 11 and the third ring gear 53 are different from each other. According to the third example, the gear ratio $u_{11}$ is defined as a ratio of the number of teeth $z_{p1}$ of the first planetary gear 8 to the number of teeth $z_{r1}$ of the first ring gear 51, the gear ratio $u_{12}$ is defined as a ratio of the number of teeth $z_{p2}$ of the second planetary gear 9 to the number of teeth $z_{r2}$ of the second ring gear 52, the gear ratio $u_{11}$ is defined as a ratio of the number of teeth $z_{p3}$ of the third planetary gear 10 to the number of teeth $z_{r2}$ of the second ring gear 52, and the gear ratio $u_{14}$ is defined as a ratio of the number of teeth $z_{p4}$ of the fourth planetary gear 11 to the number of teeth $z_{r3}$ of the third ring gear 53.

In the complex planetary gear unit 1 shown in FIG. 9, the number of teeth $z_{p1}$ of the first planetary gear 8 is 17, the number of teeth $z_{p2}$ of the second planetary gear 9 is 18, the number of teeth $z_{r1}$ of the first ring gear 51 is 66, and the number of teeth $z_{r2}$ of the second ring gear 52 is 70. Accordingly, the gear ratio $u_{11}$ between the first planetary gear 8 and the first ring gear 51 may be expressed as:

$$u_1 = z_{p1}/z_{r1} = 17/66 = 0.2576; \text{ and}$$

the gear ratio $u_{12}$ between the second planetary gear 9 and the second ring gear 52 may be expressed as:

$$u_{12} = z_{p2}/z_{r2} = 18/70 = 0.2571.$$

Thus, the number of teeth $z_{p1}$ of the first planetary gear 8 is one less than the number of teeth $z_{p2}$ of the second planetary gear 9, and the number of teeth $z_{r1}$ of the first ring gear 51 is four less than the number of teeth $z_{r2}$ of the second ring gear 52. For these reasons, the gear ratio $u_{11}$ and the gear ratio $u_{12}$ are slightly different from each other.

On the other hand, the number of teeth $z_{p3}$ of the third planetary gear 10 is 17, the number of teeth $z_{p4}$ of the fourth planetary gear 11 is 18, the number of teeth $z_{r2}$ of the second ring gear 52 is 70, and the number of teeth $z_{r3}$ of the third ring gear 53 is 74. Accordingly, the gear ratio $u_{13}$ between the third planetary gear 10 and the second ring gear 52 may be expressed as:

$$u_{13} = z_{p3}/z_{r2} = 17/70 = 0.2428; \text{ and}$$

the gear ratio $u_{14}$ between the fourth planetary gear 11 and the third ring gear 53 may be expressed as:

$$u_{14} = z_{p4}/z_{r3} = 18/74 = 0.2432.$$

Thus, the number of teeth $z_{p3}$ of the third planetary gear 10 is one less than the number of teeth $z_{p4}$ of the fourth planetary gear 11, and the number of teeth $z_{r2}$ of the second ring gear 52 is four less than the number of teeth $z_{r3}$ of the third ring gear 53. For these reasons, the gear ratio $u_{13}$ and the gear ratio $u_{14}$ are slightly different from each other.

As described, the complex planetary gear unit 1 shown in FIG. 9 is formed by combining the first complex planetary gear set with the second complex planetary gear set. According to the third example shown in FIG. 9, the first complex planetary gear set comprises the first planetary gear 8, the second planetary gear 9, the first ring gear 51, and the second ring gear 52. On the other hand, the second complex planetary gear set comprises the third planetary gear 10, the fourth planetary gear 11, the second ring gear 52, and the third ring gear 53.

Thus, in the first complex planetary gear set, the gear ratio $u_{11}$ and the gear ratio $u_{12}$ are slightly different from each other. Given that the gear ratio $u_{11}$ and the gear ratio $u_{12}$ are equal, a speed reducing ratio of the first complex planetary gear set would reach an infinite value, and the first complex planetary gear set would not function properly. Whereas, since the gear ratio $u_{11}$ and the gear ratio $u_{12}$ are set to different values, the speed reducing ratio of the complex planetary gear unit 1 shown in FIG. 9 can be increased while preventing the speed reducing ratio of the first complex planetary gear set from reaching the infinite value. For example, the speed reducing ratio of the first complex planetary gear set may be reduced by increasing the difference between the gear ratio $u_{11}$ and the gear ratio $u_{12}$. By contrast, the speed reducing ratio of the first complex planetary gear set may be increased by reducing the difference between the gear ratio $u_{11}$ and the gear ratio $u_{12}$.

Specifically, the speed reducing ratio $R_1$ of the first complex planetary gear set in the complex planetary gear unit 1 shown in FIG. 9 may be expressed as:

$$R_{11} = 1/\{1 - (z_{r1}/z_{p1}) \cdot (z_{p2}/z_{r2})\}$$
$$= 1/\{1 - (66/17) \cdot (18/70)\}$$
$$\approx 595.$$

In general, a speed reducing ratio achieved by the conventional planetary gear sets falls within a range of approximately 4 to 10. Thus, the speed reducing ratio $R_1$ of the first complex planetary gear set is significantly greater than the speed reducing ratio of the conventional planetary gear sets.

Likewise, in the second complex planetary gear set, the gear ratio $u_{13}$ and the gear ratio $u_{14}$ are slightly different from each other. Given that the gear ratio $u_{13}$ and the gear ratio $u_{14}$ are equal, a speed reducing ratio of the second complex planetary gear set would reach an infinite value, and the second complex planetary gear set would not function properly. Whereas, since the gear ratio $u_{13}$ and the gear ratio $u_{14}$ are set to different values, the speed reducing ratio of the complex planetary gear unit 1 shown in FIG. 9 can be increased while preventing the speed reducing ratio of the second complex planetary gear set from reaching the infinite value. For example, the speed reducing ratio of the second complex planetary gear set may be reduced by increasing the difference between the gear ratio $u_{13}$ and the gear ratio $u_{14}$. By contrast, the speed reducing ratio of the second complex planetary gear set may be increased by reducing the difference between the gear ratio $u_{13}$ and the gear ratio $u_{14}$.

Specifically, the speed reducing ratio $R_2$ of the second complex planetary gear set in the complex planetary gear unit 1 shown in FIG. 9 may be expressed as:

$$R_{12} = 1/\{1 - (z_{r2}/z_{p3}) \cdot (z_{p4}/z_{r3})\}$$
$$= 1/\{1 - (70/17) \cdot (18/74)\}$$
$$\approx -629.$$

As described, the speed reducing ratio achieved by the conventional planetary gear sets falls within a range of approximately 4 to 10. Thus, the speed reducing ratio $R_{12}$ of the second complex planetary gear set is greater than the speed reducing ratio of the conventional planetary gear sets. In the second complex planetary gear set, a rotational direction of the third ring gear 53 serving as an output element is reversed to the direction opposite to the rotational direction of the second ring gear 52 serving as an input element. In the description of the present disclosure, therefore, the speed reducing ratio $R_{12}$ of the second complex planetary gear set is referred to as a negative value (e.g., −629) for the sake of convenience.

In the complex planetary gear unit 1 shown in FIG. 9, a speed of the second ring gear 52 is reduced with respect to a speed of the carrier 12 serving as an input element of the complex planetary gear unit 1, and a speed of the third ring gear 53 serving as an output element of the complex planetary gear unit 1 is further reduced with respect to the speed of the second ring gear 52. In other words, a torque delivered to the carrier 12 is delivered to the second ring gear 52 while being multiplied by the first complex planetary gear set, and further delivered to the third ring gear 53 while being further multiplied by the second complex planetary gear set. Accordingly, a speed reducing ratio R of the complex planetary gear unit 1 shown in FIG. 9 may be calculated based on the speed reducing ratio $R_{11}$ of the first complex planetary gear set and the speed reducing ratio $R_{12}$ of the second complex planetary gear set using the following formula:

$$R = 1/\{1/R_{11} + (1 - 1/R_{11})/R_{12}\}$$
$$= 1/\{1/595 + (1 - 1/595) \cdot (-629)\}$$
$$\approx -10693.$$

Thus, the speed reducing ratio R of the complex planetary gear unit 1 shown in FIG. 9 is significantly larger than speed reducing ratios of conventional magical planetary gear speed reducers and strain wave gearings. In the complex planetary gear unit 1 shown in FIG. 9, the third ring gear 53 serving as the output element is rotated in the same direction as the carrier 12 serving as an input element.

In the complex planetary gear unit 1 shown in FIG. 9, the carrier 12 as the input element is rotated in the forward direction when the electric motor 3 is rotated in the forward direction (i.e., clockwise), and in this situation, the third ring gear 53 as the output element is also rotated in the forward direction. According to the third example, the speed reducing ratio R of the complex planetary gear unit 1 may be changed by changing the numbers of teeth of the ring gears 51, 52, and 53, and the planetary gears 8, 9, 10, and 11. In addition, the rotational direction of the third ring gear 53 as the output element may be switched by changing the numbers of teeth of the ring gears 51, 52, and 53, and the planetary gears 8, 9, 10, and 11.

Thus, in the complex planetary gear unit 1 shown in FIG. 9, the first ring gear 51 serves as the first gear 5, the second ring gear 52 serves as the second gear 6, and the third ring gear 53 serves as the third gear 7. In the complex planetary gear unit 1 thus structured, the rotational direction of the third ring gear 53 may be switched arbitrarily between the forward direction and the reverse direction by adjusting the numbers of teeth of the gears in such a manner as to satisfy all of the following relational expressions.

For example, in a case of rotating the third ring gear 53 in the forward direction, the numbers of teeth $z_{p1}$, $z_{p2}$, $z_{p3}$, $z_{p4}$, $z_{r1}$, $z_{r2}$, and $z_{r3}$ of the first planetary gear 8, the second planetary gear 9, the third planetary gear 10, the fourth planetary gear 11, the first ring gear 51, the second ring gear 52, and the third ring gear 53 are set such that all of the following relational expressions are satisfied:

$$z_{p1}=z_{p3};$$

$$z_{p2}=z_{p4}=z_{p1}+1;$$

$$z_{r1}=(z_{p1}\cdot 2-1)\cdot 2;$$

$$z_{r2}=(z_{p1}\cdot 2+1)\cdot 2; \text{ and}$$

$$z_{r3}=(z_{p1}\cdot 2+3)\cdot 2.$$

In this case, the output shaft 54 is rotated in the forward direction as the carrier 12 at a speed slower than that of the carrier 12.

By contrast, in a case of rotating the third ring gear 53 in the reverse direction, the numbers of teeth $z_{p1}$, $z_{p2}$, $z_{p3}$, $z_{p4}$, $z_{r1}$, $z_{r2}$, and $z_{r3}$ of the first planetary gear 8, the second planetary gear 9, the third planetary gear 10, the fourth planetary gear 11, the first ring gear 51, the second ring gear 52, and the third ring gear 53 are set such that all of the following relational expressions are satisfied:

$$z_{p1}=z_{p3};$$

$$z_{p2}=z_{p4}=z_{p1}-1;$$

$$z_{r1}=(z_{p1}\cdot 2+1)\cdot 2$$

$$z_{r2}=(z_{p1}\cdot 2-1)\cdot 2; \text{ and}$$

$$z_{r3}=(z_{p1}\cdot 2-3)\cdot 2.$$

In this case, the output shaft 54 is rotated in the reverse direction opposite to the rotational direction of the carrier 12, at a speed slower than that of the carrier 12.

Figure 11A:
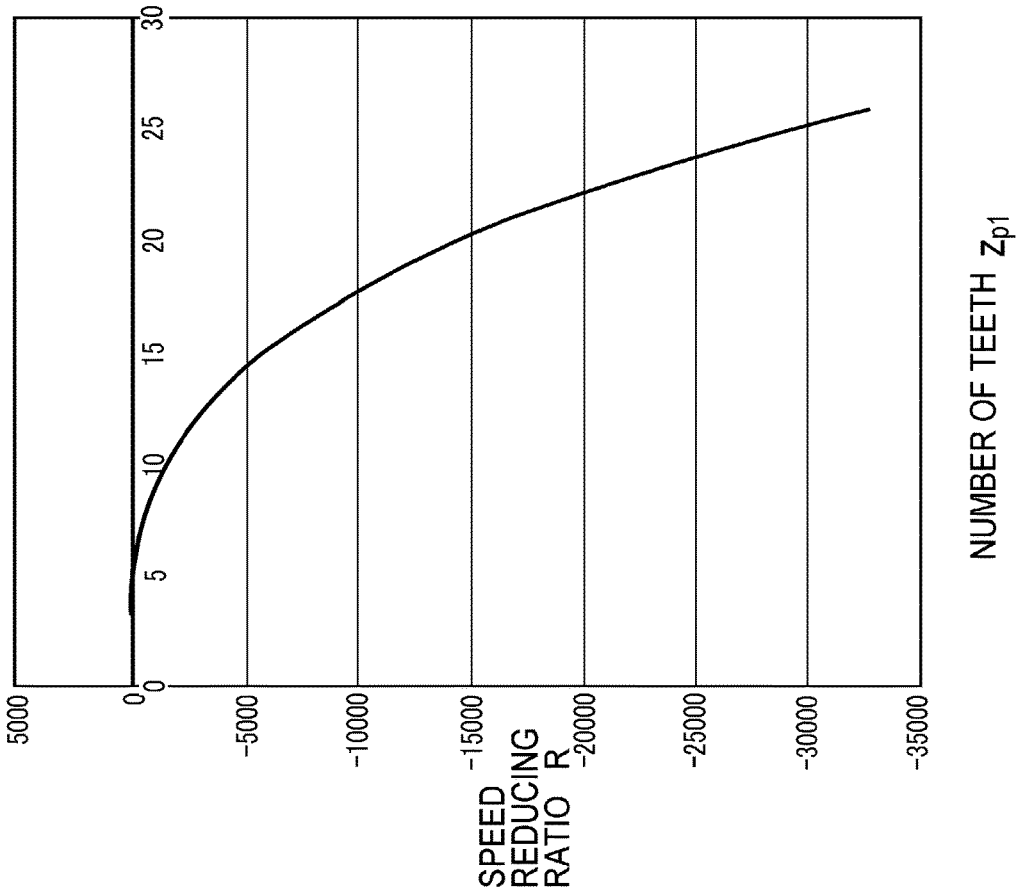
FIG. 11A is a table indicating a relation between the numbers of teeth of the gears and a speed reducing ratio of the complex planetary gear unit according to the third example in a case of rotating the output shaft in the reverse direction.

The FIG. 10A is a table indicating a relation between the numbers of teeth $z_{p1}$, $z_{p2}$, $z_{p3}$, $z_{p4}$, $z_{r1}$, $z_{r2}$, and $z_{r3}$ of the above-mentioned gears and the speed reducing ratio R of the complex planetary gear unit 1 shown in FIG. 9 in the case of rotating the output shaft 54 in the forward direction, and FIG. 10B is a graph indicating a relation between the number of teeth $z_{p1}$ of the first planetary gear 8 and the speed reducing ratio R of the complex planetary gear unit 1 shown in FIG. 9 in the case of rotating the output shaft 54 in the forward direction. On the other hand, FIG. 11A is a table indicating a relation between the numbers of teeth $z_{p1}$, $z_{p2}$, $z_{p3}$, $z_{p4}$, $z_{r1}$, $z_{r2}$, and $z_{r3}$ of the above-mentioned gears and the speed reducing ratio R of the complex planetary gear unit 1 shown in FIG. 9 in the case of rotating the output shaft 54 in the reverse direction, and FIG. 11B is a graph indicating a relation between the number of teeth $z_{p1}$ of the first planetary gear 8 and the speed reducing ratio R of the complex planetary gear unit 1 shown in FIG. 9 in the case of rotating the output shaft 54 in the reverse direction. As can be seen from FIGS. 10A, 10B, 11A, and 11B, the speed reducing ratio R of the complex planetary gear unit 1 shown in FIG. 9 may be changed within a range from approximately 30 to more than 33000. Thus, the complex planetary gear unit 1 shown in FIG. 9 may achieve the speed reducing ratio greater than 30000.

In addition, as described, all of the first gear 5, the second gear 6, and the third gear 7 are internal gears. That is, the complex planetary gear unit 1 shown in FIG. 9 is formed by combining the first complex planetary gear set with the second complex planetary gear set each of which does not have a sun gear. For this reason, a size of the complex planetary gear unit 1 shown in FIG. 9 can be reduced in the radial direction.

Fourth Example

Figure 12:
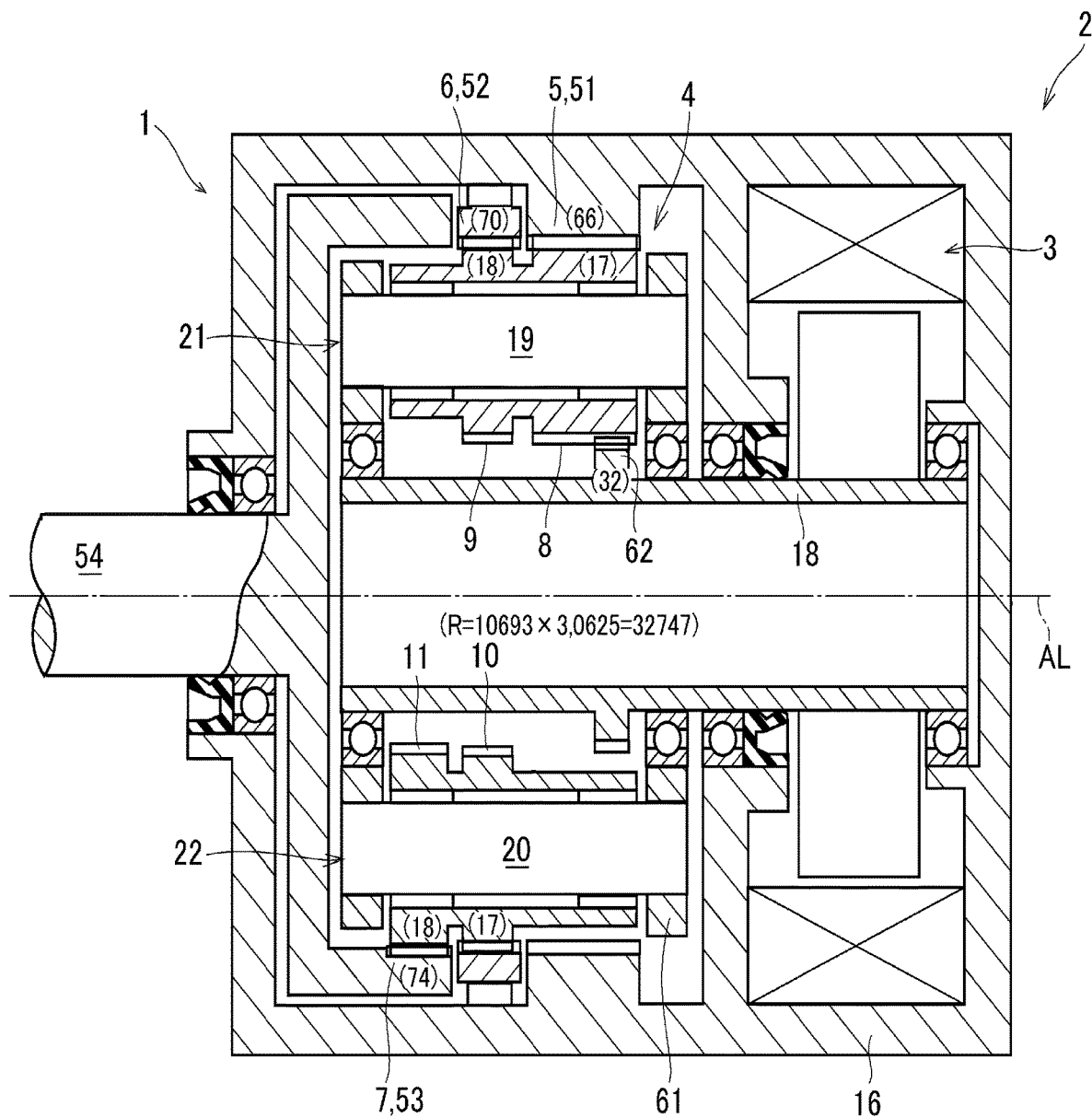
FIG. 12 is a cross-sectional view showing a structure of the complex planetary gear unit according to the fourth example of the present disclosure.

Turning to FIG. 12, there is shown a structure of a complex planetary gear unit 1 according to the fourth example of the present disclosure. The complex planetary gear unit 1 shown in FIG. 12 comprises the first ring gear 51, the second ring gear 52, the third ring gear 53, the first planetary gear 8, the second planetary gear 9, the third planetary gear 10, the fourth planetary gear 11, a carrier 61, and an input sun gear 62. According to the fourth example, the carrier 61 supports the first planetary gear 8, the second planetary gear 9, the third planetary gear 10, and the fourth planetary gear 11 in a rotatable manner, without being connected to any of rotary members.

The input sun gear 62 is formed integrally with the rotary shaft 18 of the electric motor 3 to be rotated integrally with the rotary shaft 18, while being meshed with the first planetary gear 8. In other words, the input sun gear 62 is arranged coaxially with the first ring gear 51, the second ring gear 52, the third ring gear 53, and the carrier 61 along the rotational center axis AL. That is, the first planetary gear 8 is meshed with the first ring gear 51 and the input sun gear 62. Thus, according to the fourth example, the complex planetary gear unit 1 comprises a single-pinion input planetary gear set having the input sun gear 62, the first ring gear 51, the first planetary gear 8, and the carrier 61.

In the complex planetary gear unit 1 shown in FIG. 12, a torque generated by the electric motor 3 is delivered to the carrier 61 through the input sun gear 62. In other words, an output torque of the electric motor 3 is delivered from the input sun gear 62 to the complex planetary gear unit 1 though the input planetary gear set. According to the fourth example, therefore, the speed reducing ratio R of the complex planetary gear unit 1 shown in FIG. 12 is further increased by a speed reducing ratio achieved by the input planetary gear set.

In the complex planetary gear unit 1 shown in FIG. 12, as the third example, the number of teeth $z_{p1}$ of the first planetary gear 8 is 17, the number of teeth $z_{p2}$ of the second planetary gear 9 is 18, the number of teeth $z_{p3}$ of the third planetary gear 10 is 17, the number of teeth $z_{p4}$ of the fourth planetary gear 11 is 18, the number of teeth $z_{r1}$ of the first ring gear 51 is 66, the number of teeth $z_{r2}$ of the second ring gear 52 is 70, and the number of teeth $z_{r3}$ of the third ring gear 53 is 74. According to the fourth example, therefore, the speed reducing ratio R of the complex planetary gear unit 1 shown in FIG. 12 is calculated by multiplying the speed reducing ratio of the complex planetary gear unit 1 shown in FIG. 9 by the speed reducing ratio of the input planetary gear set.

In the complex planetary gear unit 1 shown in FIG. 12, the number of teeth $z_{62}$ of the input sun gear 62 is 32. Accordingly, the gear ratio $R_{62}$ of the input planetary gear set may be expressed as:

$$R_{62} = z_{r1}/z_{62} + 1$$
$$= 66/32 + 1$$
$$= 3.0625.$$

As described, the speed reducing ratio of the complex planetary gear unit 1 shown in FIG. 9 is 10693. Accordingly, the speed reducing ratio R of the complex planetary gear unit 1 shown in FIG. 12 may be expressed as:

$$R = 10693 \cdot R_{62}$$
$$= 10693 \cdot 3.0625$$
$$\approx 32747.$$

Thus, according to the fourth example, the speed reducing ratio R of the complex planetary gear unit 1 shown in FIG. 12 may be increased greater than the speed reducing ratio R of the complex planetary gear unit 1 shown in FIG. 9.

Fifth Example

Figure 13:
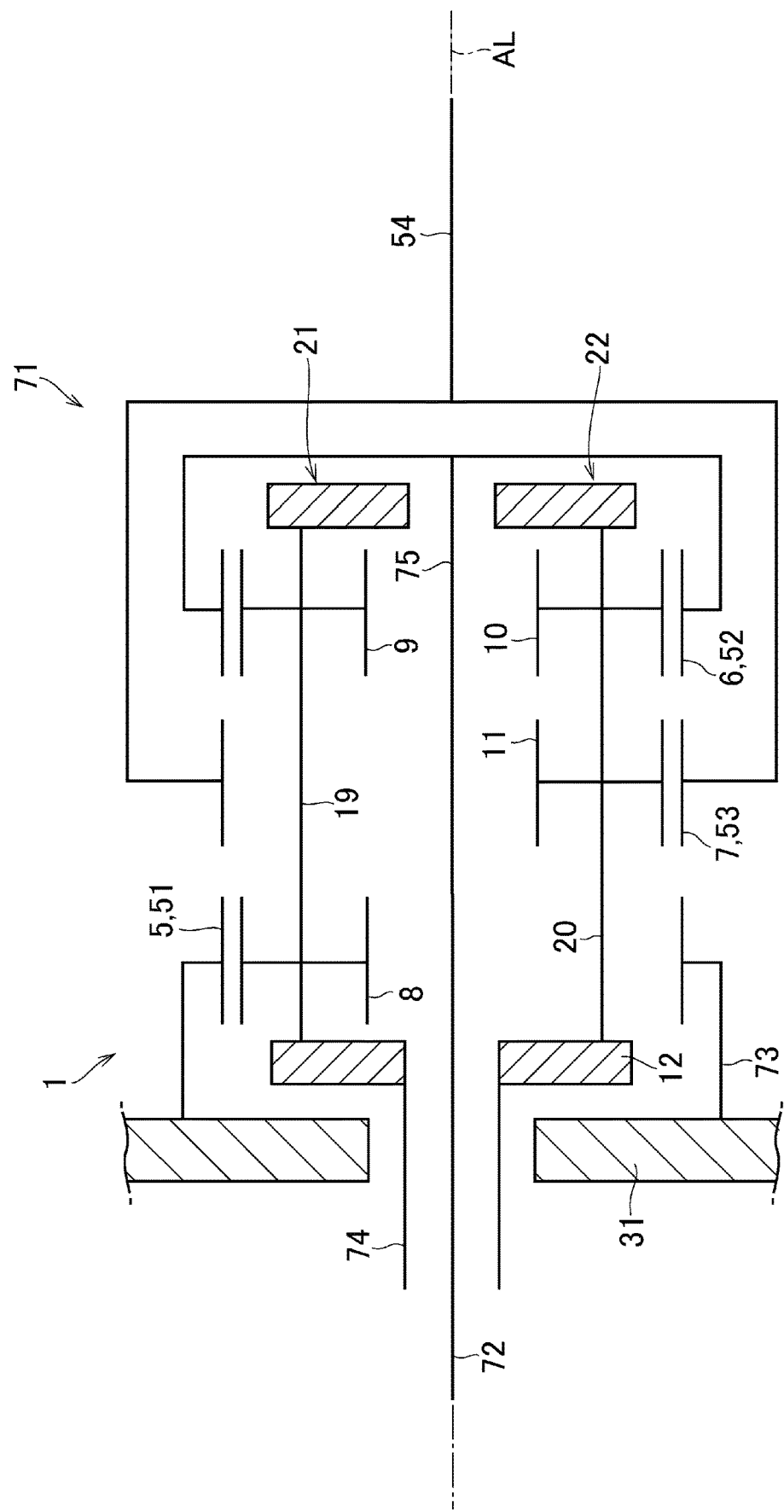
FIG. 13 is a schematic illustration showing a structure of the complex planetary gear unit according to a fifth example of the present disclosure.

Turning to FIG. 13, there is shown a structure of the complex planetary gear unit 1 according to the fifth example of the present disclosure. According to the fifth example, the complex planetary gear unit 1 is provided with two output shafts and a reversing mechanism 71 that allows the output shafts to rotate in opposite directions. As described, according to the third example, the second ring gear 52 serves as a counter gear with respect to the third ring gear 53, and the second ring gear 52 and the third ring gear 53 rotate in opposite directions. In the reversing mechanism 71, the second ring gear 52 is connected to a counter rotating shaft 72 that rotates in an opposite direction to a rotational direction of the output shaft 54 joined to the third ring gear 53. According to the fifth example, the first ring gear 51, the third ring gear 53, and the second ring gear 52 are arranged in order from left to right.

Specifically, in the complex planetary gear unit 1 shown in FIG. 13, a fixed shaft 73 of the first ring gear 51 and a rotary shaft 74 of the carrier 12 are formed into a hollow shaft, respectively. The second ring gear 52 is connected to the counter rotating shaft 72 through a rotary shaft 75 so that the second ring gear 52 rotates integrally with the rotary shaft 75 and the counter rotating shaft 72. A unit of the rotary shaft 75 and the counter rotating shaft 72 penetrates through a hollow space of the fixed shaft 73, and a leading end of the counter rotating shaft 72 protrudes from one side of a case 31 of the complex planetary gear unit 1. According to the fifth example, a leading end of the output shaft 54 protrudes from the other side of the case 31 of the complex planetary gear unit 1.

The output shaft 54 and the counter rotating shaft 72 extend coaxially along the rotational center axis AL while being allowed to rotate relatively to each other. Specifically, the counter rotating shaft 72 rotates in the opposite direction to the rotational direction of the output shaft 54 to deliver the torque delivered from the second ring gear 52 to a predetermined rotary member. Otherwise, a torque delivered to the counter rotating shaft 72 from an external source may also be delivered to the second ring gear 52.

As described, in the complex planetary gear unit 1 shown in FIG. 13, the second ring gear 52 serving as a counter gear with respect to the third ring gear 53 is connected to the counter rotating shaft 72 so that the counter rotating shaft 72 rotates in the opposite direction to the rotational direction of the output shaft 54 joined to the third ring gear 53. That is, a rotational direction of the counter rotating shaft 72 is reversed with respect to the rotational direction of the output shaft 54 by the reversing mechanism 71 of compact size.

According to the second example, the input torque to the complex planetary gear unit 1 may be delivered to external rotary members not only through the output shaft 54 but also through the counter rotating shaft 72 while being multiplied.

The counter rotating shaft 72 may also serve as an input shaft of the complex planetary gear unit 1. Specifically, a torque may be applied to the counter rotating shaft 72 in the opposite direction to the rotational direction of the output shaft 54, and the torque applied to the counter rotating shaft 72 is delivered to the output shaft 54 while being multiplied. In order to apply the torque to the counter rotating shaft 72, for example, an assist motor (not shown) may be combined with the complex planetary gear unit 1.

Figure 14:
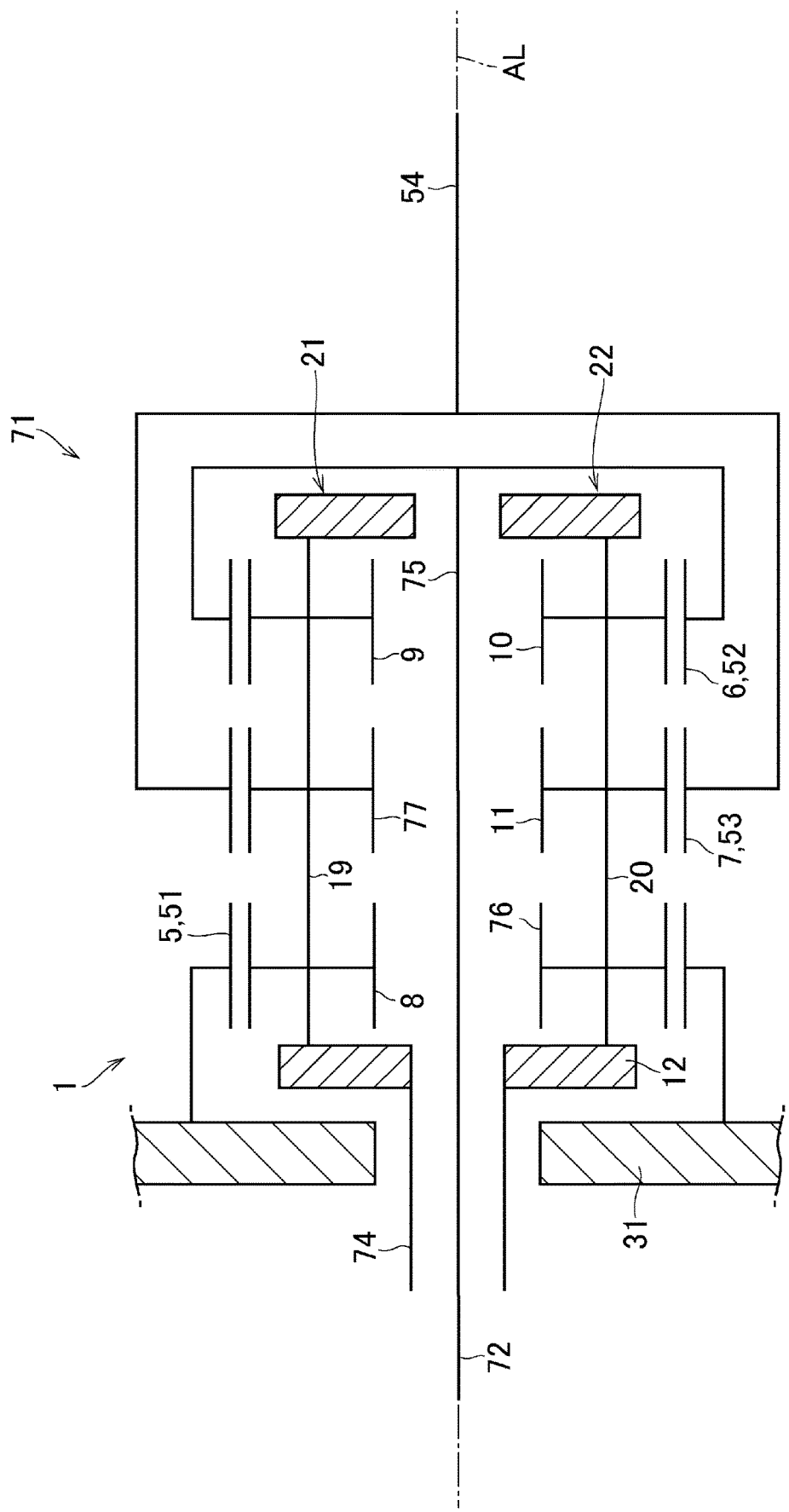
FIG. 14 is a schematic illustration showing a structure of the complex planetary gear unit according to a modification example of the fifth example.

Turning to FIG. 14, there is shown a modification example of the complex planetary gear unit 1 according to the fifth example. According to the modification example, in order to support the second ring gear 52, the third ring gear 53, and the carrier 12 in more stable manner, the complex planetary gear unit 1 is provided with a fifth planetary gear 76 as a counterpart of the first planetary gear 8, and a sixth planetary gear 77 as a counterpart of the fourth planetary gear 11.

The fifth planetary gear 76 is an external gear having same dimensions as the first planetary gear 8. That is, the number of teeth and a module of the fifth planetary gear 76 are identical to those of the first planetary gear 8. Specifically, the fifth planetary gear 76 is formed on the rotary shaft 20 to be rotated integrally with the third planetary gear 10 and the fourth planetary gear 11 while being meshed with the first ring gear 51. That is, the first ring gear 51 is meshed with both of the first planetary gear 8 and the fifth planetary gear 76. When the carrier 12 is rotated, the fifth planetary gear 76 is rotated at a same speed as the first planetary gear 8 to revolve along the internal teeth of the first ring gear 51.

Likewise, the sixth planetary gear 77 is also an external gear having same dimensions as the fourth planetary gear 11. That is, the number of teeth and a module of the sixth planetary gear 77 are identical to those of the fourth planetary gear 11. Specifically, the sixth planetary gear 77 is formed on the rotary shaft 19 to be rotated integrally with the first planetary gear 8 and the second planetary gear 9 while being meshed with the third ring gear 53. That is, the third ring gear 15 is meshed with both of the fourth planetary gear 11 and the sixth planetary gear 77. When the carrier 12 is rotated, the sixth planetary gear 77 is rotated at a same speed as the fourth planetary gear 11 to revolve along the internal teeth of the third ring gear 53.

In the complex planetary gear unit 1 shown in FIG. 14, therefore, the rotary shaft 19 of the first planetary set 21 may be supported equally by the first planetary gear 8, the sixth planetary gear 77, and the second planetary gear 9 to rotate stably while maintaining a balance. Likewise, the rotary shaft 20 of the second planetary set 22 may be supported equally by the fifth planetary gear 76, the fourth planetary gear 11, and the third planetary gear 10 to rotate stably while maintaining a balance. For these reasons, the carrier 12 as well as the second ring gear 52 and the third ring gear 53 are allowed to rotate in a stable manner so that output torques from the output shaft 54 and the counter rotating shaft 72 may be stabilized.

Sixth Example

Figure 15:
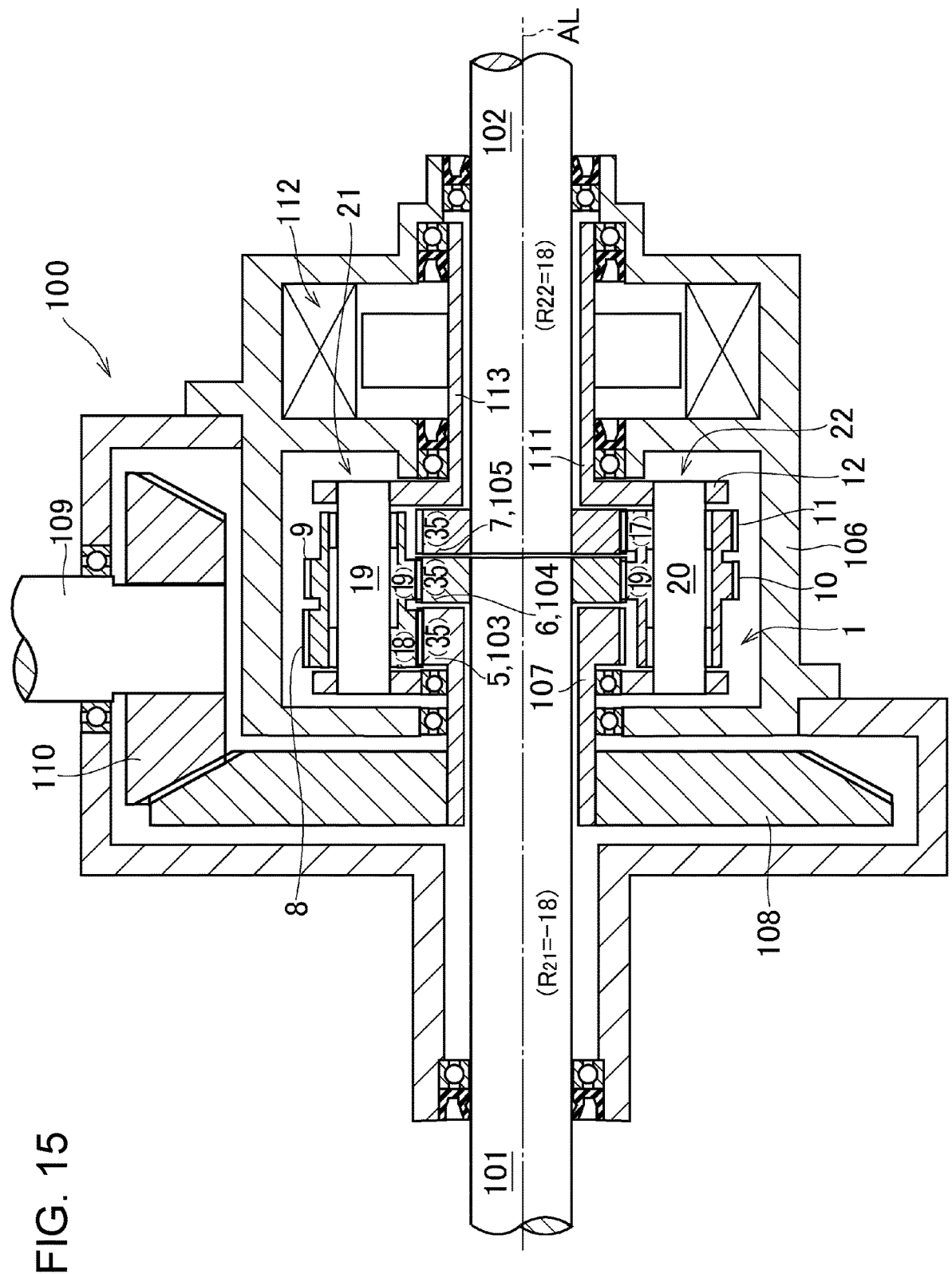
FIG. 15 is a cross-sectional view showing a structure of the complex planetary gear unit according to a sixth example of the present disclosure.

Turning to FIG. 15, there is shown a structure of the complex planetary gear unit 1 according to the sixth example of the present disclosure. According to the sixth example, the complex planetary gear unit 1 is combined with a differential mechanism 100 to be mounted on a vehicle to distribute torque to right and left wheels (not shown). In the differential mechanism 100, a torque of a prime mover (not shown) may be applied to the first gear 5, and the first gear 5 is supported in a rotatable manner by a first rotary shaft 101 on which the second gear 6 in mounted. On the other hand, the third gear 7 is joined to a second rotary shaft 102.

In the complex planetary gear unit 1 shown in FIG. 15, the first gear 5, the second gear 6, and the third gear 7 are arranged in order from left to right while being allowed to rotate relatively to one another. According to the sixth example, an external gear is adopted as the first gear 5, the second gear 6, and the third gear 7, respectively. Specifically, a first sun gear 103 meshing with the first planetary gear 8 serves as the first gear 5, a second sun gear 104 meshing with the second planetary gear 9 and the third planetary gear 10 serves as the second gear 6, and a third sun gear 105 meshing with the fourth planetary gear 11 serves as the third gear 7.

The first sun gear 103 is supported by a case 106 of the complex planetary gear unit 1 and the differential mechanism 100. The second sun gear 104 and the third sun gear 105 are supported respectively in a rotatable manner so that the first sun gear 103, the second sun gear 104, and the third sun gear 105 are allowed to rotate relatively to one another.

A differential ring gear 108 is fitted onto a rotary shaft 107 of the first sun gear 103 so that the differential ring gear 108, the rotary shaft 107, and the first sun gear 103 are rotated integrally. Specifically, the differential ring gear 108 as a diametrically larger bevel gear is meshed with a drive pinion 110 as a diametrically smaller bevel gear that is fitted onto a leading end of a propeller shaft 109 of the vehicle (not shown). The number of teeth of the drive pinion 110 is less than the number of teeth of the differential ring gear 108. That is, the drive pinion 110 and the differential ring gear 108 serve as a final reduction gear unit of the vehicle. The other end of the propeller shaft 109 (not shown) is joined to the prime mover such as an internal combustion engine, an electric motor, a brake device or the like so that a drive torque to propel the vehicle or a brake torque to decelerate the vehicle generated by the prime mover is delivered to the differential ring gear 108 through the propeller shaft 109 and the drive pinion 110.

The second sun gear 104 is fitted onto the first rotary shaft 101 to rotate integrally therewith, and the third sun gear 105 is fitted onto the second rotary shaft 102 to rotate integrally therewith. The first rotary shaft 101 and the second rotary shaft 102 extend coaxially along the rotational center axis AL while being allowed to rotate relatively to each other. Specifically, the first rotary shaft 101 is supported by the case 106 in a rotatable manner, and a leading end of the first rotary shaft 101 protrudes from one side of the case 106 to be connected to one of the right wheel and the left wheel (neither of which are shown) of the vehicle. On the other hand, the second rotary shaft 102 is also supported by the case 106 in a rotatable manner, and a leading end of the second rotary shaft 102 protrudes from the other side of the case 106 to be connected to the other one of the right wheel and the left wheel of the vehicle.

The carrier 12 is arranged coaxially with the first sun gear 103, the second sun gear 104, and the third sun gear 105 while being allowed to rotate relatively to those sun gears 103, 104, and 105. Specifically, a rotary shaft 111 of the carrier 12 is joined to an output shaft 113 of a control motor 112 so that the carrier 12 is rotated integrally with the rotary shaft 111 and the output shaft 113.

The control motor 112 generates a control torque to control a relative rotation between the first rotary shaft 101 and the second rotary shaft 102. To this end, for example, an induction motor and a permanent magnet synchronous motor may be adopted as the control motor 112, and the control motor 112 is arranged coaxially with the complex planetary gear unit 1.

The drive torque delivered to the first sun gear 103 from the prime mover is distributed to the first rotary shaft 101 through the second sun gear 104 and to the second rotary shaft 102 through the third sun gear 105. On the other hand, the control torque applied to the carrier 12 from the control motor 112 is delivered to the first rotary shaft 101 through the second sun gear 104 while being multiplied, and to the second rotary shaft 102 through the third sun gear 105 while being multiplied. Consequently, the first rotary shaft 101 and the second rotary shaft 102 are rotated relatively to each other in opposite directions.

As described, in the complex planetary gear unit 1, a gear ratio between the first planetary gear 8 and the first gear 5 and a gear ratio between the second planetary gear 9 and the second gear 6 are set to different ratios. Likewise, a gear ratio between the third planetary gear 10 and the second gear 6 and a gear ratio between the fourth planetary gear 11 and the third gear 7 are set to different ratios.

In the complex planetary gear unit 1 shown in FIG. 15, specifically, a gear ratio $u_{21}$ between the first planetary gear 8 and the first sun gear 103 and a gear ratio $u_{22}$ between the second planetary gear 9 and the second sun gear 104 are different from each other. Likewise, a gear ratio $u_{23}$ between the third planetary gear 10 and the second sun gear 104 and a gear ratio $u_{24}$ between the fourth planetary gear 11 and the third sun gear 105 are different from each other. According to the sixth example, the gear ratio $u_{21}$ is defined as a ratio of the number of teeth $z_{p1}$ of the first planetary gear 8 to the number of teeth $z_{s11}$ of the first sun gear 103, the gear ratio $u_{22}$ is defined as a ratio of the number of teeth $z_{p2}$ of the second planetary gear 9 to the number of teeth $z_{s12}$ of the second sun gear 104, the gear ratio $u_{23}$ is defined as a ratio of the number of teeth $z_{p3}$ of the third planetary gear 10 to the number of teeth $z_{s12}$ of the second sun gear 104, and the gear ratio $u_{24}$ is defined as a ratio of the number of teeth $z_{p4}$ of the fourth planetary gear 11 to the number of teeth $z_{s13}$ of the third sun gear 105.

In the complex planetary gear unit 1 shown in FIG. 15, the number of teeth $z_{p1}$ of the first planetary gear 8 is 18, the number of teeth $z_{p2}$ of the second planetary gear 9 is 19, the number of teeth $z_{s11}$ of the first sun gear 103 is 35, and the number of teeth $z_{s12}$ of the second sun gear 104 is 35. Accordingly, the gear ratio $u_{21}$ between the first planetary gear 8 and the first sun gear 103 may be expressed as:

$$u_{21}=z_{p1}/z_{s11}=18/35\approx 0.514;\text{ and}$$

the gear ratio $u_{22}$ between the second planetary gear 9 and the second sun gear 104 may be expressed as:

$$u_{22}=z_{p2}/z_{s12}=19/35\approx 0.543.$$

As described, the number of teeth $z_{s11}$ of the first sun gear 103 and the number of teeth $z_{s12}$ of the second sun gear 104 are equal, and the number of teeth $z_{p1}$ of the first planetary gear 8 is one less than the number of teeth $z_{p2}$ of the second planetary gear 9. For these reasons, the gear ratio $u_{21}$ and the gear ratio $u_{22}$ are slightly different from each other.

On the other hand, the number of teeth $z_{p3}$ of the third planetary gear 10 is 19, the number of teeth $z_{p4}$ of the fourth planetary gear 11 is 17, the number of teeth $z_{s12}$ of the second sun gear 104 is 35, and the number of teeth $z_{s13}$ of the third sun gear 105 is 35. Accordingly, the gear ratio $u_{23}$ between the third planetary gear 10 and the second sun gear 104 may be expressed as:

$$u_{23}=z_{p3}/z_{s12}=19/35\approx0.543;\text{ and}$$

the gear ratio $u_{24}$ between the fourth planetary gear 11 and the third sun gear 105 may be expressed as:

$$u_{24}=z_{p4}/z_{s13}=17/35\approx0.486.$$

As described, the number of teeth $z_{s12}$ of the second sun gear 104 and the number of teeth $z_{s13}$ of the third sun gear 105 are equal, and the number of teeth $z_{p3}$ of the third planetary gear 10 is two more than the number of teeth $z_{p4}$ of the fourth planetary gear 11. For these reasons, the gear ratio $u_{23}$ and the gear ratio $u_{24}$ are slightly different from each other.

In other words, the number of teeth $z_{p2}$ of the second planetary gear 9 is one more than the number of teeth $z_{p1}$ of the first planetary gear 8, and the number of teeth $z_{p4}$ of the fourth planetary gear 11 is two less than the number of teeth $z_{p3}$ of the third planetary gear 10. As described, the number of teeth $z_{p2}$ of the second planetary gear 9 is 19, and the number of teeth $z_{p3}$ of the third planetary gear 10 is also 19. That is, the number of teeth $z_{p3}$ of the third planetary gear 10 is one more than the number of teeth $z_{p1}$ of the first planetary gear 8, and the number of teeth $z_{p4}$ of the fourth planetary gear 11 is one less than the number of teeth $z_{p1}$ of the first planetary gear 8.

As described, the complex planetary gear unit 1 is formed by combining the first complex planetary gear set with the second complex planetary gear set. According to the sixth example shown in FIG. 15, the first complex planetary gear set comprises the first planetary gear 8, the second planetary gear 9, the first sun gear 103, and the second sun gear 104. On the other hand, the second complex planetary gear set comprises the third planetary gear 10, the fourth planetary gear 11, the second sun gear 104, and the third sun gear 105.

Thus, in the first complex planetary gear set, the gear ratio $u_{21}$ and the gear ratio $u_{22}$ are slightly different from each other. Given that the gear ratio $u_{21}$ and the gear ratio $u_{22}$ are equal, a speed reducing ratio of the first complex planetary gear set as a speed ratio of an output element to an input element would reach an infinite value, and the first complex planetary gear set would not function properly. Whereas, since the gear ratio $u_{21}$ and the gear ratio $u_{22}$ are set to different values, the speed reducing ratio of the complex planetary gear unit 1 shown in FIG. 15 can be increased while preventing the speed reducing ratio of the first complex planetary gear set from reaching the infinite value. For example, the speed reducing ratio of the first complex planetary gear set may be reduced by increasing the difference between the gear ratio $u_{21}$ and the gear ratio $u_{22}$. By contrast, the speed reducing ratio of the first complex planetary gear set may be increased by reducing the difference between the gear ratio $u_{21}$ and the gear ratio $u_{22}$.

Likewise, in the second complex planetary gear set, the gear ratio $u_{23}$ and the gear ratio $u_{24}$ are slightly different from each other. Given that the gear ratio $u_{23}$ and the gear ratio $u_{24}$ are equal, a speed reducing ratio of the second complex planetary gear set would reach an infinite value, and the second complex planetary gear set would not function properly. Whereas, since the gear ratio $u_{23}$ and the gear ratio $u_{24}$ are set to different values, the speed reducing ratio of the complex planetary gear unit 1 shown in FIG. 15 can be increased while preventing the speed reducing ratio of the second complex planetary gear set from reaching the infinite value. For example, the speed reducing ratio of the second complex planetary gear set may be reduced by increasing the difference between the gear ratio $u_{23}$ and the gear ratio $u_{24}$. By contrast, the speed reducing ratio of the second complex planetary gear set may be increased by reducing the difference between the gear ratio $u_{23}$ and the gear ratio $u_{24}$.

Given that the first rotary shaft 101 and the second rotary shaft 102 are rotated at a same speed by the torque distributed from the first sun gear 103 to the second sun gear 104 and the third sun gear 105, in the complex planetary gear unit 1 thus combined with the differential mechanism 100, the first rotary shaft 101 and the second rotary shaft 102 are rotated integrally.

As described, the number of teeth $z_{p2}$ of the second planetary gear 9 is one more than the number of teeth $z_{p1}$ of the first planetary gear 8. Therefore, given that the first rotary shaft 101 on which the second sun gear 104 is mounted and the second rotary shaft 102 on which the third sun gear 105 is mounted are rotated at the same speed, a rotational speed of the second sun gear 104 meshing with the second planetary gear 9 is increased higher than a rotational speed of the first sun gear 103 meshing with the first planetary gear 8 by the one more tooth of the second planetary gear 9. On the other hand, the number of teeth $z_{p4}$ of the fourth planetary gear 11 is one less than the number of teeth $z_{p1}$ of the first planetary gear 8. In this situation, therefore, a rotational speed of the third sun gear 105 meshing with the fourth planetary gear 11 is reduced lower than a rotational speed of the first sun gear 103 meshing with the first planetary gear 8 by the reduction in the number of teeth $z_{p4}$ of the fourth planetary gear 11. Consequently, the second sun gear 104 and the third sun gear 105 are rotated in opposite directions. In this situation, the second planetary gear 9 and the third planetary gear 10 revolve around the second sun gear 104, and the fourth planetary gear 11 integrated with the third planetary gear 10 revolves around the third sun gear 105. Therefore, torques are applied to an engagement site between the second sun gear 104 and the second planetary gear 9 and to an engagement site between the third sun gear 105 and the fourth planetary gear 11 in opposite directions thereby causing interference between those engagement sites. As a result, the complex planetary gear unit 1 shown in FIG. 15 is substantially brought into engagement to rotate integrally so that the first rotary shaft 101 and the second rotary shaft 102 are rotated integrally without rotating relatively to each other.

By contrast, given that the first rotary shaft 101 on which the second sun gear 104 is mounted and the second rotary shaft 102 on which the third sun gear 105 is mounted are rotated at different speeds, the complex planetary gear unit 1 shown in FIG. 15 will not be brought into engagement by such interference between the above-mentioned engagement sites. In this case, the torque is distributed from the first sun gear 103 to the second sun gear 104 and to the third sun gear 105 while rotating the second sun gear 104 and the third sun gear 105 relatively to each other. Consequently, torques are applied to the engagement site between the second sun gear 104 and the second planetary gear 9 and to the engagement site between the third sun gear 105 and the fourth planetary gear 11 in opposite directions, thereby rotating the second sun gear 104 and to the third sun gear 105 in opposite directions. That is, the rotational direction of the second sun gear 104 is reversed to the opposite direction to the rotational direction of the third sun gear 105. As a result, the first rotary shaft 101 and the second rotary shaft 102 are rotated differentially in opposite directions.

According to the sixth example, a speed reducing ratio between the carrier 12 and the second sun gear 104 is referred to as a first speed reducing ratio, a speed reducing ratio between the carrier 12 and the third sun gear 105 is referred to as a second speed reducing ratio, and a speed reducing ratio between the second sun gear 104 and the third sun gear 105 is referred to as an intermediate speed reducing ratio. The second speed reducing ratio corresponds to a speed reducing ratio of the complex planetary gear unit 1 shown in FIG. 15. In the complex planetary gear unit 1 shown in FIG. 15, the first speed reducing ratio and the second speed reducing ratio are equal or approximated to each other. In other words, the first speed reducing ratio is a ratio of a rotational speed of the second sun gear 104 to a rotational speed of the carrier 12, the second speed reducing ratio is a ratio of a rotational speed of the third sun gear 105 to a rotational speed of the carrier 12, and the intermediate speed reducing ratio is a ratio of a rotational speed of the third sun gear 105 to a rotational speed of the second sun gear 104.

In the complex planetary gear unit 1 shown in FIG. 15, rotational speeds of both of the second sun gear 104 and the third sun gear 105 are reduced with respect to a rotational speed of the carrier 12. That is, an absolute value of each of the first speed reducing ratio, the second speed reducing ratio, and the intermediate speed reducing ratio is individually greater than 1. In the complex planetary gear unit 1 shown in FIG. 15, therefore, the control torque applied to the carrier 12 from the control motor 112 is delivered to the second sun gear 104 and the third sun gear 105 while being multiplied.

As described, in the complex planetary gear unit 1 shown in FIG. 15, the number of teeth $z_{p1}$ of the first planetary gear 8 is 18, the number of teeth $z_{p2}$ of the second planetary gear 9 is 19, the number of teeth $z_{p3}$ of the third planetary gear 10 is 19, the number of teeth $z_{p4}$ of the fourth planetary gear 11 is 17, the number of teeth $z_{s11}$ of the first sun gear 103 is 35, the number of teeth $z_{s12}$ of the second sun gear 104 is 35, and the number of teeth $z_{s13}$ of the third sun gear 105 is 35. Accordingly, the first speed reducing ratio $R_{21}$ between the carrier 12 and the second sun gear 104 may be expressed as:

$$R_{21} = 1/\{1 - (z_{s11}/z_{p1}) \cdot (z_{p2}/z_{s12})\}$$
$$= 1/\{1 - (35/18) \cdot (19/35)\}$$
$$\approx -18.$$

In the complex planetary gear unit 1 shown in FIG. 15, a rotational direction of the second sun gear 104 serving as an output element is reversed to the direction opposite to the rotational direction of the carrier 12 serving as an input element. Therefore, the first speed reducing ratio $R_{21}$ of the complex planetary gear unit 1 shown in FIG. 15 is referred to as a negative value (e.g., −18) for the sake of convenience.

Likewise, the intermediate speed reducing ratio $R_{20}$ between the second sun gear 104 and the third sun gear 105 may be expressed as:

$$R_{20} = 1/\{1 - (z_{s12}/z_{p3}) \cdot (z_{p4}/z_{s13})\}$$
$$= 1/\{1 - (35/19) \cdot (17/35)\}$$
$$\approx 9.5.$$

Accordingly, the second speed reducing ratio $R_{22}$ between the carrier 12 and the third sun gear 105 as the speed reducing ratio of the complex planetary gear unit 1 shown in FIG. 15 may be calculated based on the first speed reducing ratio $R_{21}$ and the intermediate speed reducing ratio $R_{20}$ using the following formula:

$$R_{22} = 1/\{1/R_{21} + (1 - 1/R_{21})/R_{20}\}$$
$$= 1/\{1/(-18) + (1 - 1/(-18)) \cdot 9.5\}$$
$$\approx 18.$$

In the complex planetary gear unit 1 shown in FIG. 15, the third sun gear 105 serving as the output element is rotated in the same direction as the carrier 12 serving as an input element.

Thus, in the complex planetary gear unit 1 shown in FIG. 15, the second sun gear 104 and the third sun gear 105 are rotated differentially in opposite directions by rotating the carrier 12 by the control torque. As described, the first speed reducing ratio $R_{21}$ as a ratio of a rotational speed of the second sun gear 104 to a rotational speed of the carrier 12 and the second speed reducing ratio $R_{22}$ as a ratio of a rotational speed of the third sun gear 105 to a rotational speed of the carrier 12 are equal or approximated to each other. In the complex planetary gear unit 1 shown in FIG. 15, therefore, the control torque delivered to the second sun gear 104 from the control motor 112 and the control torque delivered to the third sun gear 105 from the control motor 112 are multiplied by substantially same amplification factors.

In the complex planetary gear unit 1 shown in FIG. 15, the carrier 12 as the input element is rotated in the forward direction when the control motor 112 is rotated in the forward direction (i.e., clockwise). In this situation, the second sun gear 104 as the output element is rotated in the reverse direction (i.e., counterclockwise), and the third sun gear 105 is also rotated in the forward direction. According to the sixth example, the second speed reducing ratio $R_{22}$ of the complex planetary gear unit 1 may be changed by changing the numbers of teeth of the gears 5, 6, and 7, and the planetary gears 8, 9, 10, and 11. In addition, the rotational directions of the second gear 6 and the third gear 7 as the output elements may be switched by changing the numbers of teeth of the gears 5, 6, and 7, and the planetary gears 8, 9, 10, and 11.

As described, in the complex planetary gear unit 1 shown in FIG. 15, the first sun gear 103 serves as the first gear 5, the second sun gear 104 serves as the second gear 6, and the third sun gear 105 serves as the third gear 7. In the complex planetary gear unit 1 shown in FIG. 15, the rotational directions of the second sun gear 104 and the third sun gear 105 may be switched arbitrarily between the forward direction and the reverse direction by adjusting the numbers of teeth of the gears in such a manner as to satisfy all of the following relational expressions.

For example, in a case of rotating the second sun gear 104 in the reverse direction and rotating the third sun gear 105 in the forward direction, the numbers of teeth $z_{p1}$, $z_{p2}$, $z_{p3}$, $z_{p4}$, $z_{s11}$, $z_{s12}$, and $z_{s13}$ of the first planetary gear 8, the second planetary gear 9, the third planetary gear 10, the fourth planetary gear 11, the first sun gear 103, the second sun gear 104, and the third sun gear 105 are set such that all of the following relational expressions are satisfied:

$z_{p2}=z_{p3}=z_{p1}+1$;

$z_{p4}=z_{p1}-1$; and $z_{s11}=z_{s12}=z_{s13}$.

By contrast, in a case of rotating the second sun gear 104 in the forward direction and rotating the third sun gear 105 in the reverse direction, the numbers of teeth $z_{p1}$, $z_{p2}$, $z_{p3}$, $z_{p4}$, $z_{s11}$, $z_{s12}$, and $z_{s13}$ of the first planetary gear 8, the second planetary gear 9, the third planetary gear 10, the fourth planetary gear 11, the first sun gear 103, the second sun gear 104, and the third sun gear 105 are set such that all of the following relational expressions are satisfied:

$$z_{p2}=z_{p3}=z_{p1}-1;$$

$$z_{p4}=z_{p1}+1; \text{ and}$$

$$z_{s11}=z_{s12}=z_{s13}.$$

Figure 16:
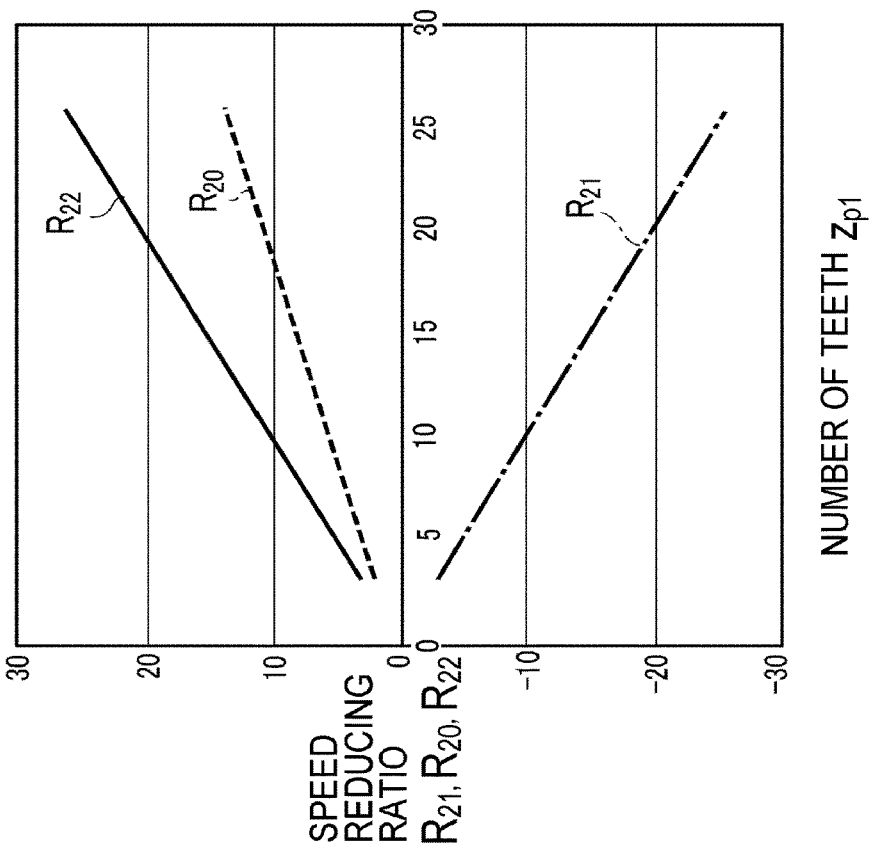
FIG. 16A is a table indicating a relation between the numbers of teeth of the gears and a speed reducing ratio of the complex planetary gear unit according to the sixth example in a case of rotating the output shaft in the forward direction.
FIG. 16B is a graph indicating a relation between the number of teeth of the first planetary gear and the speed reducing ratio of the complex planetary gear unit according to the sixth example in the case of rotating the output shaft in the forward direction.
Figure 17:
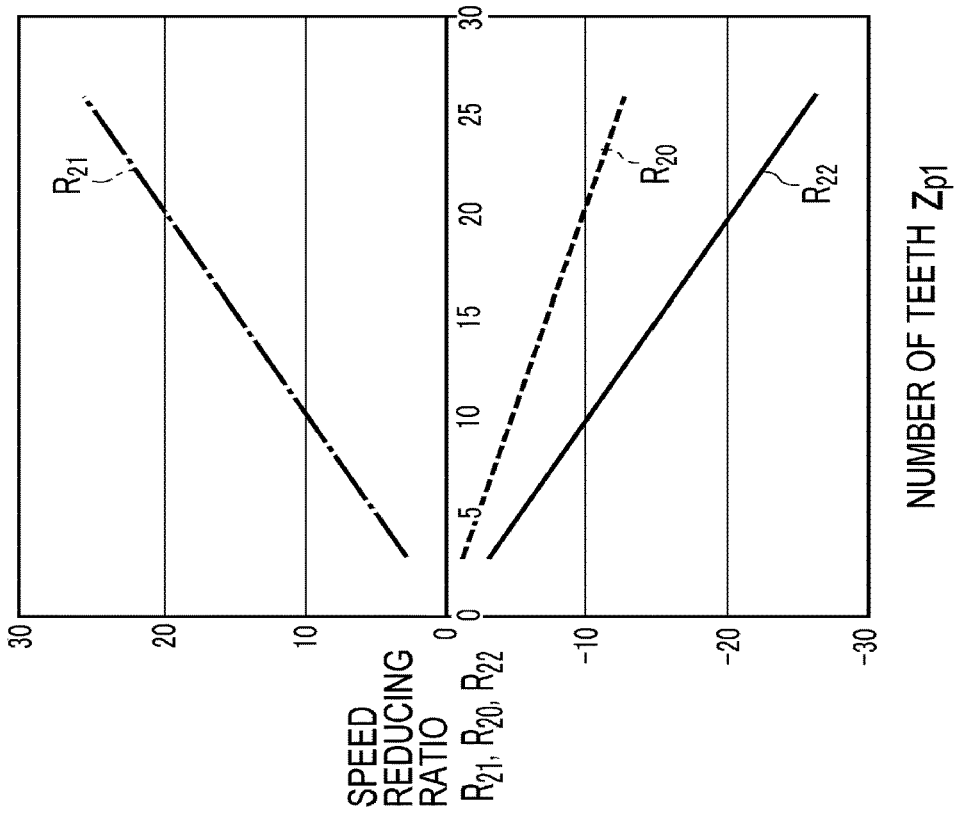
FIG. 17A is a table indicating a relation between the numbers of teeth of the gears and a speed reducing ratio of the complex planetary gear unit according to the sixth example in a case of rotating the output shaft in the reverse direction.
FIG. 17B is a graph indicating a relation between the number of teeth of the first planetary gear and the speed reducing ratio of the complex planetary gear unit according to the sixth example in the case of rotating the output shaft in the reverse direction.

FIG. 16A is a table indicating a relation between the numbers of teeth $z_{p1}$, $z_{p2}$, $z_{p3}$, $z_{p4}$, $z_{s11}$, $z_{s12}$, and $z_{s13}$ of the above-mentioned gears and the speed reducing ratios $R_{20}$, $R_{21}$, and $R_{22}$ in the complex planetary gear unit 1 shown in FIG. 15, in the case of rotating the third sun gear 105 in the forward direction. On the other hand, FIG. 16B is a graph indicating a relation between the number of teeth $z_{p1}$ of the first planetary gear 8 and each of the speed reducing ratios $R_{20}$, $R_{21}$, and $R_{22}$ in the complex planetary gear unit 1 in the case of rotating the third sun gear 105 in the forward direction. Whereas, FIG. 17A is a table indicating a relation between the numbers of teeth $z_{p1}$, $z_{p2}$, $z_{p3}$, $z_{p4}$, $z_{s11}$, $z_{s12}$, and $z_{s13}$ of the above-mentioned gears and the speed reducing ratios $R_{20}$, $R_{21}$, and $R_{22}$ in the complex planetary gear unit 1 shown in FIG. 15, in the case of rotating the third sun gear 105 in the reverse direction. On the other hand, FIG. 17B is a graph indicating a relation between the number of teeth $z_{p1}$ of the first planetary gear 8 and each of the speed reducing ratios $R_{20}$, $R_{21}$, and $R_{22}$ in the complex planetary gear unit 1 in the case of rotating the third sun gear 105 in the reverse direction. As can be seen from FIGS. 16A, 16B, 17A, and 17B, in the complex planetary gear unit 1 shown in FIG. 15, both of the speed reducing ratios $R_{21}$, and $R_{22}$ are greater than 25. According to the sixth example, the control torque of the control motor 112 may be increased with such large speed reducing ratios, and hence the control motor 112 may be downsized.

In addition, as described, all of the first gear 5, the second gear 6, and the third gear 7 are external gears. That is, the complex planetary gear unit 1 shown in FIG. 15 is formed by combining the first complex planetary gear set with the second complex planetary gear set each of which does not have a ring gear. For this reason, a size of the complex planetary gear unit 1 shown in FIG. 15 can be reduced in the radial direction. Consequently, the differential mechanism 100 combined with the complex planetary gear unit 1 shown in FIG. 15 and the control motor 112 may also be downsized.

Seventh Example

Figure 18:
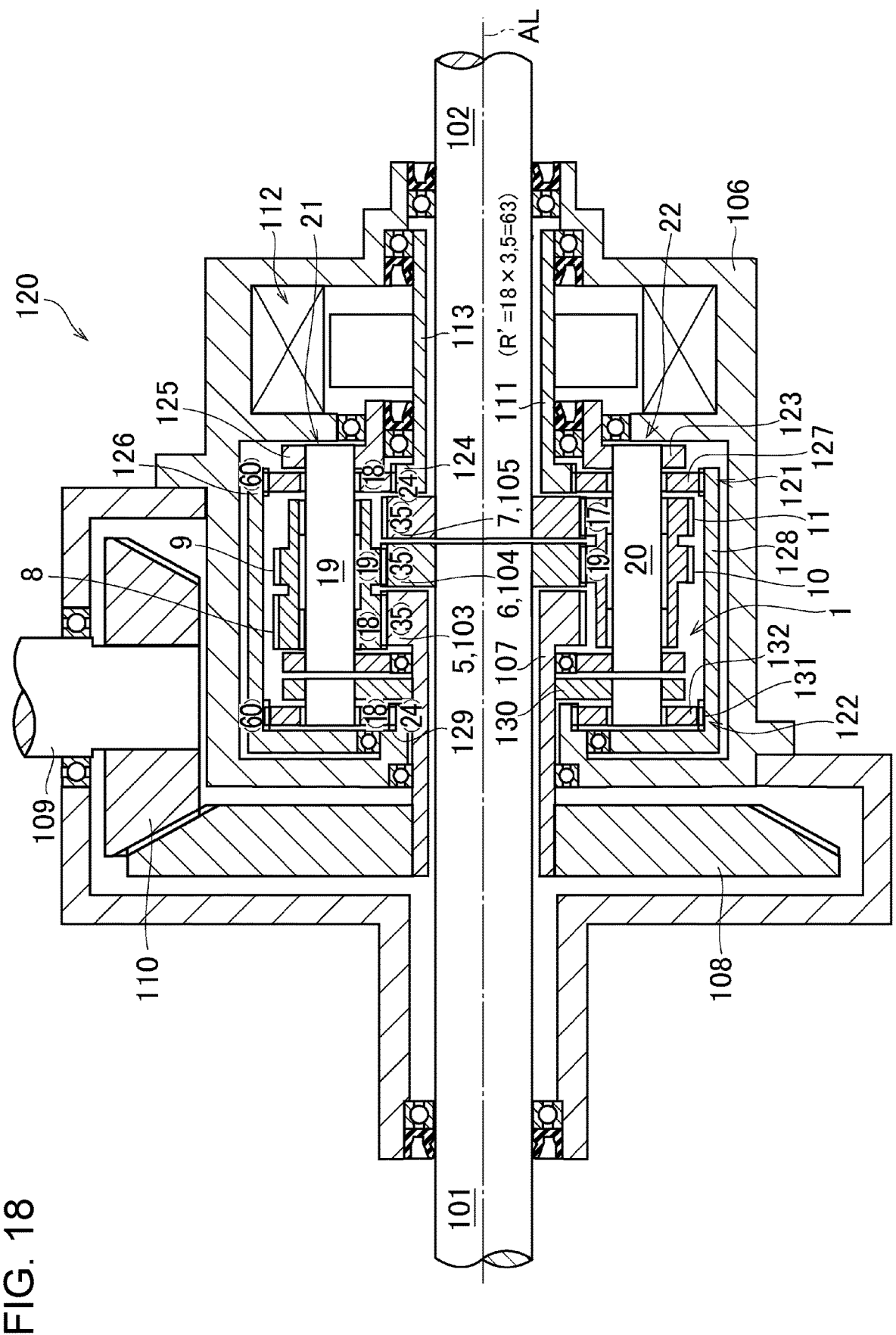
FIG. 18 is a cross-sectional view showing a structure of the complex planetary gear unit according to a seventh example of the present disclosure.

Turning to FIG. 18, there is shown a structure of the complex planetary gear unit 1 according to the seventh example of the present disclosure. According to the seventh example, the complex planetary gear unit 1 is also combined with a differential mechanism 120 that distributes torque to right and left wheels (not shown), and provided with a mechanism to prevent a passive rotation of the control motor 112.

When the first rotary shaft 101 and the second rotary shaft 102 rotate in the same direction at a same speed, the complex planetary gear unit 1 shown e.g., in FIG. 18 is rotated integrally and passively. In this situation, if the control motor 112 is also rotated passively, a power transmitting efficiency of the complex planetary gear unit 1 may be reduced. In order to avoid such passive rotation of the control motor 112, according to the seventh example of the present disclosure, the complex planetary gear unit 1 shown in FIG. 18 is provided with a speed reducing planetary gear set 121 and a speed increasing planetary gear set 122.

In the complex planetary gear unit 1 shown in FIG. 18, the speed reducing planetary gear set 121 is arranged between the control motor 112 and a carrier 123 to multiply the control torque applied to the carrier 123 from the control motor 112. Specifically, when the differential ring gear 108, the first rotary shaft 101, and the second rotary shaft 102 are rotated integrally, the speed reducing planetary gear set 121 reduces a rotational speed of the carrier 123 with respect to a rotational speed of the output shaft 113 of the control motor 112. According to the seventh example, the carrier 123 supports the first planetary gear 8, the second planetary gear 9, the third planetary gear 10, and the fourth planetary gear 11 in a rotatable manner, without being connected to any of rotary members.

Specifically, the speed reducing planetary gear set 121 is a single-pinion planetary gear set formed coaxially with the first rotary shaft 101 and the second rotary shaft 102. The speed reducing planetary gear set 121 comprises a reduction sun gear 124, a reduction carrier 125, a reduction ring gear 126, and a planetary gear 127.

The reduction sun gear 124 is formed around one end of the hollow rotary shaft 111 that is supported by the case 106 in a rotatable manner. The rotary shaft 111 is joined to the output shaft 113 of the control motor 112 so that the reduction sun gear 124 is rotated integrally with the output shaft 113.

The reduction carrier 125 supports the planetary gear 127 in a rotatable manner. Specifically, the carrier 123 of the complex planetary gear unit 1 serves as the reduction carrier 125, that is, the reduction carrier 125 is rotated integrally with the carrier 123 of the complex planetary gear unit 1. As explained later, when the differential ring gear 108, the first rotary shaft 101, and the second rotary shaft 102 are rotated integrally, a rotational speed of the reduction carrier 125 is reduced lower than a rotational speed of the reduction ring gear 126.

The reduction ring gear 126 as an internal gear is meshed with the planetary gear 127 while being supported by the case 106 in a rotatable manner. Specifically, the reduction ring gear 126 is connected to an after-mentioned speed increasing ring gear 131 of the speed increasing planetary gear set 122 through a connection member 128 as a cover member covering the complex planetary gear unit 1. That is, the reduction ring gear 126 is rotated integrally with the connection member 128 and the speed increasing ring gear 131.

Specifically, when the reduction sun gear 124 is rotated by the control torque delivered from the output shaft 113, the reduction ring gear 126 serves as a reaction element of the speed reducing planetary gear set 121 so that a rotational speed of the reduction carrier 125 is reduced lower than a rotational speed of the reduction sun gear 124. That is, the speed reducing planetary gear set 121 serves as a speed reducing mechanism of the control motor 112 so that the control torque of the control motor 112 is delivered to the carrier 123 while being multiplied by the speed reducing planetary gear set 121.

As indicated in FIG. 18, the number of teeth of the reduction sun gear 124 is 24, the number of teeth of the reduction ring gear 126 is 60, and the number of teeth of the planetary gear 127 is 18. Accordingly, a speed reducing ratio of the speed reducing planetary gear set 121 is 3.5. Therefore, based on the fact that the speed reducing ratio of the complex planetary gear unit 1 shown in FIG. 15 (i.e., the second speed reducing ratio $R_{22}$ between the carrier 12 and the third sun gear 105) is 18, an actual speed reducing ratio R' of the complex planetary gear unit 1 shown in FIG. 18 taking into account the speed reducing ratio of the speed reducing planetary gear set 121 is:

$R'=18\cdot 3.5=63.$

Thus, the speed reducing ratio of the complex planetary gear unit 1 shown in FIG. 18 is multiplied by the speed reducing planetary gear set 121.

The speed increasing planetary gear set 122 is also a single-pinion planetary gear set arranged coaxially with the first rotary shaft 101 and the second rotary shaft 102. The speed increasing planetary gear set 122 comprises a speed increasing sun gear 129, a speed increasing carrier 130, the speed increasing ring gear 131, and a planetary gear 132.

The speed increasing sun gear 129 may be formed around a hollow shaft that is not allowed to rotate. For example, the speed increasing sun gear 129 is fitted onto a flange (not shown) formed integrally with the case 106. That is, the speed increasing sun gear 129 is not allowed to rotate.

The speed increasing carrier 130 supports the planetary gear 132 in a rotatable manner. Specifically, the speed increasing carrier 130 is connected to the differential ring gear 108 through the rotary shaft 107 of the first sun gear 103 so that the speed increasing carrier 130 is rotated integrally with the first sun gear 103 and the differential ring gear 108.

The speed increasing ring gear 131 as an internal gear is meshed with the planetary gear 132 while being supported by the case 106 in a rotatable manner together with the reduction ring gear 126 of the speed reducing planetary gear set 121. As described, the speed increasing ring gear 131 is connected to the reduction ring gear 126 through the connection member 128 so that the speed increasing ring gear 131 is rotated integrally with the reduction ring gear 126. When the speed increasing carrier 130 is rotated, a rotational speed of the speed increasing ring gear 131 is increased higher than a rotational speed of the speed increasing carrier 130.

Specifically, when the speed increasing carrier 130 is rotated by the torque delivered from the differential ring gear 108, the speed increasing sun gear 129 serves as a reaction element of the speed increasing planetary gear set 122 so that a rotational speed of the speed increasing ring gear 131 is increased higher than a rotational speed of the speed increasing carrier 130. Thus, the speed increasing planetary gear set 122 serves as a speed increasing mechanism.

As indicated in FIG. 18, the number of teeth of the speed increasing sun gear 129 is 24, the number of teeth of the speed increasing ring gear 131 is 60, and the number of teeth of the planetary gear 132 is 18. Thus, the number of teeth of the speed increasing sun gear 129 is equal to that of the reduction sun gear 124, the number of teeth of the speed increasing ring gear 131 is equal to that of the reduction ring gear 126, and the number of teeth of the planetary gear 132 is equal to that of the planetary gear 127. Accordingly, a gear ratio (or speed ratio) of the speed increasing planetary gear set 122 is equal to that of the speed reducing planetary gear set 121.

As described, when the first rotary shaft 101 and the second rotary shaft 102 rotate in the same direction at the same speed, the complex planetary gear unit 1 shown in FIG. 18 is rotated integrally and passively. Consequently, the speed increasing carrier 130 of the speed increasing planetary gear set 122 and the reduction carrier 125 of the speed reducing planetary gear set 121 are rotated in the same direction at the same speed. In this situation, the speed increasing planetary gear set 122 in which the speed increasing sun gear 129 is fixed serves as a speed increasing mechanism to increase a rotational speed of the speed increasing ring gear 131 higher than a rotational speed of the speed increasing carrier 130. On the other hand, the speed reducing planetary gear set 121 serves as a speed reducing mechanism to reduce a rotational speed of the reduction carrier 125 lower than a rotational speed of the reduction ring gear 126. As described, since the speed increasing carrier 130 and the reduction carrier 125 are rotated at the same speed, and the reduction ring gear 126 and the speed increasing ring gear 131 are connected to each other, the reduction ring gear 126 and the speed increasing ring gear 131 are also rotated at a same speed. Consequently, an absolute value of the speed increasing ratio of the speed increasing planetary gear set 122 and an absolute value of the speed reducing ratio of the speed reducing planetary gear set 121 are equalized to each other. In this situation, since a rotational speed of the speed increasing sun gear 129 is zero, the rotational speed of the reduction sun gear 124 is reduced to substantially zero that is lower than the rotational speed of the reduction ring gear 126, in accordance with the gear ratio of the speed reducing planetary gear set 121. That is, since the gear ratio of the speed increasing planetary gear set 122 and the gear ratio of the speed reducing planetary gear set 121 are equal, the rotational speed of the reduction sun gear 124 is reduced to substantially zero. Therefore, when the first rotary shaft 101 and the second rotary shaft 102 rotate in the same direction at the same speed so that the complex planetary gear unit 1 shown in FIG. 18 is rotated integrally and passively, a rotational speed of the output shaft 113 of the control motor 112 connected to the reduction sun gear 124 is maintained to zero. Consequently, the control motor 112 can be prevented from being rotated passively.

By thus preventing the passive rotation of the control motor 112, according to the seventh example, a power transmission efficiency and an energy efficiency of the differential mechanism 120 can be improved. In addition, since the control motor 112 will not be rotated passively when the vehicle travelling in a straight line, the differential mechanism 120 will not be subjected to an inertia torque of the control motor 112 even if the vehicle is accelerated or decelerated abruptly. For this reason, it is not necessary to execute an additional control to generate a cancel torque against an inertia torque of the control motor 112. That is, a torque vectoring control of the differential mechanism 120 using the control motor 112 can be simplified.

Eighth Example

Figure 19:
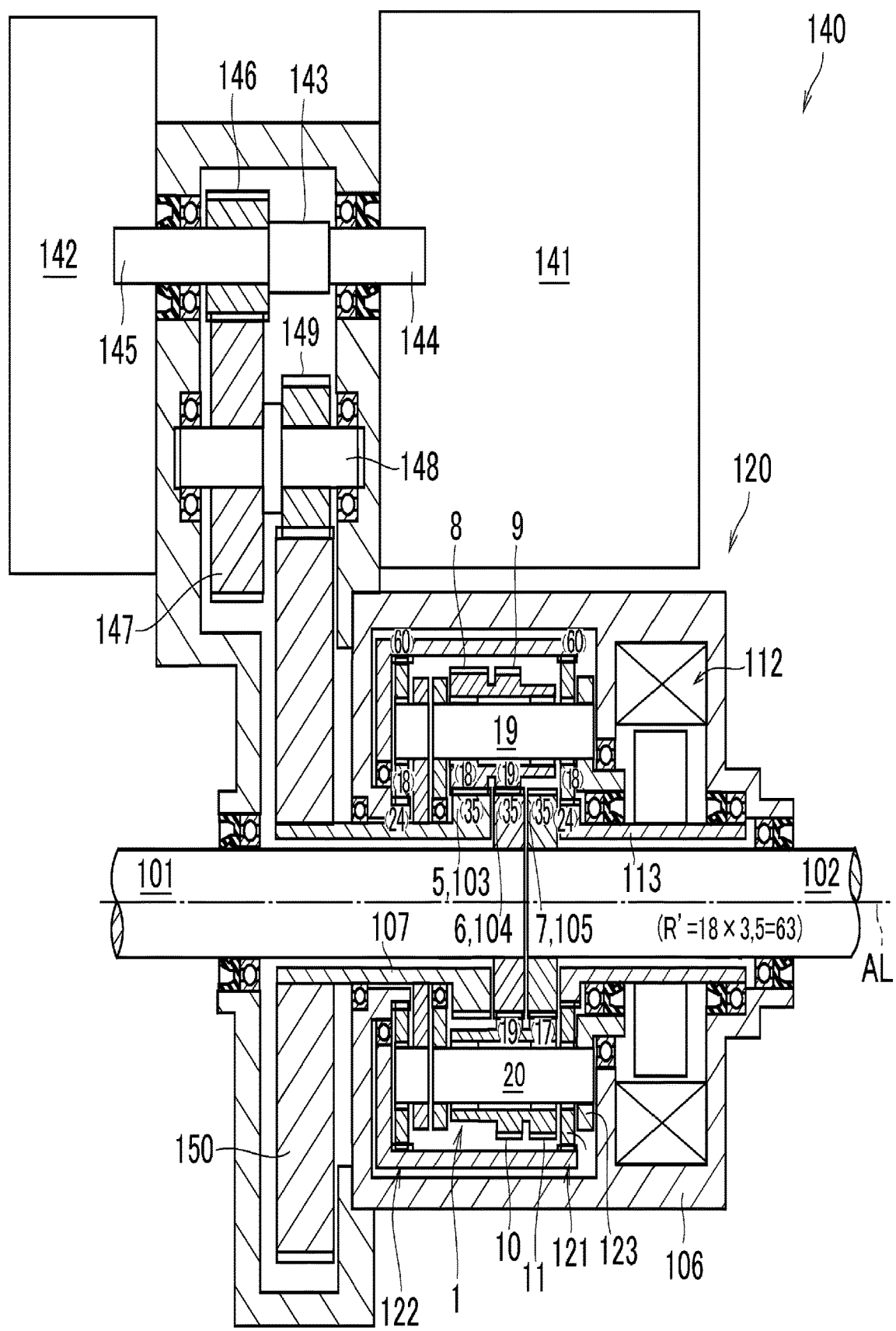
FIG. 19 is a cross-sectional view showing a structure of the complex planetary gear unit according to an eighth example of the present disclosure.

Turning to FIG. 19, there is shown a structure of the complex planetary gear unit 1 according to the eighth example of the present disclosure. According to the eighth example, as the seventh example, the complex planetary gear unit 1 is also combined with the differential mechanism 120 and a prime mover to serve as a power unit 140 having a torque vectoring function.

The prime mover of the power unit 140 includes a drive motor 141 and a brake device 142. The drive motor 141 generates a drive torque to accelerate the vehicle, and a regenerative torque to decelerate the vehicle. For example, a permanent magnet type synchronous motor or an induction motor may be adopted as the drive motor 141. On the other hand, the brake device 142 generates a regenerative torque as a counter torque to apply a brake force to the vehicle. An output shaft 144 of the drive motor 141 and a rotary shaft 145 of the brake device 142 are connected to each other through a connection shaft 143. For example, the brake device 142 includes: an electromagnetic brake that applies a braking force to a rotary member by electrically generated magnetic attraction; an electric brake that applies a frictional braking force to a rotary member by a feed screw mechanism actuated by a motor; and a regenerative brake that applies a braking force derived from a resistance to a rotary member by regenerating electricity by a motor. That is, the complex planetary gear unit 1 having the differential mechanism 120 is combined with a drive motor assembly having a braking function.

A pinion 146 is mounted on the rotary shaft 145 to be rotated integrally with the rotary shaft 145. A counter shaft 148 extends radially inner side of a unit of the output shaft 144, the connection shaft 143, and the rotary shaft 145 in parallel therewith while being supported by the case 106 in a rotatable manner. A first counter gear 147 is mounted on the counter shaft 148 to be meshed with the pinion 146, and a second counter gear 149 is mounted on the counter shaft 148. The first counter gear 147, the counter shaft 148, and the second counter gear 149 are rotated entirely integrally. The second counter gear 149 is meshed with an input gear 150 mounted on the rotary shaft 107 of the first sun gear 103 of the complex planetary gear unit 1 to be rotated integrally with the first sun gear 103.

The first counter gear 147 is diametrically larger than the pinion 146, and the number of teeth of the first counter gear 147 is larger than the number of teeth of the pinion 146. Whereas, the second counter gear 149 is diametrically smaller than the input gear 150, and the number of teeth of the second counter gear 149 is smaller than the number of teeth of the input gear 150. That is, the pinion 146, the first counter gear 147, the second counter gear 149, and the input gear 150 serve as a reduction gear set to reduce an output speed from the input gear 150 with respect to an input speed to the pinion 146. In other words, a torque generated by the drive motor 141 or the brake device 142 is deliver to the first sun gear 103 of the complex planetary gear unit 1 while being multiplied by the reduction gear set.

Thus, according to the eighth example, the complex planetary gear unit 1 shown in FIG. 19 is combined with the drive motor 141 and the brake device 142 to serve as the power unit 140 having the torque vectoring function. Here, it is to be noted that any one of the drive motor 141 and the brake device 142 may be omitted. In this case, the power unit 140 serves as a motor drive unit or a brake unit having a torque vectoring function.

Ninth Example

Figure 20:
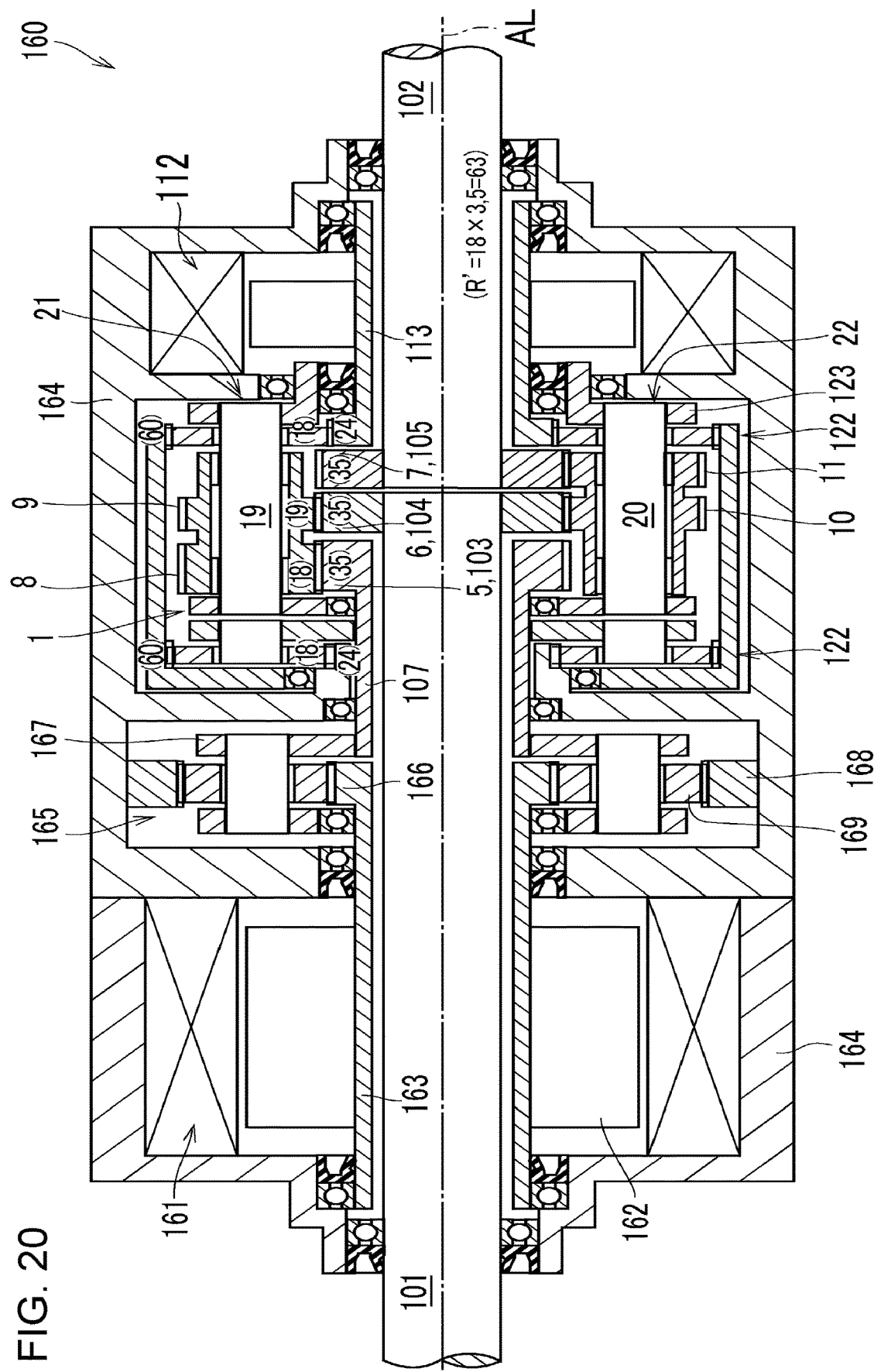
FIG. 20 is a cross-sectional view showing a structure of the complex planetary gear unit according to a ninth example of the present disclosure.

Turning to FIG. 20, there is shown a structure of the complex planetary gear unit 1 according to the ninth example of the present disclosure. According to the ninth example, the complex planetary gear unit 1 shown in FIG. 20 is arranged in a center differential mechanism 160 that is to be mounted on a four-wheel drive layout vehicle (not shown). In the complex planetary gear unit 1 shown in FIG. 20, the first rotary shaft 101 and the second rotary shaft 102 extend coaxially with each other along a longitudinal direction of the vehicle.

The center differential mechanism 160 comprises a drive motor 161 formed around the first rotary shaft 101. The drive motor 161 serves as a prime mover that generates a torque to rotate or brake the first rotary shaft 101 and the second rotary shaft 102. To this end, for example, a permanent magnet type synchronous motor or an induction motor may be adopted as the drive motor 161.

The drive motor 161 comprises a hollow rotor shaft 163 that is supported by a case 164 in a rotatable manner, and a hollow rotor 162 that is mounted on the rotor shaft 163. The drive motor 161 is held in the case 164, and the case 164 is joined to the case holding the complex planetary gear unit 1 shown in FIG. 20 and the control motor 112. The first rotary shaft 101 penetrates through a hollow space of the rotor shaft 163 while being allowed to rotate relatively with the rotor shaft 163.

The rotor shaft 163 is connected to the first sun gear 103 through a reduction gear set 165 so that the output torque of the drive motor 161 is delivered to the first sun gear 103 while being multiplied by the reduction gear set 165. Specifically, the reduction gear set 165 comprises a sun gear 166, a carrier 167, a ring gear 168, and a planetary gear 169.

The sun gear 166 is formed around one end of the rotor shaft 163 to be rotated integrally with the rotor shaft 163. The carrier 167 supporting the planetary gear 169 in a rotatable manner is mounted on the rotary shaft 107 of the first sun gear 103 of the complex planetary gear unit 1 to be rotated integrally with the first sun gear 103. The ring gear 168 as an internal gear meshing with the planetary gear 169 is fixed to an inner surface of the case of the complex planetary gear unit 1. That is, the ring gear 168 is not allowed to rotate.

When the torque of the drive motor 161 is delivered to the sun gear 166, the ring gear 168 serves as a reaction element of the reduction gear set 165 so that a rotational speed of the carrier 167 is reduced lower than a rotational speed of the sun gear 166. That is, the torque of the drive motor 161 is delivered to the first sun gear 103 while being multiplied by the reduction gear set 165.

Thus, according to the ninth example, the complex planetary gear unit 1 shown in FIG. 20 may be arranged coaxially with the drive motor 161 in the center differential mechanism 160. For example, the center differential mechanism 160 may be mounted on a four-wheel drive layout vehicle to serve as a compact power unit having a torque vectoring function.

Tenth Example

Figure 21:
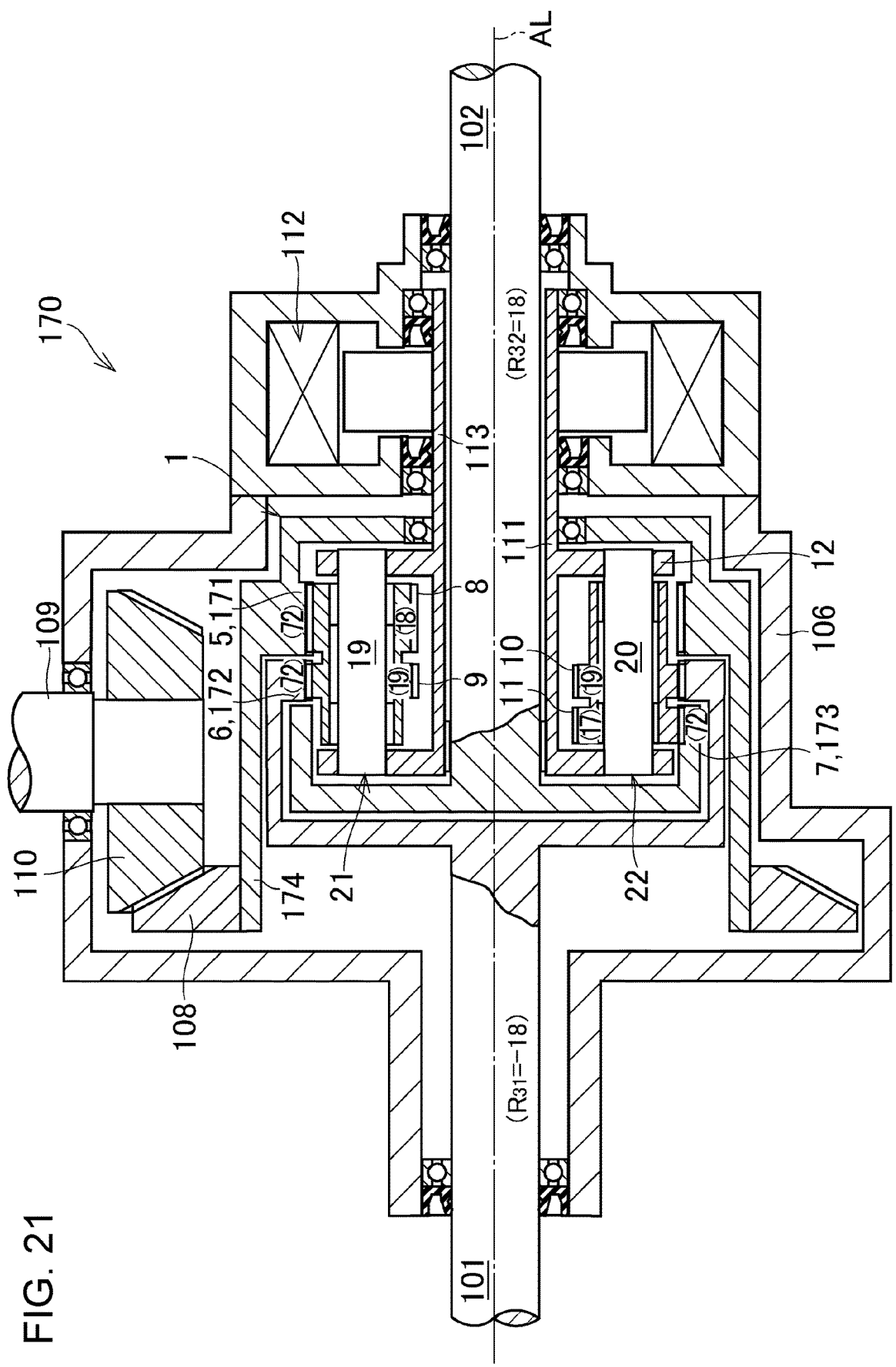
FIG. 21 is a cross-sectional view showing a structure of the complex planetary gear unit according to a tenth example of the present disclosure.

Turning to FIG. 21, there is shown a structure of the complex planetary gear unit 1 according to the tenth example of the present disclosure. According to the tenth example, as the sixth example, the complex planetary gear unit 1 is also arranged in a differential mechanism 170 to be mounted on a vehicle to distribute torque to right and left wheels (not shown). In the complex planetary gear unit 1 shown in FIG. 21, the third gear 7, the second gear 6, and the first gear 5, are arranged in order from left to right while being allowed to rotate relatively to one another. According to the tenth example, an internal gear is adopted as the first gear 5, the second gear 6, and the third gear 7, respectively. Specifically, a first ring gear 171 meshing with the first planetary gear 8 serves as the first gear 5, a second ring gear 172 meshing with the second planetary gear 9 and the third planetary gear 10 serves as the second gear 6, and a third ring gear 173 meshing with the fourth planetary gear 11 serves as the third gear 7.

The first ring gear 171 is supported by the case 106 of the complex planetary gear unit 1 and the differential mechanism 170. The second ring gear 172 and the third ring gear 173 are supported respectively in a rotatable manner so that the first ring gear 171, the second ring gear 172, and the third ring gear 173 are allowed to rotate relatively to one another.

The differential ring gear 108 is fitted onto a rotary shaft 174 of the first ring gear 171 so that the differential ring gear 108, the rotary shaft 174, and the first ring gear 171 are rotated integrally. Specifically, the differential ring gear 108 as a diametrically larger bevel gear is meshed with the drive pinion 110 as a diametrically smaller bevel gear that is fitted onto a leading end of the propeller shaft 109 of the vehicle (not shown). The number of teeth of the drive pinion 110 is less than the number of teeth of the differential ring gear 108. That is, the drive pinion 110 and the differential ring gear 108 serve as a final reduction gear unit of the vehicle. The other end of the propeller shaft 109 (not shown) is joined to a prime mover such as an internal combustion engine, an electric motor, a brake device or the like so that a drive torque to propel the vehicle or a brake torque to decelerate the vehicle generated by the prime mover is delivered to the differential ring gear 108 through the propeller shaft 109 and the drive pinion 110.

The second ring gear 172 is connected to the first rotary shaft 101 to rotate integrally therewith, and the third ring gear 173 is connected to the second rotary shaft 102 to rotate integrally therewith. The first rotary shaft 101 and the second rotary shaft 102 extend coaxially along the rotational center axis AL while being allowed to rotate relatively to each other. Specifically, the first rotary shaft 101 is supported by the case 106 in a rotatable manner, and a leading end of the first rotary shaft 101 protrudes from one side of the case 106 to be connected to one of the right wheel and the left wheel (neither of which are shown) of the vehicle. On the other hand, the second rotary shaft 102 is also supported by the case 106 in a rotatable manner, and a leading end of the second rotary shaft 102 protrudes from the other side of the case 106 to be connected to the other one of the right wheel and the left wheel of the vehicle.

The carrier 12 is arranged coaxially with the first ring gear 171, the second ring gear 172, and the third ring gear 173 while being allowed to rotate relatively to those ring gears 171, 172, and 173. Specifically, a rotary shaft 111 of the carrier 12 is joined to the output shaft 113 of the control motor 112 so that the carrier 12 is rotated integrally with the rotary shaft 111 and the output shaft 113.

The drive torque delivered to the first ring gear 171 from the prime mover is distributed to the first rotary shaft 101 through the second ring gear 172 and to the second rotary shaft 102 through the third ring gear 173. On the other hand, the control torque applied to the carrier 12 from the control motor 112 is delivered to the first rotary shaft 101 through the second ring gear 172 while being multiplied, and to the second rotary shaft 102 through the third ring gear 173 while being multiplied. Consequently, the first rotary shaft 101 and the second rotary shaft 102 are rotated relatively to each other in opposite directions.

As described, in the complex planetary gear unit 1, a gear ratio between the first planetary gear 8 and the first gear 5 and a gear ratio between the second planetary gear 9 and the second gear 6 are set to different ratios. Likewise, a gear ratio between the third planetary gear 10 and the second gear 6 and a gear ratio between the fourth planetary gear 11 and the third gear 7 are set to different ratios.

In the complex planetary gear unit 1 shown in FIG. 21, specifically, a gear ratio $u_{31}$ between the first planetary gear 8 and the first ring gear 171 and a gear ratio $u_{32}$ between the second planetary gear 9 and the second ring gear 172 are different from each other. Likewise, a gear ratio $u_{33}$ between the third planetary gear 10 and the second ring gear 172 and a gear ratio $u_{34}$ between the fourth planetary gear 11 and the third ring gear 173 are different from each other. According to the tenth example, the gear ratio $u_{31}$ is defined as a ratio of the number of teeth $z_{p1}$ of the first planetary gear 8 to the number of teeth $z_{r11}$ of the first ring gear 171, the gear ratio $u_{32}$ is defined as a ratio of the number of teeth $z_{p2}$ of the second planetary gear 9 to the number of teeth $z_{r12}$ of the second ring gear 172, the gear ratio $u_{33}$ is defined as a ratio of the number of teeth $z_{p3}$ of the third planetary gear 10 to the number of teeth $z_{r12}$ of the second ring gear 172, and the gear ratio $u_{34}$ is defined as a ratio of the number of teeth $z_{p4}$ of the fourth planetary gear 11 to the number of teeth $z_{r13}$ of the third ring gear 173.

In the complex planetary gear unit 1 shown in FIG. 21, the number of teeth $z_{p1}$ of the first planetary gear 8 is 18, the number of teeth $z_{p2}$ of the second planetary gear 9 is 19, the number of teeth $z_{r11}$ of the first ring gear 171 is 72, and the number of teeth $z_{r12}$ of the second ring gear 172 is 72. Accordingly, the gear ratio $u_{31}$ between the first planetary gear 8 and the first ring gear 171 may be expressed as:

$$u_{31}=z_{p1}/z_{r1}=18/72=0.25;\text{ and}$$

the gear ratio $u_{32}$ between the second planetary gear 9 and the second ring gear 172 may be expressed as:

$$u_{32}=z_{p2}/z_{r12}=19/72=0.264.$$

As described, the number of teeth $z_{r11}$ of the first ring gear 171 and the number of teeth $z_{r12}$ of the second ring gear 172 are equal, and the number of teeth $z_{p1}$ of the first planetary gear 8 is one less than the number of teeth $z_{p2}$ of the second planetary gear 9. For these reasons, the gear ratio $u_{31}$ and the gear ratio $u_{32}$ are slightly different from each other.

On the other hand, the number of teeth $z_{p3}$ of the third planetary gear 10 is 19, the number of teeth $z_{p4}$ of the fourth planetary gear 11 is 17, the number of teeth $z_{r12}$ of the second ring gear 172 is 72, and the number of teeth $z_{r13}$ of the third ring gear 173 is 72. Accordingly, the gear ratio $u_{33}$ between the third planetary gear 10 and the second ring gear 172 may be expressed as:

$$u_{33}=z_{p3}/z_{r12}=19/72\approx0.264;\text{ and}$$

the gear ratio $u_{34}$ between the fourth planetary gear 11 and the third ring gear 173 may be expressed as:

$$u_{34}=z_{p4}/z_{r13}=17/72\approx0.236.$$

As described, the number of teeth $z_{r12}$ of the second ring gear 172 and the number of teeth $z_{r13}$ of the third ring gear 173 are equal, and the number of teeth $z_{p3}$ of the third planetary gear 10 is two more than the number of teeth $z_{p4}$ of the fourth planetary gear 11. For these reasons, the gear ratio $u_{33}$ and the gear ratio $u_{34}$ are slightly different from each other.

In other words, the number of teeth $z_{p2}$ of the second planetary gear 9 is one more than the number of teeth $z_{p1}$ of the first planetary gear 8, and the number of teeth $z_{p4}$ of the fourth planetary gear 11 is two less than the number of teeth $z_{p3}$ of the third planetary gear 10. As described, the number of teeth $z_{p2}$ of the second planetary gear 9 is 19, and the number of teeth $z_{p3}$ of the third planetary gear 10 is also 19. That is, the number of teeth $z_{p3}$ of the third planetary gear 10 is one more than the number of teeth $z_{p1}$ of the first planetary gear 8, and the number of teeth $z_{p4}$ of the fourth planetary gear 11 is one less than the number of teeth $z_{p1}$ of the first planetary gear 8.

As described, the complex planetary gear unit 1 is formed by combining the first complex planetary gear set with the second complex planetary gear set. According to the tenth example shown in FIG. 21, the first complex planetary gear set comprises the first planetary gear 8, the second planetary gear 9, the first ring gear 171, and the second ring gear 172. On the other hand, the second complex planetary gear set comprises the third planetary gear 10, the fourth planetary gear 11, the second ring gear 172, and the third ring gear 173.

Thus, in the first complex planetary gear set, the gear ratio $u_{31}$ and the gear ratio $u_{32}$ are slightly different from each other. Given that the gear ratio $u_{31}$ and the gear ratio $u_{32}$ are equal, a speed reducing ratio of the first complex planetary gear set as a speed ratio of an output element to an input element would reach an infinite value, and the first complex planetary gear set would not function properly. Whereas, since the gear ratio $u_{31}$ and the gear ratio $u_{32}$ are set to different values, the speed reducing ratio of the complex planetary gear unit 1 shown in FIG. 21 can be increased while preventing the speed reducing ratio of the first complex planetary gear set from reaching the infinite value. For example, the speed reducing ratio of the first complex planetary gear set may be reduced by increasing the difference between the gear ratio $u_{31}$ and the gear ratio $u_{32}$. By contrast, the speed reducing ratio of the first complex planetary gear set may be increased by reducing the difference between the gear ratio $u_{31}$ and the gear ratio $u_{32}$.

Likewise, in the second complex planetary gear set, the gear ratio $u_{33}$ and the gear ratio $u_{34}$ are slightly different from each other. Given that the gear ratio $u_{33}$ and the gear ratio $u_{34}$ are equal, a speed reducing ratio of the second complex planetary gear set would reach an infinite value, and the second complex planetary gear set would not function properly. Whereas, since the gear ratio $u_{33}$ and the gear ratio $u_{34}$ are set to different values, the speed reducing ratio of the complex planetary gear unit 1 shown in FIG. 21 can be increased while preventing the speed reducing ratio of the second complex planetary gear set from reaching the infinite value. For example, the speed reducing ratio of the second complex planetary gear set may be reduced by increasing the difference between the gear ratio $u_{33}$ and the gear ratio $u_{34}$. By contrast, the speed reducing ratio of the second complex planetary gear set may be increased by reducing the difference between the gear ratio $u_{33}$ and the gear ratio $u_{34}$.

Given that the first rotary shaft 101 and the second rotary shaft 102 are rotated at a same speed by the torque distributed from the first ring gear 171 to the second ring gear 172 and the third ring gear 173, in the complex planetary gear unit 1 thus combined with the differential mechanism 170, the first rotary shaft 101 and the second rotary shaft 102 are rotated integrally.

As described, the number of teeth $z_{p2}$ of the second planetary gear 9 is one more than the number of teeth $z_{p1}$ of the first planetary gear 8. Therefore, given that the first rotary shaft 101 on which the second ring gear 172 is formed and the second rotary shaft 102 on which the third ring gear 173 is formed are rotated at the same speed, a rotational speed of the second ring gear 172 meshing with the second planetary gear 9 is increased higher than a rotational speed of the first ring gear 171 meshing with the first planetary gear 8 by the one more tooth of the second planetary gear 9. On the other hand, the number of teeth $z_{p4}$ of the fourth planetary gear 11 is one less than the number of teeth $z_{p1}$ of the first planetary gear 8. In this situation, therefore, a rotational speed of the third ring gear 173 meshing with the fourth planetary gear 11 is reduced lower than a rotational speed of the first ring gear 171 meshing with the first planetary gear 8 by the reduction in the number of teeth $z_{p4}$ of the fourth planetary gear 11. Consequently, the second ring gear 172 and the third ring gear 173 are rotated in opposite directions. In this situation, the second planetary gear 9 and the third planetary gear 10 revolve along the second ring gear 172, and the fourth planetary gear 11 integrated with the third planetary gear 10 revolves along the third ring gear 173. Therefore, torques are applied to an engagement site between the second ring gear 172 and the second planetary gear 9 and to an engagement site between the third ring gear 173 and the fourth planetary gear 11 in opposite directions thereby causing interference between those engagement sites. As a result, the complex planetary gear unit 1 shown in FIG. 15 is substantially brought into engagement to rotate integrally so that the first rotary shaft 101 and the second rotary shaft 102 are rotated integrally without rotating relatively to each other.

By contrast, given that the first rotary shaft 101 on which the second ring gear 172 is formed and the second rotary shaft 102 on which the third ring gear 173 is mounted are rotated at different speeds, the complex planetary gear unit 1 shown in FIG. 21 will not be brought into engagement by such interference between the above-mentioned engagement sites. In this case, the torque is distributed from the first ring gear 171 to the second ring gear 172 and to the third ring gear 173 while rotating the second ring gear 172 and the third ring gear 173 relatively to each other. Consequently, torques are applied to the engagement site between the second ring gear 172 and the second planetary gear 9 and to the engagement site between the third ring gear 173 and the fourth planetary gear 11 in opposite directions, thereby rotating the second ring gear 172 and to the third ring gear 173 in opposite directions. That is, the rotational direction of the second ring gear 172 is reversed to the opposite direction to the rotational direction of the third ring gear 173. As a result, the first rotary shaft 101 and the second rotary shaft 102 are rotated differentially in opposite directions.

According to the tenth example, a speed reducing ratio between the carrier 12 and the second ring gear 172 is referred to as a first speed reducing ratio, a speed reducing ratio between the carrier 12 and the third ring gear 173 is referred to as a second speed reducing ratio, and a speed reducing ratio between the second ring gear 172 and the third ring gear 173 is referred to as an intermediate speed reducing ratio. The second speed reducing ratio corresponds to a speed reducing ratio of the complex planetary gear unit 1 shown in FIG. 21. In the complex planetary gear unit 1 shown in FIG. 21, the first speed reducing ratio and the second speed reducing ratio are equal or approximated to each other. For example, a difference between the first speed reducing ratio and the second speed reducing ratio is reduced to less than a predetermined value. In other words, the first speed reducing ratio is a ratio of a rotational speed of the second ring gear 172 to a rotational speed of the carrier 12, the second speed reducing ratio is a ratio of a rotational speed of the third ring gear 173 to a rotational speed of the carrier 12, and the intermediate speed reducing ratio is a ratio of a rotational speed of the third ring gear 173 to a rotational speed of the second ring gear 172.

In the complex planetary gear unit 1 shown in FIG. 21, rotational speeds of both of the second ring gear 172 and the third ring gear 173 are reduced with respect to a rotational speed of the carrier 12. That is, an absolute value of each of the first speed reducing ratio, the second speed reducing ratio, and the intermediate speed reducing ratio is individually greater than 1. In the complex planetary gear unit 1 shown in FIG. 21, therefore, the control torque applied to the carrier 12 from the control motor 112 is delivered to the second ring gear 172 and the third ring gear 173 while being multiplied.

As described, in the complex planetary gear unit 1 shown in FIG. 21, the number of teeth $z_{p1}$ of the first planetary gear 8 is 18, the number of teeth $z_{p2}$ of the second planetary gear 9 is 19, the number of teeth $z_{p3}$ of the third planetary gear 10 is 19, the number of teeth $z_{p4}$ of the fourth planetary gear 11 is 17, the number of teeth $z_{r11}$ of the first ring gear 171 is 72, the number of teeth $z_{r12}$ of the second ring gear 172 is 72, and the number of teeth $z_{r13}$ of the third ring gear 173 is 72. Accordingly, the first speed reducing ratio $R_{31}$ between the carrier 12 and the second ring gear 172 may be expressed as:

$$R_{31} = 1/\{1 - (z_{r11}/z_{p1}) \cdot (z_{p2}/z_{r12})\}$$
$$= 1/\{1 - (72/18) \cdot (19/72)\}$$
$$\approx -18.$$

In the complex planetary gear unit 1 shown in FIG. 21, a rotational direction of the second ring gear 172 serving as an output element is reversed to the direction opposite to the rotational direction of the carrier 12 serving as an input element. Therefore, the first speed reducing ratio $R_{31}$ of the complex planetary gear unit 1 shown in FIG. 21 is referred to as a negative value (e.g., −18) for the sake of convenience.

Likewise, the intermediate speed reducing ratio $R_{30}$ between the second ring gear 172 and the third ring gear 173 may be expressed as:

$$R_{30} = 1/\{1 - (z_{r12}/z_{p3}) \cdot (z_{p4}/z_{r13})\}$$
$$= 1/\{1 - (72/19) \cdot (17/72)\}$$
$$\approx 9.5.$$

Accordingly, the second speed reducing ratio $R_{32}$ between the carrier 12 and the third ring gear 173 as the speed reducing ratio of the complex planetary gear unit 1 shown in FIG. 21 may be calculated based on the first speed reducing ratio $R_{31}$ and the intermediate speed reducing ratio $R_{30}$ using the following formula:

$$R_{32} = 1/\{1/R_{31} + (1 - 1/R_{31})/R_{30}\}$$
$$= 1/\{1/(-18) + (1 - 1/(-18))/9.5\}$$
$$\approx 18.$$

In the complex planetary gear unit 1 shown in FIG. 21, the third ring gear 173 serving as an output element is rotated in the same direction as the carrier 12 serving as an input element.

Thus, in the complex planetary gear unit 1 shown in FIG. 21, the second ring gear 172 and the third ring gear 173 are rotated differentially in opposite directions by rotating the carrier 12 by the control torque. As described, the first speed reducing ratio $R_{31}$ as a ratio of a rotational speed of the second ring gear 172 to a rotational speed of the carrier 12 and the second speed reducing ratio $R_{32}$ as a ratio of a rotational speed of the third ring gear 173 to a rotational speed of the carrier 12 are equal or approximated to each other. In the complex planetary gear unit 1 shown in FIG. 21, therefore, the control torque delivered to the second ring gear 172 from the control motor 112 and the control torque delivered to the third ring gear 173 from the control motor 112 are multiplied by substantially same amplification factors.

In the complex planetary gear unit 1 shown in FIG. 21, the carrier 12 as the input element is rotated in the forward direction when the control motor 112 is rotated in the forward direction (i.e., clockwise). In this situation, the second ring gear 172 as the output element is rotated in the reverse direction (i.e., counterclockwise), and the third ring gear 173 is also rotated in the forward direction. According to the tenth example, the speed reducing ratio $R_{32}$ of the complex planetary gear unit 1 may be changed by changing the numbers of teeth of the gears 5, 6, and 7, and the planetary gears 8, 9, 10, and 11. In addition, the rotational directions of the second gear 6 and the third gear 7 as the output elements may be switched by changing the numbers of teeth of the gears 5, 6, and 7, and the planetary gears 8, 9, 10, and 11.

As described, in the complex planetary gear unit 1 shown in FIG. 21, the first ring gear 171 serves as the first gear 5, the second ring gear 172 serves as the second gear 6, and the third ring gear 173 serves as the third gear 7. In the complex planetary gear unit 1 shown in FIG. 21, the rotational directions of the second ring gear 172 and the third ring gear 173 may be switched arbitrarily between the forward direction and the reverse direction by adjusting the numbers of teeth of the gears in such a manner as to satisfy all of the following relational expressions.

For example, in a case of rotating the second ring gear 172 in the reverse direction and rotating the third ring gear 173 in the forward direction, the numbers of teeth $z_{p1}$, $z_{p2}$, $z_{p3}$, $z_{p4}$, $z_{r11}$, $z_{r12}$, and $z_{r13}$ of the first planetary gear 8, the second planetary gear 9, the third planetary gear 10, the fourth planetary gear 11, the first ring gear 171, the second ring gear 172, and the third ring gear 173 are set such that all of the following relational expressions are satisfied:

$$z_{p2}=z_{p3}=z_{p1}+1;$$

$$z_{p4}=z_{p1}-1; \text{ and}$$

$$z_{r11}=z_{r12}=z_{r13}.$$

By contrast, in a case of rotating the second ring gear 172 in the forward direction and rotating the third ring gear 173 in the reverse direction, the numbers of teeth $z_{p1}$, $z_{p2}$, $z_{p3}$, $z_{p4}$, $z_{s11}$, $z_{s12}$, and $z_{s13}$ of the first planetary gear 8, the second planetary gear 9, the third planetary gear 10, the fourth planetary gear 11, the first ring gear 171, the second ring gear 172, and the third ring gear 173 are set such that all of the following relational expressions are satisfied:

$$z_{p2}=z_{p3}=z_{p1}-1;$$

$$z_{p4}=z_{p1}+1; \text{ and}$$

$$z_{r11}=z_{r12}=z_{r13}.$$

Figure 22:
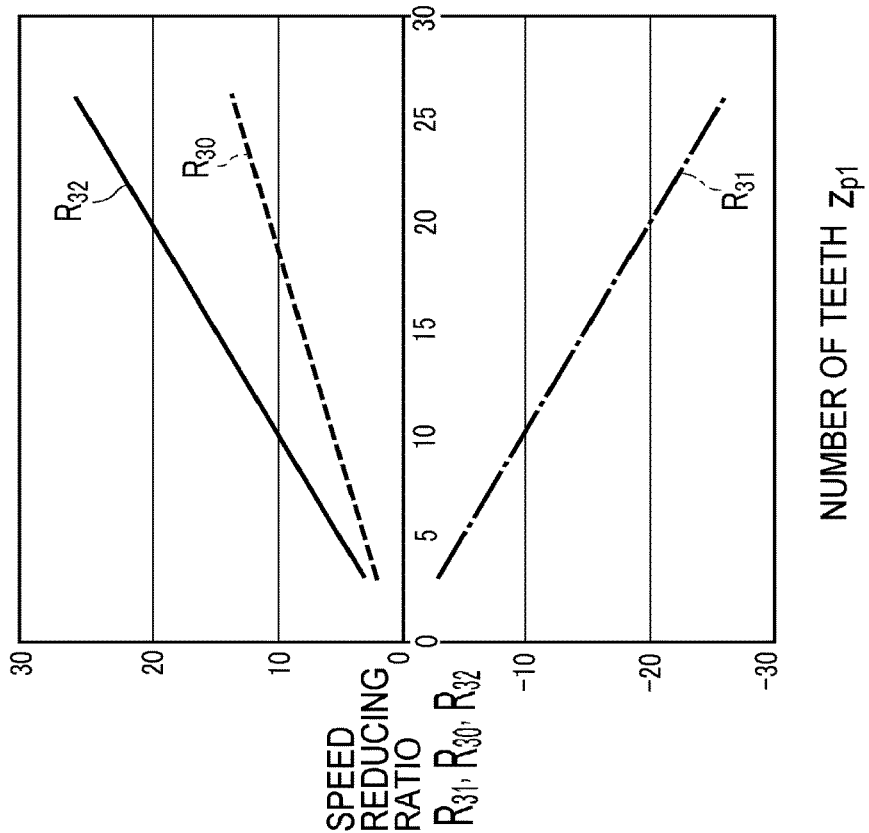
FIG. 22A is a table indicating a relation between the numbers of teeth of the gears and a speed reducing ratio of the complex planetary gear unit according to the tenth example in a case of rotating the output shaft in the forward direction.
FIG. 22B is a graph indicating a relation between the number of teeth of the first planetary gear and the speed reducing ratio of the complex planetary gear unit according to the tenth example in the case of rotating the output shaft in the forward direction.
Figure 23:
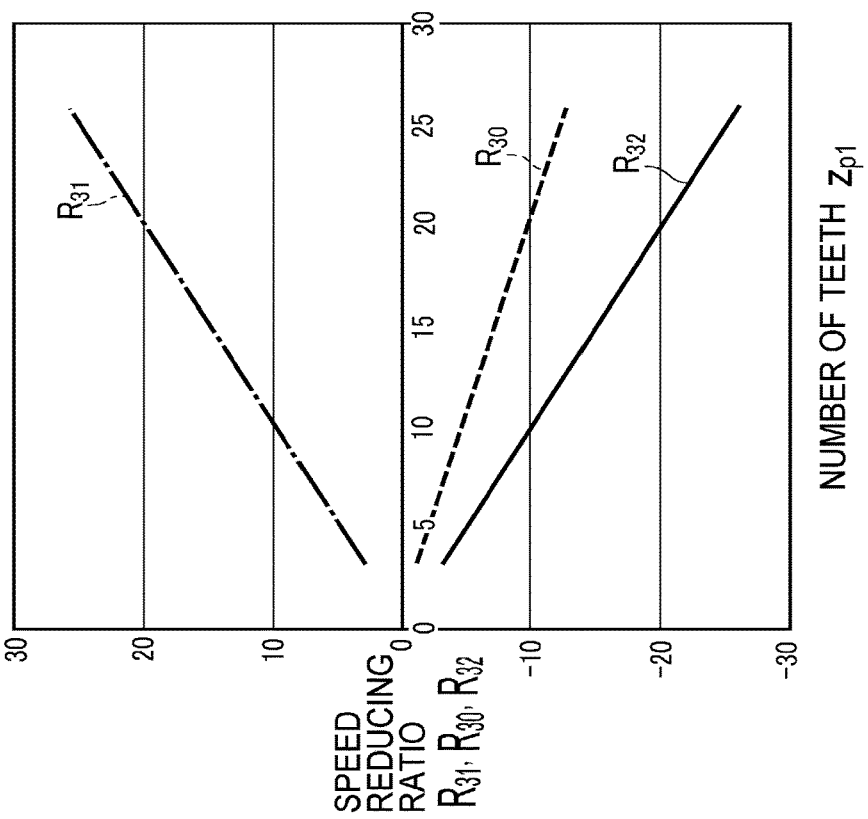
FIG. 23A is a table indicating a relation between the numbers of teeth of the gears and a speed reducing ratio of the complex planetary gear unit according to the tenth example in a case of rotating the output shaft in the reverse direction.
FIG. 23B is a graph indicating a relation between the number of teeth of the first planetary gear and the speed reducing ratio of the complex planetary gear unit according to the tenth example in the case of rotating the output shaft in the reverse direction.

FIG. 22A is a table indicating a relation between the numbers of teeth $z_{p1}$, $z_{p2}$, $z_{p3}$, $z_{p4}$, $z_{r11}$, $z_{r12}$, and $z_{r13}$ of the above-mentioned gears and the speed reducing ratios $R_{30}$, $R_{31}$, and $R_{32}$ in the complex planetary gear unit 1 shown in FIG. 21, in the case of rotating the third ring gear 173 in the forward direction. On the other hand, FIG. 22B is a graph indicating a relation between the number of teeth $z_{p1}$ of the first planetary gear 8 and each of the speed reducing ratios $R_{30}$, $R_{31}$, and $R_{32}$ in the complex planetary gear unit 1 in the case of rotating the third ring gear 173 in the forward direction. Whereas, FIG. 23A is a table indicating a relation between the numbers of teeth $z_{p1}$, $z_{p2}$, $z_{p3}$, $z_{p4}$, $z_{r11}$, $z_{r12}$, and $z_{r13}$ of the above-mentioned gears and the speed reducing ratios $R_{30}$, $R_{31}$, and $R_{32}$ in the complex planetary gear unit 1 shown in FIG. 21, in the case of rotating the third ring gear 173 in the reverse direction. On the other hand, FIG. 23B is a graph indicating a relation between the number of teeth $z_{p1}$ of the first planetary gear 8 and each of the speed reducing ratios $R_{30}$, $R_{31}$, and $R_{32}$ in the complex planetary gear unit 1 in the case of rotating the third ring gear 173 in the reverse direction. As can be seen from FIGS. 22A, 22B, 23A, and 23B, in the complex planetary gear unit 1 shown in FIG. 21, both of the speed reducing ratios $R_{31}$, and $R_{32}$ are greater than 25. According to the tenth example, the control torque of the control motor 112 may be increased with such large speed reducing ratios, and hence the control motor 112 may be downsized.

In addition, as described, all of the first gear 5, the second gear 6, and the third gear 7 are internal gears. That is, the complex planetary gear unit 1 shown in FIG. 21 is formed by combining the first complex planetary gear set with the second complex planetary gear set each of which does not have a sun gear. For this reason, a size of the complex planetary gear unit 1 shown in FIG. 21 can be reduced in the radial direction. Consequently, the differential mechanism 170 combined with the complex planetary gear unit 1 shown in FIG. 21 and the control motor 112 may also be downsized.

Eleventh Example

Figure 24:
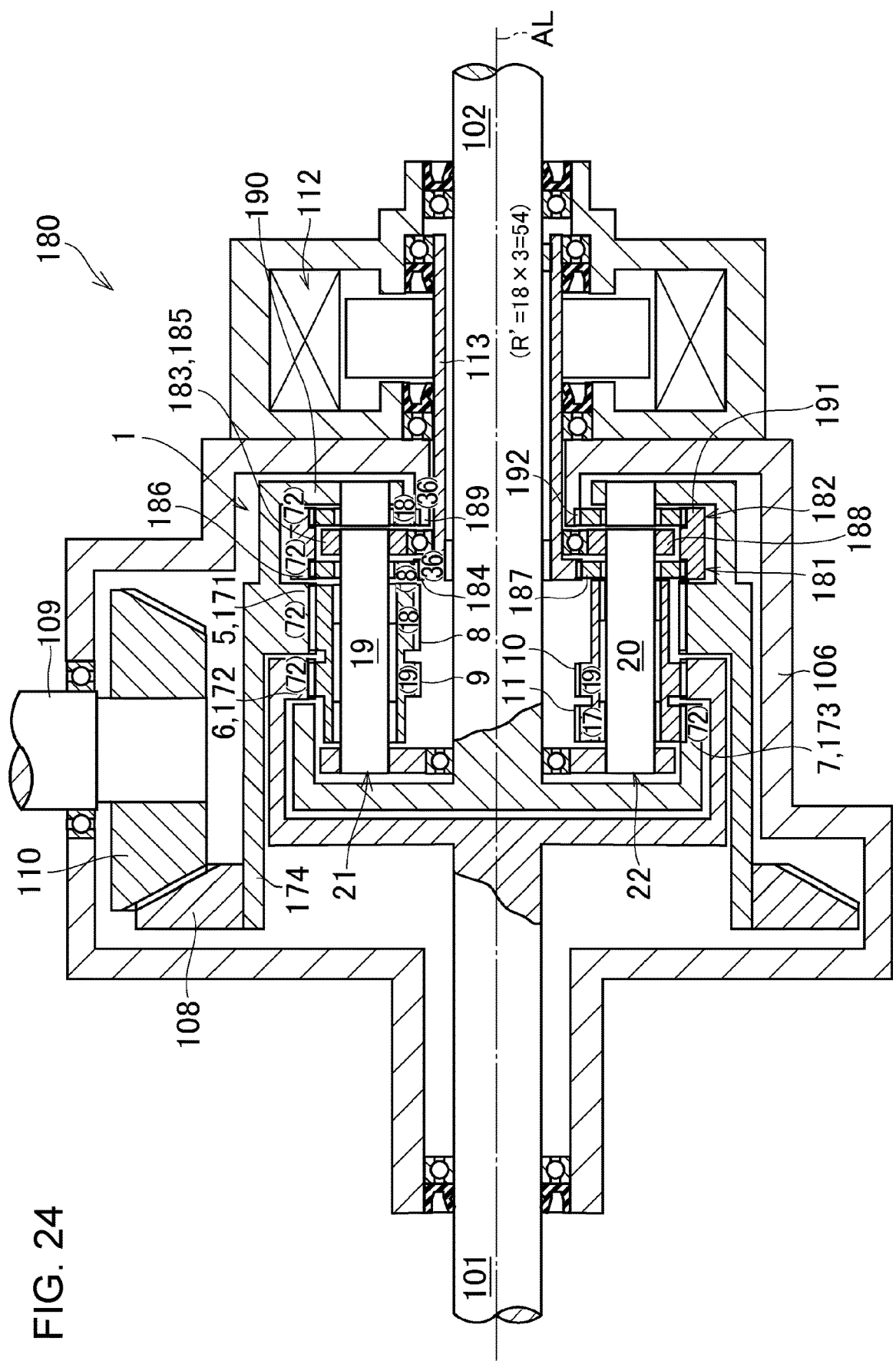
FIG. 24 is a cross-sectional view showing a structure of the complex planetary gear unit according to an eleventh example of the present disclosure.

Turning to FIG. 24, there is shown a structure of the complex planetary gear unit 1 according to the eleventh example of the present disclosure. According to the eleventh example, the complex planetary gear unit 1 is also combined with a differential mechanism 180 that distributes torque to right and left wheels (not shown). In order to prevent a passive rotation of the control motor 112, the complex planetary gear unit 1 shown in FIG. 24 is further provided with a speed reducing planetary gear set 181 and a speed increasing planetary gear set 182.

In the complex planetary gear unit 1 shown in FIG. 24, the speed reducing planetary gear set 181 is arranged between the control motor 112 and a carrier 183 to multiply the control torque applied to the carrier 183 from the control motor 112. Specifically, when the differential ring gear 108, the first rotary shaft 101, and the second rotary shaft 10 are rotated integrally, the speed reducing planetary gear set 181 reduces a rotational speed of the carrier 183 with respect to a rotational speed of the output shaft 113 of the control motor 112. According to the eleventh example, the carrier 183 supports the first planetary gear 8, the second planetary gear 9, the third planetary gear 10, and the fourth planetary gear 11 in a rotatable manner, without being connected to any of rotary members.

Specifically, the speed reducing planetary gear set 181 is a single-pinion planetary gear set formed coaxially with the first rotary shaft 101 and the second rotary shaft 102. The speed reducing planetary gear set 181 comprises a reduction sun gear 184, a reduction carrier 185, a reduction ring gear 186, and a planetary gear 187.

The reduction sun gear 184 is formed around one end of the hollow rotary shaft that is supported by the case 106 in a rotatable manner. The rotary shaft is joined to the output shaft 113 of the control motor 112 so that the reduction sun gear 184 is rotated integrally with the output shaft 113.

The reduction carrier 185 supports the planetary gear 187 in a rotatable manner. Specifically, the carrier 183 of the complex planetary gear unit 1 serves as the reduction carrier 185, that is, the reduction carrier 185 is rotated integrally with the carrier 83 of the complex planetary gear unit 1. As explained later, when the differential ring gear 108, the first rotary shaft 101, and the second rotary shaft 102 are rotated integrally, a rotational speed of the reduction carrier 185 is reduced lower than a rotational speed of the reduction ring gear 186.

The reduction ring gear 186 as an internal gear is meshed with the planetary gear 187 while being supported by the case 106 in a rotatable manner. Specifically, the reduction ring gear 186 is connected to or formed integrally with an after-mentioned speed increasing ring gear 191 of the speed increasing planetary gear set 182. That is, the reduction ring gear 186 is rotated integrally with the speed increasing ring gear 191.

Specifically, when the reduction sun gear 184 is rotated by the control torque delivered from the output shaft 113, the reduction ring gear 186 serves as a reaction element of the speed reducing planetary gear set 181 so that a rotational speed of the reduction carrier 185 is reduced lower than a rotational speed of the reduction sun gear 184. That is, the speed reducing planetary gear set 181 serves as a speed reducing mechanism of the control motor 112 so that the control torque of the control motor 112 is delivered to the carrier 183 while being multiplied by the speed reducing planetary gear set 121.

As indicated in FIG. 24, the number of teeth of the reduction sun gear 184 is 36, the number of teeth of the reduction ring gear 186 is 72, and the number of teeth of the planetary gear 187 is 18. Accordingly, a speed reducing ratio of the speed reducing planetary gear set 181 is 3. Therefore, based on the fact that the speed reducing ratio of the complex planetary gear unit 1 shown in FIG. 21 (i.e., the second speed reducing ratio $R_{32}$ between the carrier 12 and the third ring gear 173) is 18, an actual speed reducing ratio R' of the complex planetary gear unit 1 shown in FIG. 24 taking into account the speed reducing ratio of the speed reducing planetary gear set 181 is:

$$R'=18\cdot 3=54.$$

Thus, the speed reducing ratio of the complex planetary gear unit 1 shown in FIG. 24 is multiplied by the speed reducing planetary gear set 181.

The speed increasing planetary gear set 182 is also a single-pinion planetary gear set arranged coaxially with the first rotary shaft 101 and the second rotary shaft 102 in an opposite side to the speed reducing planetary gear set 181 across one of plates (i.e., a right plate in FIG. 24) 188 of the carrier 183. The speed increasing planetary gear set 182 comprises a speed increasing sun gear 189, a speed increasing carrier 190, the speed increasing ring gear 191, and a planetary gear 192.

The speed increasing sun gear 189 may be formed around a hollow shaft that is not allowed to rotate. For example, the speed increasing sun gear 189 is fitted onto a flange (not shown) formed integrally with the case 106. That is, the speed increasing sun gear 189 is not allowed to rotate.

The speed increasing carrier 190 supports the planetary gear 192 in a rotatable manner. Specifically, the speed increasing carrier 190 is connected to the differential ring gear 108 through the rotary shaft 174 of the first ring gear 171 so that the speed increasing carrier 190 is rotated integrally with the first ring gear 171 and the differential ring gear 108.

The speed increasing ring gear 191 as an internal gear is meshed with the planetary gear 192 while being supported by the case 106 in a rotatable manner together with the reduction ring gear 186 of the speed reducing planetary gear set 181. As described, the speed increasing ring gear 191 is rotated integrally with the reduction ring gear 186. When the speed increasing carrier 190 is rotated, a rotational speed of the speed increasing ring gear 191 is increased higher than a rotational speed of the speed increasing carrier 190.

Specifically, when the speed increasing carrier 190 is rotated by the torque delivered from the differential ring gear 108, the speed increasing sun gear 189 serves as a reaction element of the speed increasing planetary gear set 182 so that a rotational speed of the speed increasing ring gear 191 is increased higher than a rotational speed of the speed increasing carrier 190. Thus, the speed increasing planetary gear set 182 serves as a speed increasing mechanism.

As indicated in FIG. 24, the number of teeth of the speed increasing sun gear 189 is 36, the number of teeth of the speed increasing ring gear 191 is 72, and the number of teeth of the planetary gear 192 is 18. Thus, the number of teeth of the speed increasing sun gear 189 is equal to that of the reduction sun gear 184, the number of teeth of the speed increasing ring gear 191 is equal to that of the reduction ring gear 186, and the number of teeth of the planetary gear 192 is equal to that of the planetary gear 187. Accordingly, a gear ratio (or speed ratio) of the speed increasing planetary gear set 182 is equal to that of the speed reducing planetary gear set 181.

Thus, a structure and a function of the speed reducing planetary gear set 181 shown in FIG. 24 are similar to those of the speed reducing planetary gear set 121 shown in FIG. 18, and a structure and a function of the speed increasing planetary gear set 182 shown in FIG. 24 are similar to those of the speed increasing planetary gear set 122 shown in FIG. 18. According to the eleventh example, therefore, a power transmission efficiency and an energy efficiency of the differential mechanism 180 can be improved by preventing the passive rotation of the control motor 112. In addition, since the control motor 112 will not be rotated passively when the vehicle travelling in a straight line, the differential mechanism 180 will not be subjected to an inertia torque of the control motor 112 even if the vehicle is accelerated or decelerated abruptly. For this reason, it is not necessary to execute an additional control to generate a cancel torque against an inertia torque of the control motor 112. That is, a torque vectoring control of the differential mechanism 180 using the control motor 112 can be simplified.

Twelfth Example

Figure 25:
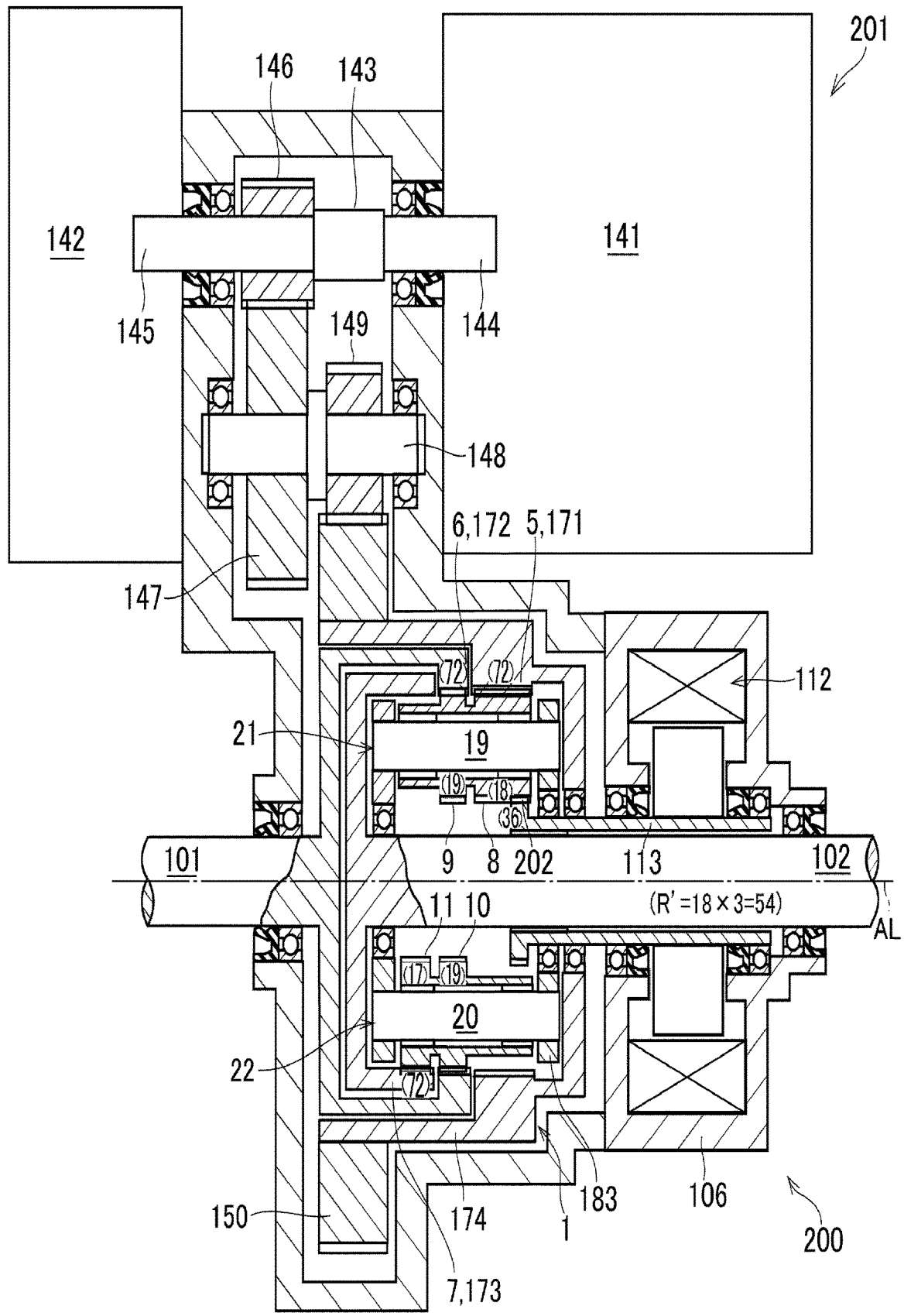
FIG. 25 is a cross-sectional view showing a structure of the complex planetary gear unit according to a twelfth example of the present disclosure.

Turning to FIG. 25, there is shown a structure of the complex planetary gear unit 1 according to the twelfth example of the present disclosure. According to the twelfth example, the complex planetary gear unit 1 is also combined with a differential mechanism 200 and a prime mover to serve as a power unit 201 having a torque vectoring function. The complex planetary gear unit 1 shown in FIG. 25 is provided with an input sun gear 202 that applies a torque to the differential mechanism 200.

The input sun gear 202 is formed integrally with the output shaft 113 of the control motor 112 to be rotated integrally with the output shaft 113, while being meshed with the first planetary gear 8. In other words, the input sun gear 202 is arranged coaxially with the first ring gear 171, the second ring gear 172, the third ring gear 173, and the carrier 183 along the rotational center axis AL. That is, the first planetary gear 8 is meshed with the first ring gear 171 and the input sun gear 202. Thus, according to the twelfth example, the complex planetary gear unit 1 comprises a single-pinion input planetary gear set having the input sun gear 202, the first ring gear 171, the first planetary gear 8, and the carrier 183.

In the complex planetary gear unit 1 shown in FIG. 25, the control torque generated by the control motor 112 is delivered to the carrier 183 through the input sun gear 202. In other words, the control torque is delivered from the input sun gear 202 to the complex planetary gear unit 1 though the input planetary gear set. According to the twelfth example, therefore, the speed reducing ratio R of the complex planetary gear unit 1 shown in FIG. 25 is further increased by a speed reducing ratio achieved by the input planetary gear set.

In the complex planetary gear unit 1 shown in FIG. 25, as the tenth example, the number of teeth $z_{p1}$ of the first planetary gear 8 is 18, the number of teeth $z_{p2}$ of the second planetary gear 9 is 19, the number of teeth $z_{p3}$ of the third planetary gear 10 is 19, the number of teeth $z_{p4}$ of the fourth planetary gear 11 is 17, the number of teeth $z_{r11}$ of the first ring gear 171 is 72, the number of teeth $z_{r12}$ of the second ring gear 172 is 72, and the number of teeth $z_{r13}$ of the third ring gear 173 is 72. According to the twelfth example, therefore, an actual speed reducing ratio R' of the complex planetary gear unit 1 shown in FIG. 25 is calculated by multiplying the speed reducing ratio of the complex planetary gear unit 1 shown in FIG. 21 (i.e., the second speed reducing ratio $R_{32}$ between the carrier 12 and the third ring gear 173) by the speed reducing ratio of the input planetary gear set.

In the complex planetary gear unit 1 shown in FIG. 25, the number of teeth $z_{202}$ of the input sun gear 202 is 36. Accordingly, the gear ratio $R_{202}$ of the input planetary gear set may be expressed as:

$$R_{202} = z_{r11}/z_{202} + 1$$
$$= 72/36 + 1$$
$$= 3.$$

As described, the speed reducing ratio $R_{32}$ of the complex planetary gear unit 1 shown in FIG. 21 is 18. Accordingly, the speed reducing ratio R' of the complex planetary gear unit 1 shown in FIG. 25 may be expressed as:

$$R' = 18 \cdot R_{202}$$
$$= 18 \cdot 3$$
$$= 54.$$

Thus, according to the twelfth example, the speed reducing ratio R of the complex planetary gear unit 1 shown in FIG. 25 may be increased by the input sun gear 202 greater than the speed reducing ratio R of the complex planetary gear unit 1 shown in FIG. 21.

According to the twelfth example, the complex planetary gear unit 1 shown in FIG. 25 is combined with the drive motor 141 and the brake device 142 to serve as the power unit 201 having the torque vectoring function. Here, it is to be noted that any one of the drive motor 141 and the brake device 142 may be omitted. In this case, the power unit 140 serves as a motor drive unit or a brake unit having a torque vectoring function.

Thirteenth Example

Figure 26:
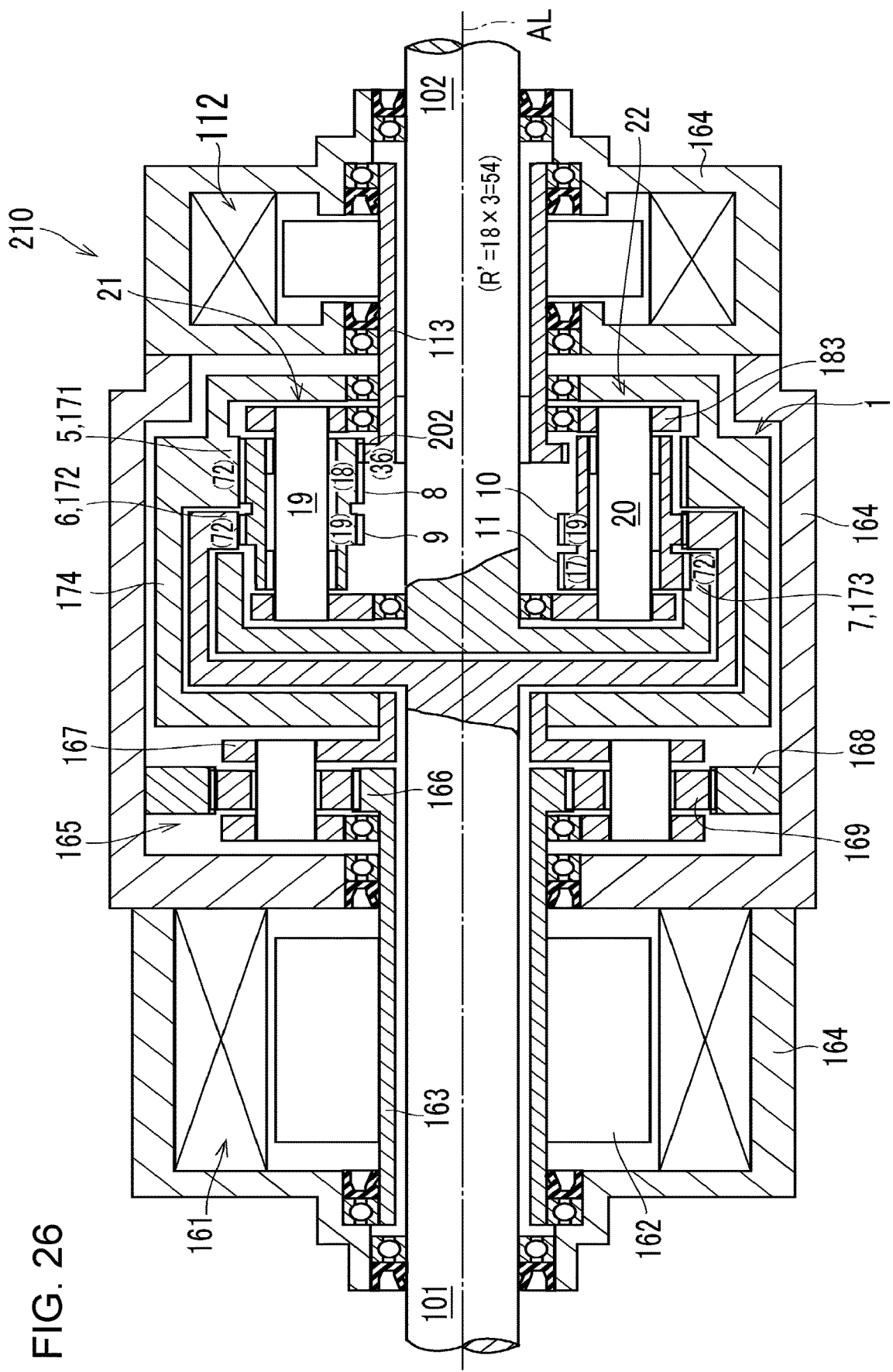
FIG. 26 is a cross-sectional view showing a structure of the complex planetary gear unit according to a thirteenth example of the present disclosure.

Turning to FIG. 26, there is shown a structure of the complex planetary gear unit 1 according to the thirteenth example of the present disclosure. According to the thirteenth example, the complex planetary gear unit 1 shown in FIG. 26 is arranged in a center differential mechanism 210 that is to be mounted on a four-wheel drive layout vehicle (not shown). In the complex planetary gear unit 1 shown in FIG. 26, the first rotary shaft 101 and the second rotary shaft 102 extend coaxially with each other along a longitudinal direction of the vehicle.

According to the thirteenth example, as the twelfth example, the complex planetary gear unit 1 shown in FIG. 26 is also provided with the input sun gear 202. According to the thirteenth example, therefore, a speed reducing ratio of the center differential mechanism 210 is increased greater than the speed reducing ratio of the center differential mechanism 160 shown in FIG. 20.

Specifically, the complex planetary gear unit 1 shown in FIG. 26 is connected to the rotor shaft 163 of the drive motor 161 through the reduction gear set 165. In the center differential mechanism 210, the carrier 167 is connected to the rotary shaft 174 of the first ring gear 171 so that the carrier 167 is rotated integrally with the first ring gear 171 and the rotary shaft 174.

In the center differential mechanism 210, therefore, the torque of the drive motor 161 is delivered to the complex planetary gear unit 1 serving not only as a differential mechanism but also as a torque vectoring device, while being multiplied by the reduction gear set 165.

Thus, according to the thirteenth example, the complex planetary gear unit 1 shown in FIG. 26 may be arranged coaxially with the drive motor 161 in the center differential mechanism 210. For example, the center differential mechanism 210 may be mounted on a four-wheel drive layout vehicle to serve as a compact power unit having a torque vectoring function.

In the foregoing examples, the casing is maintained in a liquid-tight condition by sealing members illustrated in the drawings, and rotary members are supported rotatably by bearings illustrated in the drawings.

Figure 27:
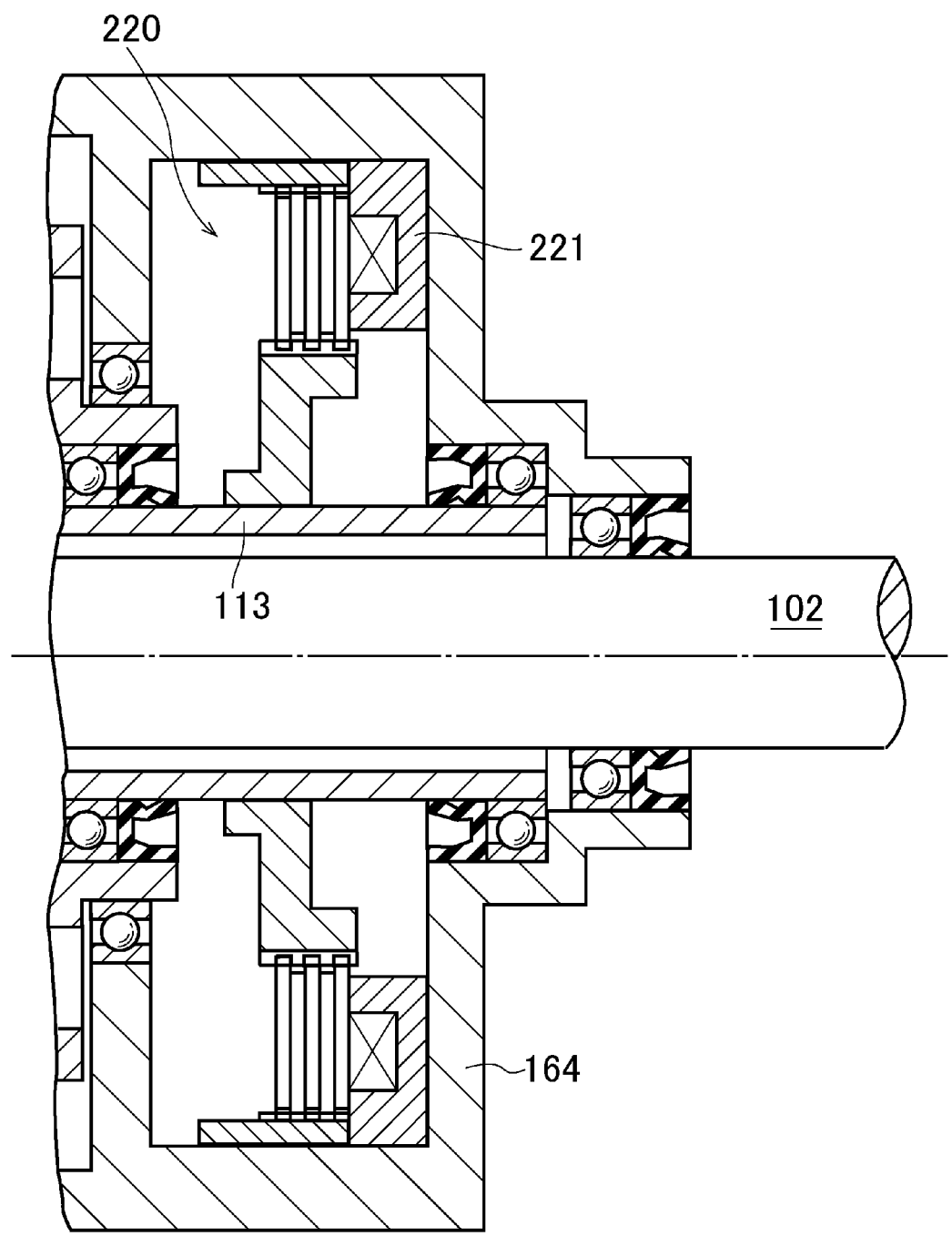
FIG. 27 is a cross-sectional view showing a structure of an electromagnetic brake which can be employed instead of the control motor.
Figure 28:
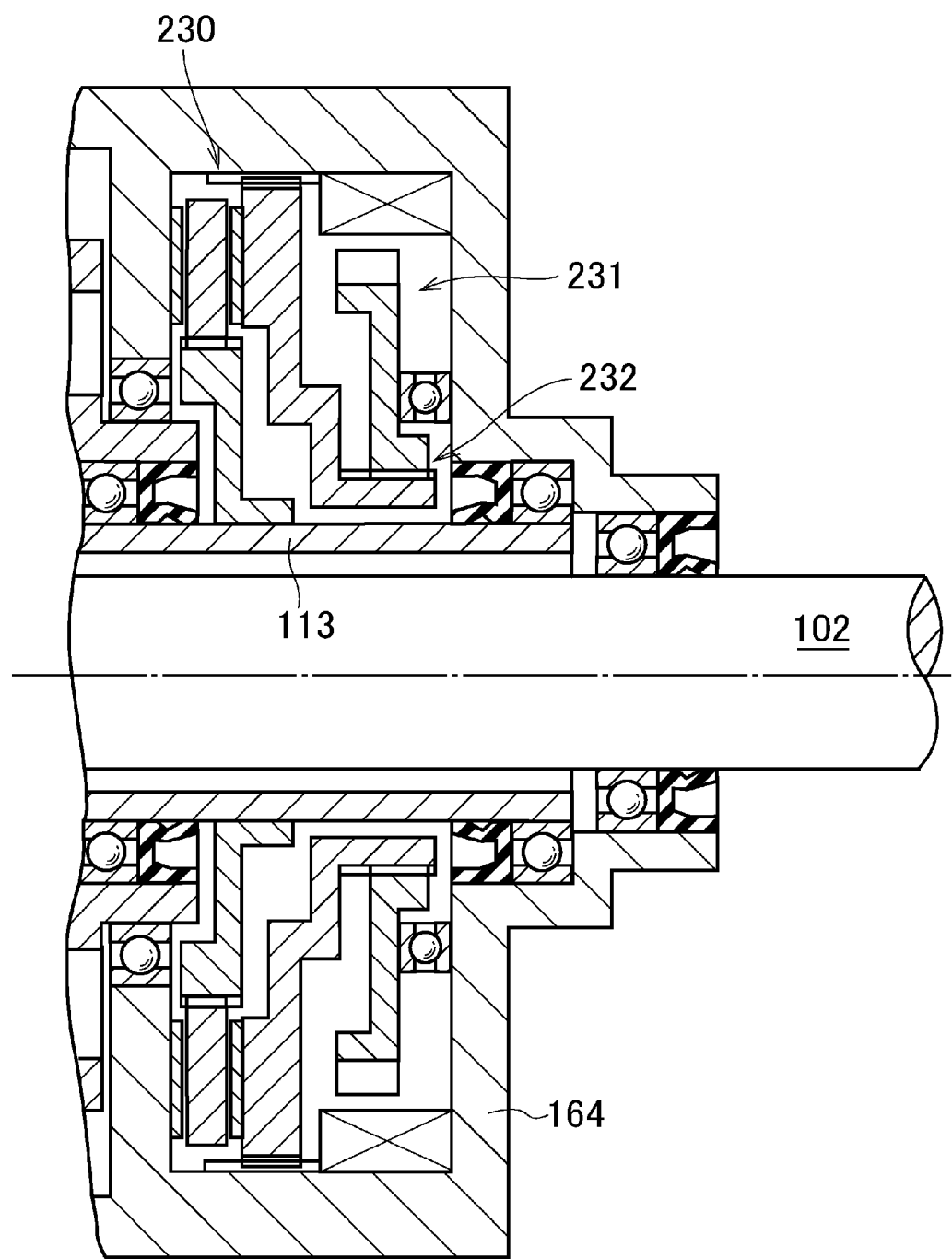
FIG. 28 is a cross-sectional view showing a structure of a feed screw mechanism which can be employed instead of the control motor.

Although the above exemplary embodiment of the present disclosure has been described, it will be understood by those skilled in the art that the present disclosure should not be limited to the described exemplary embodiments, and various changes and modifications can be made within the scope of the present disclosure. For example, an electromagnetic brake 220 shown in FIG. 27 may be employed as the brake device instead of the control motor 112. The electromagnetic brake 220 generates a brake torque derived from a magnetic attraction established by energizing a coil 221, and the brake torque generated by the electromagnetic brake 220 may be applied to the input element (e.g., the carrier 12, 123, or 183) of the complex planetary gear unit 1. In addition, an electric brake 230 shown in FIG. 28 may also be employed as the brake device instead of the control motor 112. The electric brake 230 generates a frictional brake force by actuating a feed screw mechanism 232 by an electric motor 231.

What is claimed is:

1. A complex planetary gear unit, comprising:
a first gear that is arranged on a predetermined rotational axis;
a second gear that is arranged on the predetermined rotational axis while being allowed to rotate relatively to the first gear;
a third gear that is arranged on the predetermined rotational axis while being allowed to rotate relatively to the first gear and the second gear;
a first planetary gear that is meshed with the first gear to revolve around the predetermined rotational axis;
a second planetary gear that is meshed with the second gear to revolve around the predetermined rotational axis;
a third planetary gear that is meshed with the second gear to revolve around the predetermined rotational axis;
a fourth planetary gear that is meshed with the third gear to revolve around the predetermined rotational axis;
a carrier that is arranged on the predetermined rotational axis to support the planetary gears in a rotatable manner; and
a counter rotating shaft that rotates integrally with the second gear, wherein
the first planetary gear and the second planetary gear are formed integrally with each other around a common rotational axis to integrally rotate and revolve around the predetermined rotational axis,
the third planetary gear and the fourth planetary gear are formed integrally with each other around another common rotational axis to integrally rotate and revolve around the predetermined rotational axis,
a gear ratio between the first planetary gear and the first gear and a gear ratio between the second planetary gear and the second gear are set to different ratios,
a gear ratio between the third planetary gear and the second gear and a gear ratio between the fourth planetary gear and the third gear are set to different ratios,
rotational speeds of the second gear and the third gear are reduced with respect to a rotational speed of the carrier,
the first gear is fixed and not allowed to rotate,
the complex planetary gear unit further comprises an output shaft that rotates integrally with the third gear,
an input torque applied to the carrier from an external source is delivered to the second gear while being multiplied,
the input torque delivered to the second gear is further delivered to the third gear while being further multiplied,
the input torque delivered to the third gear is further delivered to an external rotary member through the output shaft,
the output shaft and the counter rotating shaft are arranged coaxially along the predetermined rotational axis while being allowed to rotate relatively to each other,
the counter rotating shaft is rotated in an opposite direction to a rotational direction of the output shaft, and
the input torque delivered to the second gear is further delivered to a second external rotary member through the counter rotating shaft.

2. The complex planetary gear unit as claimed in claim 1, wherein the first gear includes a first sun gear meshing with the first planetary gear,
the second gear includes a second sun gear meshing with the second planetary gear and the third planetary gear, and
the third gear includes a third sun gear meshing with the fourth planetary gear.

3. The complex planetary gear unit as claimed in claim 2, wherein the third sun gear is rotated in a same direction with a rotational direction of the carrier rotated by the input torque by setting numbers of teeth of the first planetary gear, the second planetary gear, the third planetary gear, the fourth planetary gear, the first sun gear, the second sun gear, and the third sun gear such that all of the following relational expressions are satisfied:

$z_{p1}=z_{p3}$;

$z_{p2}=z_{p4}=z_{p1}+1$;

$z_{s1}=z_{p1} \cdot 2-1$;

$z_{s2}=z_{p1} \cdot 2+1$; and $z_{s3}=z_{p1} \cdot 2+3$, and the third sun gear is rotated in an opposite direction to the rotational direction of the carrier rotated by the input torque by setting the numbers of teeth of the first planetary gear, the second planetary gear, the third planetary gear, the fourth planetary gear, the first sun gear, the second sun gear, and the third sun gear such that all of the following relational expressions are satisfied:

$z_{p1}=z_{p3}$;

$z_{p2}=z_{p4}=z_{p1}-1$;

$z_{s1}=z_{p1} \cdot 2+1$;

$z_{s2}=z_{p1} \cdot 2-1$; and $z_{s3}=z_{p1} \cdot 2-3$, given that the number of teeth of the first planetary gear is $z_{p1}$, the number of teeth of the second planetary gear is $z_{p2}$, the number of teeth of the third planetary gear is $z_{p3}$, the number of teeth of the fourth planetary gear is $z_{p4}$, the number of teeth of the first sun gear is $z_{s1}$, the number of teeth of the second sun gear is $z_{s2}$, and the number of teeth of the third sun gear is $z_{s3}$.

4. The complex planetary gear unit as claimed in claim 1, wherein the first gear includes a first ring gear meshing with the first planetary gear, the second gear includes a second ring gear meshing with the second planetary gear and the third planetary gear, and the third gear includes a third ring gear meshing with the fourth planetary gear.

5. The complex planetary gear unit as claimed in claim 4, wherein the third ring gear is rotated in a same direction with a rotational direction of the carrier rotated by the input torque by setting numbers of teeth of the first planetary gear, the second planetary gear, the third planetary gear, the fourth planetary gear, the first ring gear, the second ring gear, and the third ring gear such that all of the following relational expressions are satisfied:

$z_{p1}=z_{p3}$;

$z_{p2}=z_{p4}=z_{p1}+1$;

$z_{r1}=(z_{p1} \cdot 2-1) \cdot 2$;

$z_{r2}=(z_{p1} \cdot 2+1) \cdot 2$; and $z_{r3}=(z_{p1} \cdot 2+3) \cdot 2$, and the third ring gear is rotated in an opposite direction to the rotational direction of the carrier rotated by the input torque by setting the numbers of teeth of the first planetary gear, the second planetary gear, the third planetary gear, the fourth planetary gear, the first ring gear, the second ring gear, and the third ring gear such that all of the following relational expressions are satisfied:

$z_{p1}=z_{p3}$;

$z_{p2}=z_{p4}=z_{p1}-1$;

$z_{r1}=(z_{p1} \cdot 2+1) \cdot 2$;

$z_{r2}=(z_{p1} \cdot 2-1) \cdot 2$; and $z_{r3}=(z_{p1} \cdot 2-3) \cdot 2$, given that the number of teeth of the first planetary gear is $z_{p1}$, the number of teeth of the second planetary gear is $z_{p2}$, the number of teeth of the third planetary gear is $z_{p3}$, the number of teeth of the fourth planetary gear is $z_{p4}$, the number of teeth of the first ring gear is $z_{r1}$, the number of teeth of the second ring gear is $z_{r2}$, and the number of teeth of the third ring gear is $z_{r3}$.

\* \* \* \* \*